US008706771B2

(12) United States Patent
Gass et al.

(10) Patent No.: US 8,706,771 B2
(45) Date of Patent: Apr. 22, 2014

(54) SYSTEMS AND METHODS FOR ANALYZING AND TRANSFORMING AN APPLICATION FROM A SOURCE INSTALLATION TO A TARGET INSTALLATION

(75) Inventors: Albrecht Gass, Fullerton, CA (US); Nikolaos Faradouris, Mannheim (DE); Stefan Hetges, Mannheim (DE); Oliver Flach, Leinfelden-Echterdingen (DE)

(73) Assignee: smartShift GmbH (DE)

( * ) Notice: Subject to any disclaimer, the term of this patent is extended or adjusted under 35 U.S.C. 154(b) by 284 days.

(21) Appl. No.: 12/570,753

(22) Filed: Sep. 30, 2009

(65) Prior Publication Data

US 2011/0078211 A1 Mar. 31, 2011

(51) Int. Cl.
*G06F 17/30* (2006.01)

(52) U.S. Cl.
USPC .......... 707/803

(58) Field of Classification Search
USPC .......... 717/112, 140–144; 707/112, 140–144, 707/999.001–999.01, 999.1, 707/999.101–999.107, 999.2–999.206
See application file for complete search history.

(56) References Cited

U.S. PATENT DOCUMENTS

| | | | | |
|---|---|---|---|---|
| 2002/0042849 | A1* | 4/2002 | Ho et al. | 709/329 |
| 2002/0062475 | A1* | 5/2002 | Iborra et al. | 717/108 |
| 2003/0028864 | A1* | 2/2003 | Bowen | 717/141 |
| 2003/0058277 | A1* | 3/2003 | Bowman-Amuah | 345/765 |
| 2004/0068715 | A1* | 4/2004 | Wong et al. | 717/136 |
| 2004/0252886 | A1* | 12/2004 | Pan et al. | 382/173 |
| 2005/0097146 | A1* | 5/2005 | Konstantinou et al. | 707/200 |
| 2005/0273705 | A1* | 12/2005 | McCain | 715/513 |
| 2008/0295069 | A1 | 11/2008 | Nicholls et al. | |

FOREIGN PATENT DOCUMENTS

WO WO-01-48601 A2 7/2001

OTHER PUBLICATIONS

International Search Report for PCT/US2010/050334 dated Apr. 7, 2011.
Written Opinion of the International Search Authority for PCT/US2010/050334 dated Mar. 31, 2012.

* cited by examiner

*Primary Examiner* — Hosain Alam
*Assistant Examiner* — Reza Hosseini
(74) *Attorney, Agent, or Firm* — Foley & Lardner LLP; Christopher J. McKenna

(57) ABSTRACT

The present application is directed towards systems and methods for analyzing and transforming an application from a source installation to a target installation. Customized functions, objects, databases, and code of the source installation may be analyzed in accordance with analysis rules to create a meta-model representative of the elements of the customized elements and their relationships with each other and objects of the source installation. Responsive to transformation rules, the meta-model may be modified to create a transformed meta-model representative of the elements and their relationships with each other and objects of the target installation. The transformations may then be applied to the customized functions, objects, databases, and code of the source installation to convert them into transformed functions, objects, databases, and code, compatible with the target installation.

20 Claims, 37 Drawing Sheets

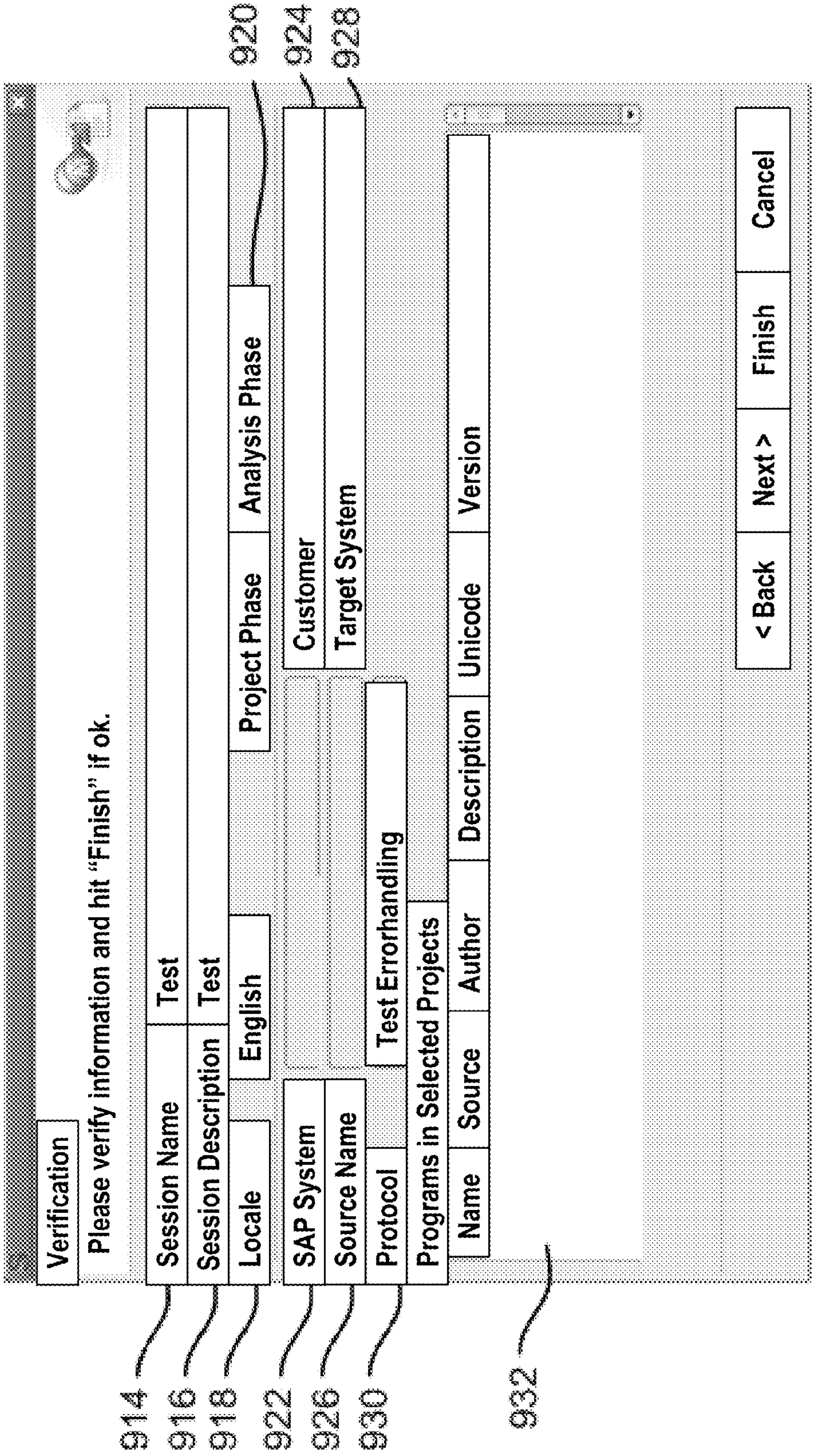

Fig. 9B

Verification

Please verify information and hit "Finish" if ok.

| Session Name | Test |
|---|---|
| Session Description | Test |
| Locale | English |

| Project Phase | Analysis Phase |
|---|---|

| SAP System | |
| Source Name | Customer |
| | Target System |
| Protocol | Test Errorhandling |

Programs in Selected Projects

| Name | Source | Author | Description | Unicode | Version |
|---|---|---|---|---|---|

[ < Back ] [ Next > ] [ Finish ] [ Cancel ]

914 — Session Name
916 — Session Description
918 — Locale
920 — Project Phase
922 — SAP System
924 — Customer
926 — Source Name
928 — Target System
930 — Protocol
932 — Programs in Selected Projects

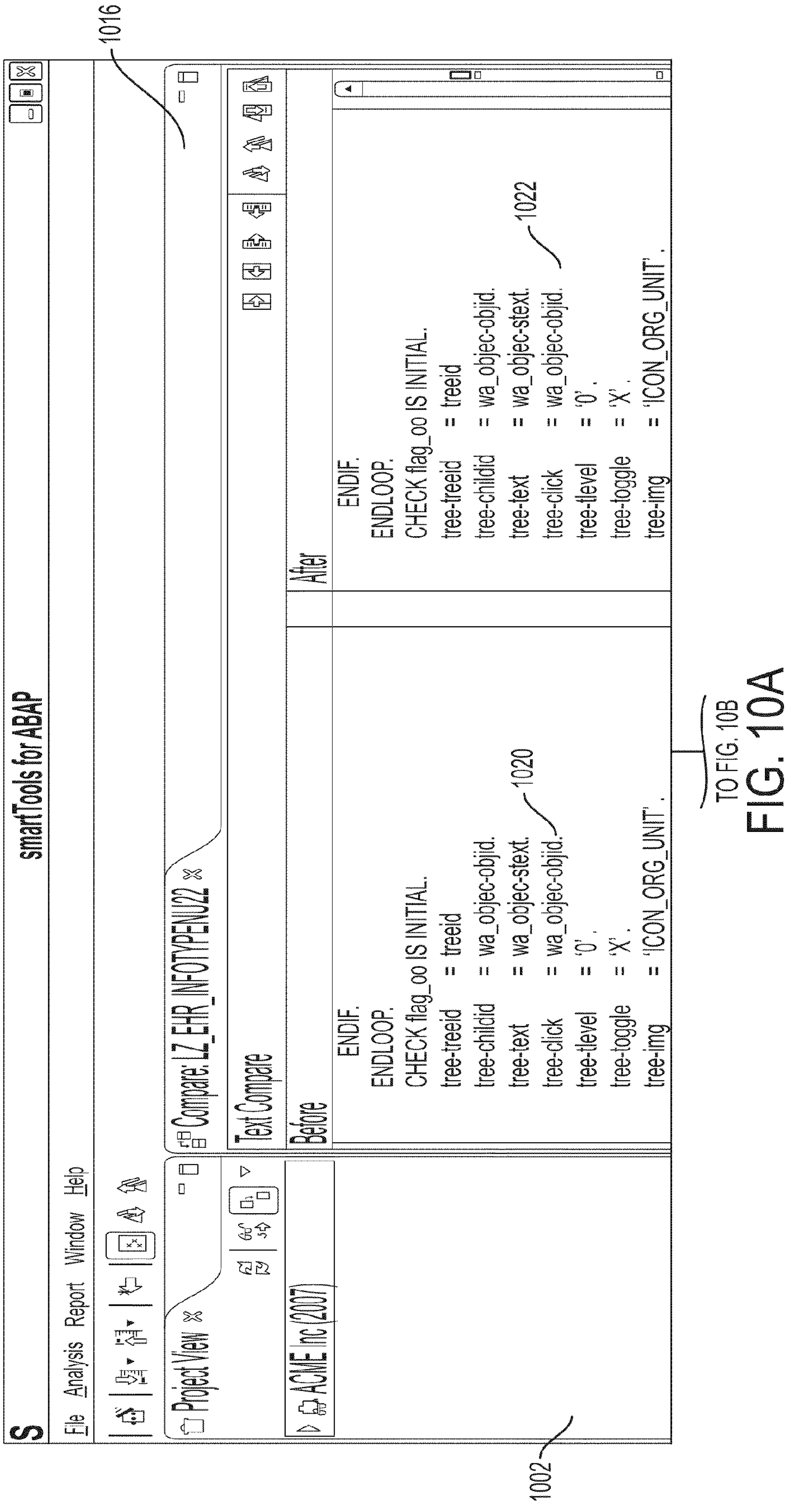

FIG. 10A
TO FIG. 10B smartTools for ABAP

File  Analysis  Report  Window  Help

Project View

ACME Inc (2007)

Compare: LZ_EHR_INFOTYPEN122

Text Compare

Before
```
         ENDIF.
    ENDLOOP.
    CHECK flag_oo IS INITIAL.
    tree-treeid    = treeid
    tree-childid   = wa_objec-objid.
    tree-text      = wa_objec-stext.
    tree-click     = wa_objec-objid.
    tree-tlevel    = '0'.
    tree-toggle    = 'X'.
    tree-img       = 'ICON_ORG_UNIT'.
```

After
```
         ENDIF.
    ENDLOOP.
    CHECK flag_oo IS INITIAL.
    tree-treeid    = treeid
    tree-childid   = wa_objec-objid.
    tree-text      = wa_objec-stext.
    tree-click     = wa_objec-objid.
    tree-tlevel    = '0'.
    tree-toggle    = 'X'.
    tree-img       = 'ICON_ORG_UNIT'.
```

FROM FIG. 10A

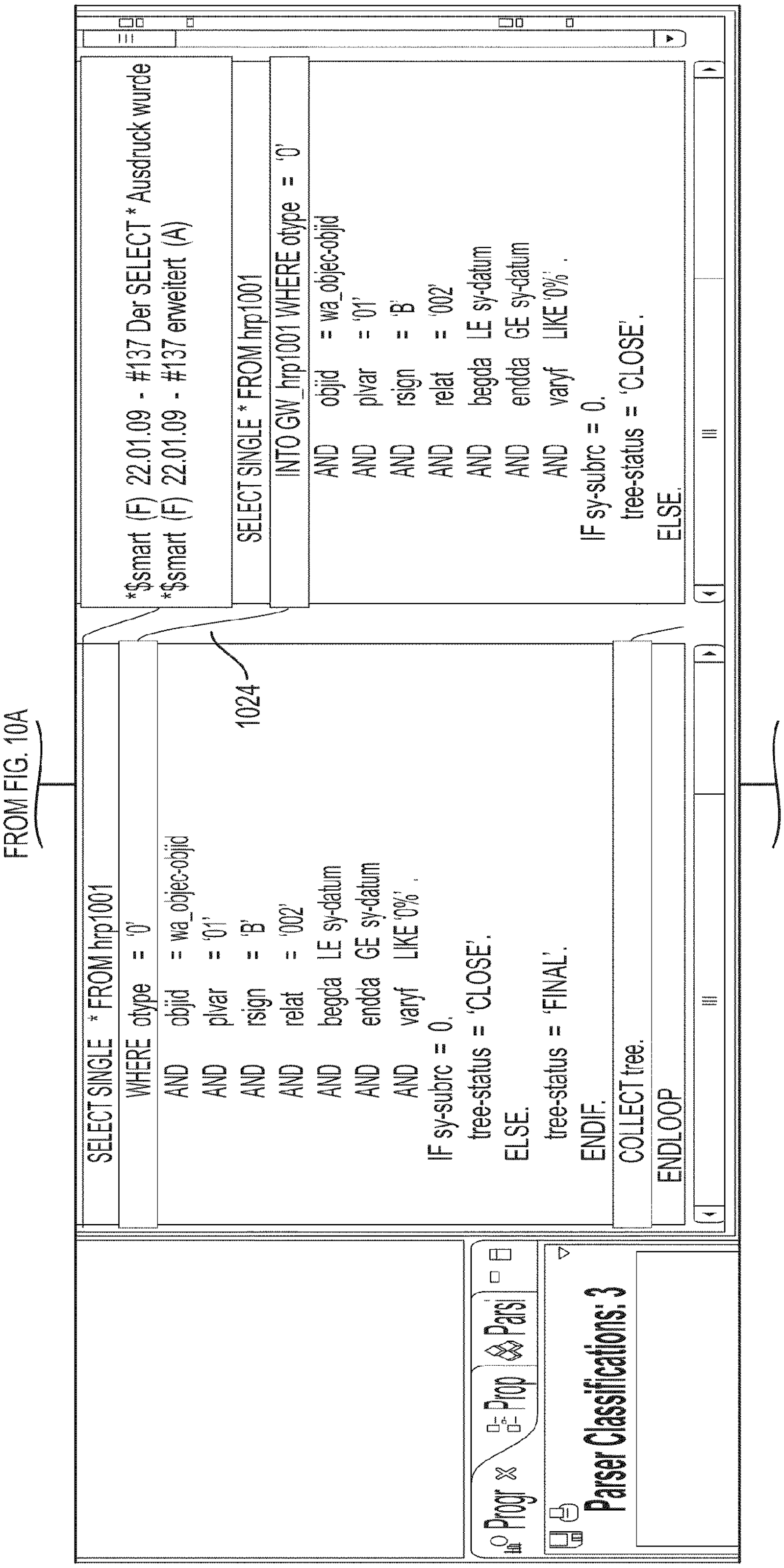

```
*$smart (F) 22.01.09 - #137 Der SELECT * Ausdruck wurde
*$smart (F) 22.01.09 - #137 #137 erweitert (A)

SELECT SINGLE * FROM hrp1001
              INTO GW_hrp1001 WHERE otype = '0'
        AND  objid  = wa_objec-objid
        AND  plvar  = '01'
        AND  rsign  = 'B'
        AND  relat  = '002'
        AND  begda  LE sy-datum
        AND  endda  GE sy-datum
        AND  varyf  LIKE '0%' .
IF sy-subrc = 0.
  tree-status = 'CLOSE'.
ELSE.
```

```
SELECT SINGLE * FROM hrp1001
  WHERE otype = '0'
    AND  objid  = wa_objec-objid
    AND  plvar  = '01'
    AND  rsign  = 'B'
    AND  relat  = '002'
    AND  begda  LE sy-datum
    AND  endda  GE sy-datum
    AND  varyf  LIKE '0%' .
IF sy-subrc = 0.
  tree-status = 'CLOSE'.
ELSE.
  tree-status = 'FINAL'.
ENDIF.
COLLECT tree.
ENDLOOP
```

1024

Parser Classifications: 3

| Rule Code | # Occurrences | Classification | Severity | Parser Action | Action |
|---|---|---|---|---|---|
| Implicit_type S | 2946 | Release | Warning | Automatic | Replace |

1502

Rule Description

1504 Specifying C as default type when declaration incomplete. Automatically add TYPE C.

Comments

1506 Code modernization

Message put in Code:

1508 *$Smart (W) – MM/DD/YY 3.1.3 Default Type C when data item declaration is incomplete. (A)

1510

| **Object** | LZ_MM_PIR_PO_PRICING_CND_GPF01 |
|---|---|

1512

Before (Line: 49)
Data: V_STRING(480),
After
*$Smart (Warn) – Specifying C as default type when data item declaration is
*$Smart (Warn) – incomplete. Code modernization. (A)
Data: V_STRING(480) TYPE C, *$Smart: modified 1514 Expected Automation Rate: 100%

| Rule Code | # Occurrences | Classification | Severity | Parser Action | Action |
|---|---|---|---|---|---|
| DESCRIBE | tbd (62) | Unicode | UC Error | Semi-Automatic | Replace |

Rule Description

1504

The MODE addition needs to be added according to the following rules:
For CHARACTER objects and CHARACTER-only structures IN CHARACTER MODE will be added.
For non-character elementary types, a warning will be inserted.
For all other occurrences (mix of BINARY and CHARACTER), a warning will be inserted

Comments

1506

Per default CHARACTER PROCESSING is added and replaced automatically for character objects and character-only structures. For fields replacement is OK and for tables no rule set in future. smartShift will adjust the message put in code according to default replacement.

Message put in Code:

1508

*$Smart (W) – MM/DD/YY 2.1.5 DESCRIBE requires mode when requesting length or distance. Replaced with recommended default value (A)
*$Smart (W) – MM/DD/YY 2.1.5 DESCRIBE statement uses binary fields in character mode (W)

1510

| **Object** | ZSDR_Z56_UPLOAD |
|---|---|

1512

Before (Line: 135)
describe field s_input_file length v_len_input.
describe field s_zssd_z56_hdr_com length v_len_hdr.
describe field s_zssd_z56_sz_com lenth v_len_sz.
After
*$Smart (E) – Describe requires mode when requesting length or distance (W)
describe field s_input_file length v_len_input IN CHARACTER MODE. "*$Smart: modified
describe field s_zssd_z56_hdr_com length v_len_hdr IN CHARACTER MODE "*$Smart: modified
describe field s_zssd_z56_sz_com length v_len_sz IN CHARACTER MODE "*$Smart: modified

1514

Expected Automation Rate: 25%. Out of approximately 83 occurrences, there are 62 occurrences where mixed data types are currently used. Functional input required to decide on unique mode for each of the mixed data type occurrences.

*Fig. 15B*

| Rule Code | # Occurrences | Classification | Severity | Parser Action | Action |
|---|---|---|---|---|---|
| ILLEGAL_ OFFSET_ LENGTH | 6 | Unicode | UC Error | Manual | Warning |

1502

Rule Description

1504 Arithmetic using offset and/or length on structures is not permitted. Tool will recognize the pattern and put in a warning for the developer to resolve issue.

Comments

1506

Message put in Code:

1508 *$Smart (E) – MM/DD/YY 2.1.9 Arithmetic using offset and/or length on structures zero length is not permitted (W)

| | |
|---|---|
| **Object** | ZSDR_EXPENSE_DETAIL |

1510

1512

Before (Line: 1460)
DELETE T_TMP_BSAK WHERE BELNR(2) = C_PAYMENT.
After
*$Smart (E) – Arithmetic using offset and/or length on structures zero length is not permitted (W).
DELETE T_TMP_BSAK WHERE BELNR(2) = C_PAYMENT.

1514 Expected Automation Rate: n/a. Manual work.

*FIG. 16A*
smartTools for ABAP: Upgrade KCC AsiaPacific PP3 20090714
File Project Analysis Report Window Help
Project: Upgrade KCC AsiaPacific PP3 20090714
Project Analysis
Time/Cost analysis
Remaining manual effort
Programs Analysis
Analysis su
Enable issue types
Issue
issues
FIRST
UNICODE 2962
#101 CONCATENATE command - n 75
#104 Find command - mode requir 0
#107 Literal used in code 30
#111 OPEN DATASET requires moc 482
#114 REPLACE statement requires 1667
#115 SHIFT statement requires mc 0
#116 SPLIT statement requires mc 0
#118 TRANSLATE - obsolete CODE 1
#119 RANGE addition required, fie 40
#120 WRITE statement is using a i 27
#121 In Unicode programs, the "[" 0
#122 Arithmetic using offset and/c 9
#124 DESCRIBE requires mode wh 26
#125 OVERLAY statement argume 0
#126 SET/GET BIT statement usin 0
#127 REFRESH/FREE/CLEAR on gl 0
#128 CONDENSE statement 0
#129 Automatic length declaration 0
#130 ASSIGN statement does not 0
#134 Comparison/assignment oper 1
#140 Implement handling for casti 0
#141 The additions USING and AN 0
#142 GUI Upload/Download 339
#143 Use of characters not allowe 0
#159 Only ULINE or ULINE AT /pos 0
#160 AT is required in position spe 0
#167 SEARCH command - mode re 4
#168 Convert binary use of linefee 139
RELEASE 70323
#100 Cross program memory area 0
#105 Resolution of untyped FORM 4469
#108 Data Declaration between M 0
#110 Obsolete internal table decla 0
#113 READ TABLE - Use of obsolet 424
#123 Use of function modules mar 0
#137 Add INTO clause to SELECT 13849
#138 CALL statement - use of liter 0
#139 Specify C as default type in i 0
#144 Replace ON CHANGE statem 0
#145 CONVERT DATE with INVERT 0
#146 PERFORM name(program) sh 0
#148 CHECK SELECT-OPTIONS va 0

| | Conf 1 | | | | Unassisted | | | |
|---|---|---|---|---|---|---|---|---|
| Object type | HIGH | MEDIUM | LOW | HANDLED | HIGH | MEDIUM | LOW | HANDLED |
| PROG | 0 | 0 | 4 | 1783 | 31 | 613 | 1143 | C |
| FLGR | 0 | 0 | 0 | 15 | 0 | 0 | 15 | C |
| INCL | 0 | 0 | 5 | 1283 | 12 | 195 | 1061 | C |
| DYNP | 0 | 0 | 0 | 0 | 0 | 0 | 0 | C |
| SUBP | 0 | 0 | 0 | 6 | 0 | 2 | 4 | C |
| MODP | 0 | 0 | 0 | 25 | 0 | 2 | 23 | C |
| CLSP | 0 | 0 | 0 | 0 | 0 | 0 | 0 | C |
| VIEW | 0 | 0 | 0 | 0 | 0 | 0 | 0 | C |
| TRAN | 0 | 0 | 0 | 0 | 0 | 0 | 0 | C |
| TYPEPOOL | 0 | 0 | 0 | 0 | 0 | 0 | 0 | C |
| UNKNOWN | 0 | 0 | 0 | 0 | 0 | 0 | 0 | C |
| Total count: | 0 | 0 | 9 | 3112 | 43 | 812 | 2266 | 0 | to FIG. 16D to FIG. 16C

Figure 16D:
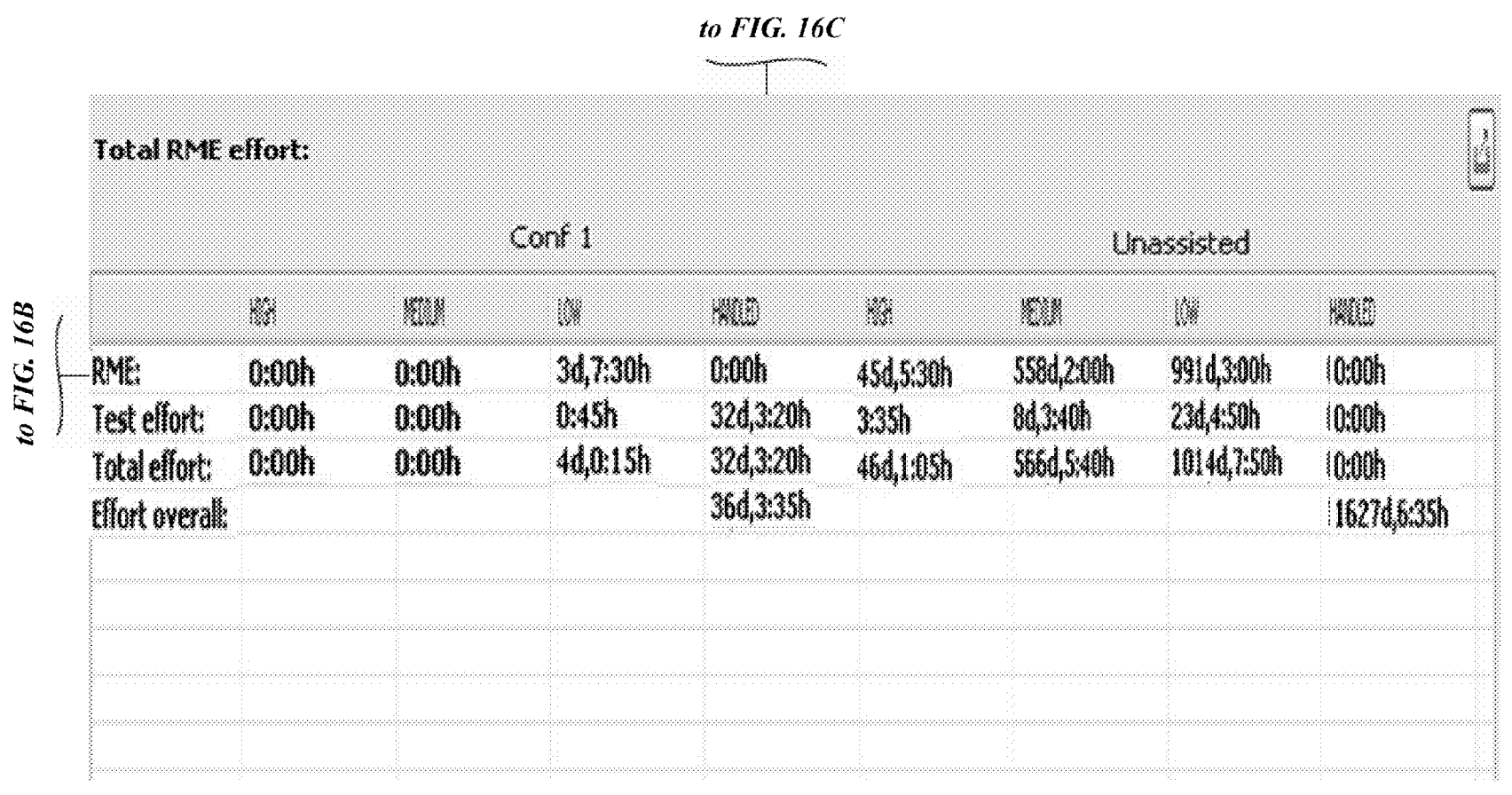

Total RME effort:

| | Conf 1 | | | | Unassisted | | | |
|---|---|---|---|---|---|---|---|---|
| | [illegible] | [illegible] | [illegible] | [illegible] | [illegible] | [illegible] | [illegible] | [illegible] |
| RME: | 0:00h | 0:00h | 3d,7:30h | 0:00h | 45d,5:30h | 558d,2:00h | 991d,3:00h | 0:00h |
| Test effort: | 0:00h | 0:00h | 0:45h | 32d,3:20h | 3:35h | 8d,3:40h | 23d,4:50h | 0:00h |
| Total effort: | 0:00h | 0:00h | 4d,0:15h | 32d,3:20h | 46d,1:05h | 566d,5:40h | 1014d,7:50h | 0:00h |
| Effort overall: | | | | 36d,3:35h | | | | 1627d,6:35h | to FIG. 16B

*FIG. 16D* to FIG. 17A

Figure 17B:
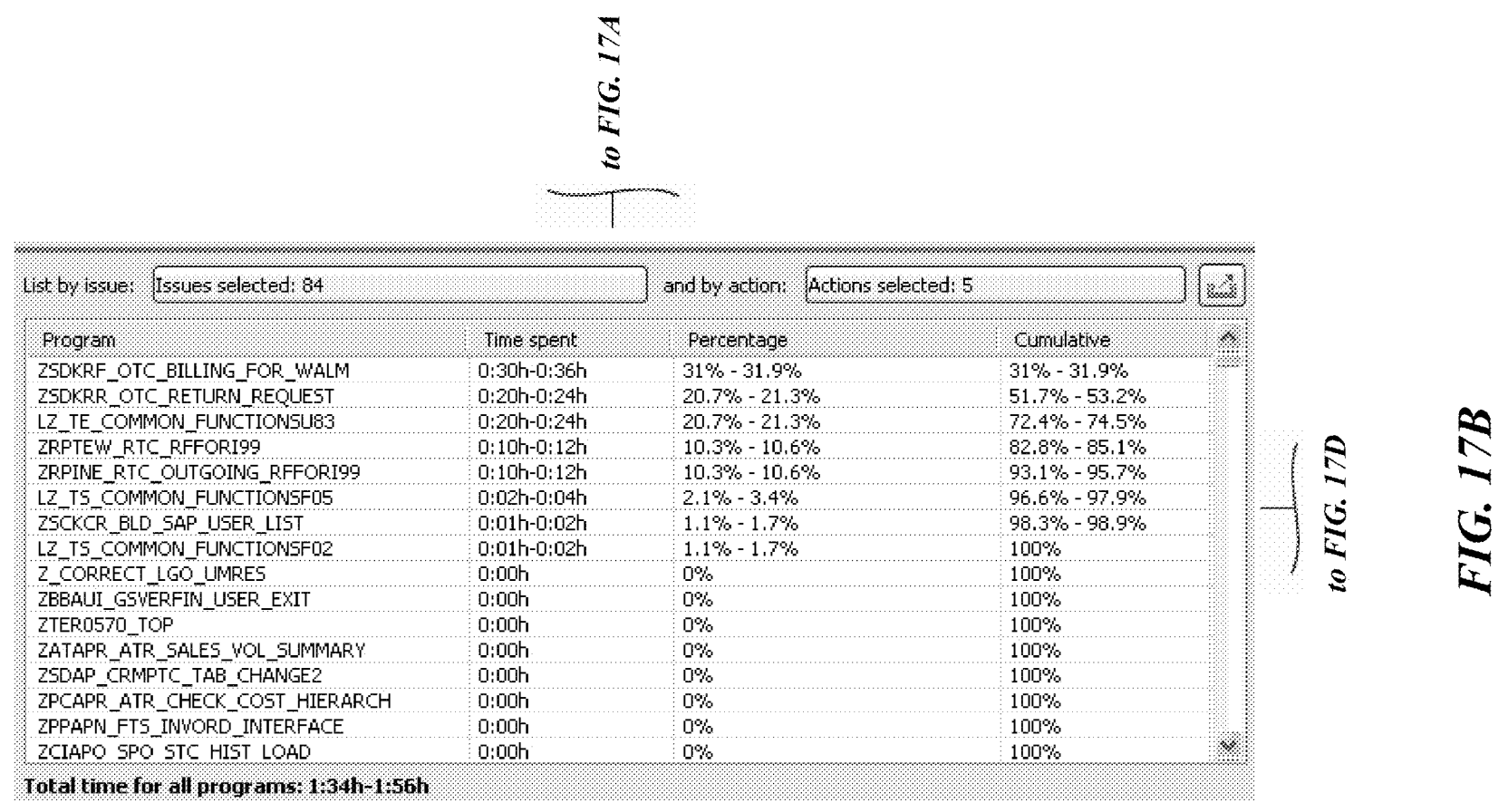

List by issue: Issues selected: 84 and by action: Actions selected: 5

| Program | Time spent | Percentage | Cumulative |
|---|---|---|---|
| ZSDKRF_OTC_BILLING_FOR_WALM | 0:30h-0:36h | 31% - 31.9% | 31% - 31.9% |
| ZSDKRR_OTC_RETURN_REQUEST | 0:20h-0:24h | 20.7% - 21.3% | 51.7% - 53.2% |
| LZ_TE_COMMON_FUNCTIONSU83 | 0:20h-0:24h | 20.7% - 21.3% | 72.4% - 74.5% |
| ZRPTEW_RTC_RFFORI99 | 0:10h-0:12h | 10.3% - 10.6% | 82.8% - 85.1% |
| ZRPINE_RTC_OUTGOING_RFFORI99 | 0:10h-0:12h | 10.3% - 10.6% | 93.1% - 95.7% |
| LZ_TS_COMMON_FUNCTIONSF05 | 0:02h-0:04h | 2.1% - 3.4% | 96.6% - 97.9% |
| ZSCKCR_BLD_SAP_USER_LIST | 0:01h-0:02h | 1.1% - 1.7% | 98.3% - 98.9% |
| LZ_TS_COMMON_FUNCTIONSF02 | 0:01h-0:02h | 1.1% - 1.7% | 100% |
| Z_CORRECT_LGO_UMRES | 0:00h | 0% | 100% |
| ZBBAUI_GSVERFIN_USER_EXIT | 0:00h | 0% | 100% |
| ZTER0570_TOP | 0:00h | 0% | 100% |
| ZATAPR_ATR_SALES_VOL_SUMMARY | 0:00h | 0% | 100% |
| ZSDAP_CRMPTC_TAB_CHANGE2 | 0:00h | 0% | 100% |
| ZPCAPR_ATR_CHECK_COST_HIERARCH | 0:00h | 0% | 100% |
| ZPPAPN_FTS_INVORD_INTERFACE | 0:00h | 0% | 100% |
| ZCIAPO_SPO_STC_HIST_LOAD | 0:00h | 0% | 100% |

Total time for all programs: 1:34h-1:56h to FIG. 17D

*FIG. 17B* to FIG. 17A to FIG. 17D to FIG. 18A

SYSTEMS AND METHODS FOR ANALYZING AND TRANSFORMING AN APPLICATION FROM A SOURCE INSTALLATION TO A TARGET INSTALLATION

FIELD OF THE INVENTION

The present application generally relates to analyzing and upgrading a computer system. In particular, the present application relates to systems and methods for analyzing and transforming an application from a source installation to a target installation.

BACKGROUND OF THE INVENTION

Many software applications may be modified or customized by users or administrators to include additional functions, objects, databases, and customized code. When the underlying software application is upgraded to a new version, in many instances, the modified or customized functions, objects, databases, and code of the prior, obsolete version may be incompatible with the new version. Rewriting the modified or customized functions, objects, databases, and/or code may be time consuming and expensive.

BRIEF SUMMARY OF THE INVENTION

The present application is directed towards systems and methods for analyzing and transforming an application from a source installation to a target installation. Customized functions, objects, databases, and code of the source installation may be analyzed in accordance with analysis rules to create a meta-model representative of the elements of the customized elements and their relationships with each other and objects of the source installation. Responsive to transformation rules, the meta-model may be modified to create a transformed meta-model representative of the elements and their relationships with each other and objects of the target installation. The transformations may then be applied to the customized functions, objects, databases, and code of the source installation to convert them into transformed functions, objects, databases, and code, compatible with the target installation.

In some of the embodiments described herein, a system or method may be described as automatic, semi-automatic or manual. An automatic system or method may be such a system or method that performs any of the upgrades, transformations or conversion described herein without any user input during the upgrade, transformation or conversion or with a level of user input below a predetermined threshold. A semi-automatic system or method may be such a system or method that performs any of the upgrades, transformations or conversion described herein with combination of a level of automation and a level of user input during the upgrade, transformation or conversion below a predetermined threshold or within a predetermined threshold range. A manual system or method may be such a system or method that performs any of the upgrades, transformations or conversion described herein without automation during the upgrade, transformation or conversion or with a level of automation below a predetermined threshold. In addition, in the following description, a objects or code of a system may be referred to as comprising automatic code; comprising semi-automatic code; or comprising manual code. Similar to the systems and methods described above, automatic code may be upgraded, transformed or converted without any user input during the upgrade, transformation, or conversion. Semi-automatic code may be upgraded, transformed or converted with a combination of a level of automation and a level of user input during the upgrade, transformation, or conversion below a predetermined threshold or within a predetermined threshold range. Manual code may be upgraded, transformed, or converted without automation during the upgrade, transformation or conversion or with a level of automation below a predetermined threshold.

In some aspects, the present invention is directed to a method of automation in the analysis and transformation of computing systems of various types. Analysis and transformation are part of a larger process that may be referred to generally as modernization. Modernization of a given computer system or application comprises a variety of tasks and processes, including adapting software to operate on new hardware platforms, restructuring code to optimize performance, rewriting code in new languages, introducing new functionality, and other types and forms of upgrading.

For example, the class of software systems and corresponding market segment referred to as Enterprise Resource Planning (ERP) is characterized by systems and applications of extremely large breadth and scope of functionality, designed to coordinate, control, and support resources and information related to business processes such as manufacturing, supply chain management, financials, projects, human resources and customer relationship management from a shared data store for an entire enterprise. The inherently large scope and complexity of ERP systems poses significant challenges to modernization. Business owners must balance significant business and technical benefits of updating and modernizing these vast systems against the considerable costs, risks, and disruption associated with large-scale modernization projections.

One example of an ERP system is the Systems, Applications, and Products (SAP) system developed by SAP AG of Walldorf, Germany. SAP uses a proprietary system architecture and programming language, the Advanced Business Application Programming (ABAP) language, which includes the concept of Logical Databases (LDBs). SAP is prominent in the market, and this has spawned an industry sub-niche for providers of specialized services and solutions related to SAP systems. Services and solutions serving the SAP ERP market segment must be extremely knowledgeable about, and closely aligned with, the underlying framework, architecture, and programming language of SAP systems, from both technical and business perspectives.

One advantage of the SAP ERP environment is the ability of customers and consultants to develop customized code, objects, reports, and interfaces for specific business requirements. SAP even allocates a specific repository within its environment to this type of custom code. However, when SAP AG releases new versions of underlying SAP software, SAP standard upgrade utilities will not operate on any custom code even though the custom code is written in the ABAP language. Specifically, the SAP upgrade utilities provide customers with the means to upgrade only the standard SAP components (the basis layer, the standard modules, and the system databases) from a given release level to a more recent release level. The upgrade utilities do not provide tools to upgrade any modified or custom code that is deployed in the system. The presence of custom code thus creates an obstacle for SAP customers who need to upgrade to the most current released version of SAP software.

Accordingly, the present invention features a solution to automate a comprehensive approach to analysis of a computing system—for instance, an ERP system such as SAP—at a detailed, source code level. Furthermore, the present invention features a solution to transform custom code. Disclosed herein are embodiments and examples of systems and methods for performing automated analysis and transformation of second- and third-party code. Although many of the examples discussed below are tied to specific embodiments of systems, including ERP systems such as SAP, the disclosed systems and methods may be applied to analyzing and transforming custom code in compliance with standards and rules of any language and architecture, including proprietary languages and architectures.

In one aspect, the present invention features a method of upgrading and modernizing a computing system, and in one embodiment, is focused on the problem of upgrading custom code developed by customers and consultants. The solution may analyze and alter custom code within a language, such as the proprietary ABAP language, and include components that operate within the system providing the computing language.

In some embodiments, the present invention provides analysis and reporting capabilities to provide customers and consultants with accurate and in-depth understanding of custom code, objects, reports, and interfaces. In other embodiments, the present invention provides conversion capabilities to provide reliable automated transformation and modernization of custom code, objects, reports, and interfaces within their associated computing environments. In further embodiments, the present invention provides support for customers who have extended their computing systems by deploying custom code. In other embodiments, the present invention provides support for independent systems integration consultants who engage in modernization projects to meet the needs of enterprise information technology departments.

In one embodiment, the present invention features an extensible rule based engine that allows for modernization of existing rules and implementation of additional rules. In another embodiment, the present invention features a system for adherence to coding standards and other internal requirements, such as tracking statements, naming conventions, etc. In another embodiment, the present invention features a conversion engine that transforms source code structures to comply with target system and client requirements, responsive to the rules engine configuration. In still another embodiment, the present invention features systems including flexible and/or extensible architectures, such as plugins. In still another embodiment, the present invention features a system for displaying results or changes graphically. In a further embodiment, the present invention features a system for providing graph and flow charts on demand to show inventory.

In another aspect, the present invention features a method for solving technical issues with custom code without altering or interacting with other parts of the system. In some embodiments, the method includes generating an inventory of one or more custom programming objects and their relationships with each other and other system objects. In additional embodiments, the method includes generating technical details of the application, including measurements of code length, complexity, interactions, storage, processing requirements, etc. In further embodiments, the method includes capabilities for reversion to a pre-transformation state. In other embodiments, the method includes capabilities for repetition of transformations, through successive iterations. In still other embodiments, the method includes generating a report comprising a comprehensive overview of coding issues in the application, ranging from unicode violations to obsolete coding issues to code defects. In some embodiments, the method includes replacing outdated syntax constructs with high-performance constructs to improve performance and efficiency.

In one aspect, the present invention features a method of analyzing modifications to an application from a predetermined state of the application. The method includes a collection agent, identifying from a source installation of an application, objects of the application modified from a predetermined state of the application. The method also includes an analysis agent parsing the modified objects into a set of elements. The method further includes the analysis agent generating a meta-model comprising a representation of the modified objects of the application. The meta-model comprises a mapping of the set of elements to the modified objects. The method also includes the analysis agent applying one or more analysis rules to the set of elements in the meta-model. The one or more analysis rules determine whether transformation of each of the set of the elements from the source installation of the application to a target installation of the application is automatic, semi-automatic or manual.

In some embodiments, the method includes the collection agent comparing each object to a database of objects in the predetermined state of the application and identifying a modification to each object based on the comparison. In another embodiment, the method includes the analysis agent parsing the modified objects to determine one or more of a language syntax and grammar of the objects, and comparing the modified objects to a language rules database. In another embodiment, the method includes the analysis agent generating the meta-model to include one or more of the following: data structures, database definition, file definition interfaces, and a link from the set of elements of the modified objects to corresponding code in the source application.

In one embodiment, the method includes the analysis agent detecting one or more violations of a set of elements in the meta-model to rules specified via the one or more analysis rules. In another embodiment, the method includes the analysis agent determining a set of elements in the meta-model that violate a unicode rule specified by the one or more analysis rules. In yet another embodiment, the method includes the analysis agent determining a set of elements in the meta-model that do not adhere to a coding standard specified by the one or more analysis rules. In other embodiments, the method includes the analysis agent categorizing each of the modified objects as an automatic, semi-automatic, or manual conversion from the source installation of the application to the target installation of the application. In still other embodiments, the method includes the analysis agent generating statistics of suitability for upgrade from the source installation of the application to the target installation of the application. In yet other embodiments, the method includes the analysis agent generating an estimate of one or more of time and cost for converting the source installation of the application to the target installation of the application.

In another aspect, the present invention features a method of transforming modifications from a source installation of an application to a target installation of the application. The method includes a transformer receiving a meta-model comprising a representation of objects of a source installation of an application modified from a predetermined state of the application. The meta-model comprises a mapping of the modified objects to a set of elements. The method also includes the transformer applying one or more transformation rules to the meta-model to transform the set of elements of the modified objects for a target installation of the application. The method also includes the transformer generating, from the transformed set of elements in the meta-model, transformed objects that are interpretable by the target installation of the application. In one embodiment, the method further includes the transformer displaying a comparison of the set of elements before applying the transformation rules and the set of elements after applying the transformation rules.

In an additional embodiment, the method includes the transformer identifying patterns in the meta-model and replacing the identified patters with elements specified by the one or more transformation rules. In another embodiment, the method includes the transformer applying the one or more transformation rules, responsive to an indicator identifying each of the modified objects as an automatic, semi-automatic, or manual transformation. In yet another embodiment, the method includes the transformer applying the one or more transformation rules to upgrade the modified objects from a first version of the application of the source installation to a second version of the application of the target installation. In still another embodiment, the method includes the transformer applying the one or more transformation rules to correct violations of the modified objects for the target installation of the application identified by one or more analysis rules.

In another embodiment, the method includes the transformer applying the one or more transformation rules to convert the set of elements of the modified objects to comply with a unicode rule. In another embodiment, the method includes applying the one or more transformation rules to convert the set of elements of the modified objects to comply with a coding standard. In still another embodiment, the method includes the transformer generating the transformed set of elements into transformed objects comprising a programming language of the target installation of the application. In an additional embodiment, the method includes the transformer compiling the transformed objects into a form useable by the target installation of the application.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 15A-C are screenshots of an embodiment of a report of objects analyzed and transformed from a source installation to a target installation.

FIG. 16A-D are screenshots of an embodiment of a report of remaining manual effort required to transform an application from a source installation to a target installation.

FIGS. 17A-D are screenshots of an embodiment of a report of a time analysis to transform an application from a source installation to a target installation.

Figure 1A:
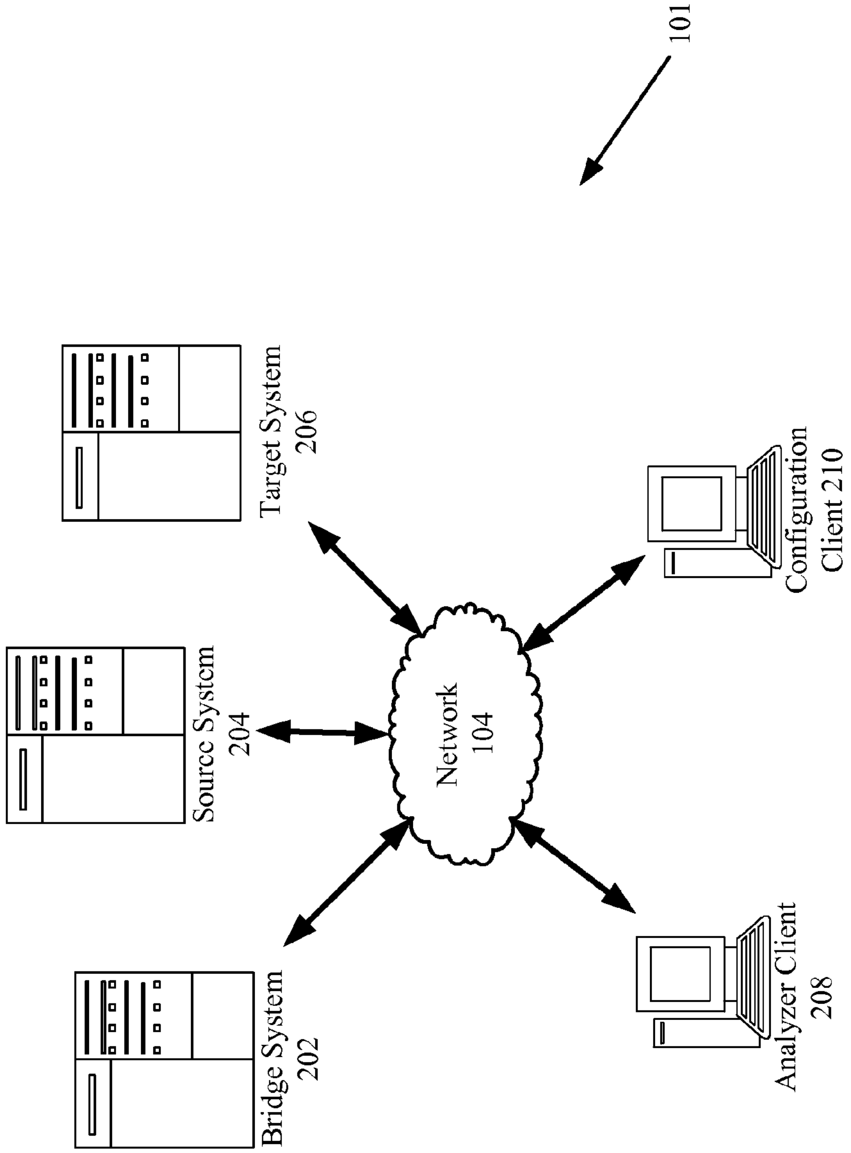
FIG. 1A is a block diagram of an embodiment of a network environment for a client to access a server for analyzing and transforming an application from a source installation to a target installation.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

- Section A describes a network environment and computing environment which may be useful for practicing embodiments described herein;
- Section B describes embodiments of systems and methods for analyzing and transforming an application from a source installation to a target installation; and
- Section C describes embodiments of an application for analyzing and transforming an application from a source installation to a target installation.

A. Network and Computing Environment

Prior to discussing the specifics of embodiments of the systems and methods of the solution of the present disclosure, it may be helpful to discuss the network and computing environments in which such embodiments may be deployed. Referring now to FIG. 1A, an embodiment of a network environment 101 is depicted. In brief overview, the network environment 101 comprises one or more systems 202-206 in communication with one or more clients 208-210 (also generally referred to as remote machine(s) 106) via one or more networks 104. Specifically shown are a bridge system 202, a source system 204, a target system 206, an analyzer client 208, and a configuration client 210. In some embodiments, analyzer client 208 and configuration client 210 may be the same client. In other embodiments, bridge system 202 may be combined with analyzer client 208 and/or configuration client 210. In yet another embodiment, bridge system 202 may be combined with either source system 204 or target system 206. In some embodiments, a client 208-210 communicates with a server 202-206 via an intermediary appliance (not shown), such as a firewall, a switch, a hub, a NAT, a proxy, a performance enhancing proxy, a network accelerator, a modem, or other network device of any form or type.

As shown in FIG. 1A, the network 104 can be a local-area network (LAN), such as a company Intranet, a metropolitan area network (MAN), or a wide area network (WAN), such as the Internet or the World Wide Web. Although not illustrated, network 104 may comprise one or more networks, coupled either directly or via one or more intermediaries. In one embodiment, network 104 may be a private network. In another embodiment, network 104 may be a public network. In some embodiments, network 104 may be a combination of one or more private networks and one or more public networks. In some embodiments, clients 208-210 may be located at a branch office of a corporate enterprise communicating via a WAN connection over the network 104 to the systems 202-206 located at a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As shown in FIG. 1A, bridge system 202 may be a server or workstation, configured to include a solution manager 212 and/or a collection agent 214, discussed in more detail below. As discussed above, although illustrated as a separate entity, bridge system 202 may be part of or combined with either or both of analyzer client 208 and configuration client 210.

Source system 204 may also be referred to as a source installation 204. In some embodiments, source system or source installation 204 may comprise a server or workstation with an installation or configuration of a version of one or more applications. In one embodiment, the one or more applications may also include an operating system. In another embodiment, the one or more applications may comprise an enterprise resource planning (ERP) software, such as SAP Business Suite or SAP R/3, manufactured by SAP AG of Walldorf, Germany; Microsoft Dynamics, manufactured by Microsoft Corporation of Redmond, Wash.; PeopleSoft, manufactured by Oracle Corporation of Redwood Shores, Calif.; or any other type and form of enterprise or manufacturing resource planning software. In another embodiment, the one or more applications may comprise any application that comprises an installation in a predetermined state, and modifications to objects from the predetermined state. In an example of such an embodiment, a default installation of an ERP application may be installed on source installation 204. To account for specific needs of the business or industry, the installation may be modified, with custom objects, code, or functions for performing additional tasks or managing additional resources not foreseen by the manufacturer of the ERP application. In another embodiment, the source system or source installation may comprise any type or form of application containing modifications from an initial or default state.

An installation in a predetermined state may comprise any type and form of version, installation and/or state of configuration, modernization or customization of the same at any point during development, deployment or maintenance of the application. In some embodiments, the predetermined state may be an initial or default installation of an application. In some embodiments, the predetermined state may be the initial or default installation of a version of an application with a set of one or more configurations, customizations or extensions. In some embodiments, the predetermined state may be any version of an application with a set of one or more configurations, customizations or extensions. In other embodiments, the predetermined state may be any version that has been upgraded or transformed using any of the systems and methods described herein. In some embodiments, the predetermined state may be any point of configuration or customization of a version of an application, whether complete, in-process or otherwise. For example, a predetermined state of an application may be any set point in development, configuration or customization of an application. For example, the systems and methods described herein may be used to transform the configuration or customization during the development phases before the final customizations or configurations are deployed for production.

Target system 206 may also be referred to as a target installation 206. In some embodiments, target system or target installation 206 may comprise a server or workstation with an installation or configuration of a second version of one or more applications. In some embodiments, the second version may be similar to the first version of one or more applications on source system 204. As described above, source system 204 may comprise custom objects, codes or functions. Using the methods and systems described herein, target system 206 may be efficiently modified to comprise the custom objects, codes or functions of source system 204. In some embodiments, target system 206 may comprise additional modifications to allow the custom objects, codes or functions to execute or interact properly with the second version of the one or more applications. For example, a company with an existing source system 204 may wish to upgrade to a new version of an underlying application on a target system 206. The existing source system 204 may have modifications and custom objects that the company wishes to include on target system 206. In some embodiments, custom objects and code may be directly transferred and will perform without error on target system 206. However, in many embodiments, the custom objects and code may need further modifications, due to differences between the underlying application of target system 206 and source system 204.

Also shown in FIG. 1A are analyzer client 208 and configuration client 210. Although shown as separate clients, in some embodiments, analyzer client 208 and configuration client 210 may be combined, and/or may be combined with bridge system 202. Analyzer client 208 and configuration client 210 may each be a workstation, client, or server. In some embodiments, analyzer client 208 is configured with or executes an analysis agent 228 and/or transformer 230, described in more detail below. In some embodiments, configuration client 210 is configured with or executes a configuration agent 232 and/or a manual conversion agent 234, described in more detail below.

Figure 1B:
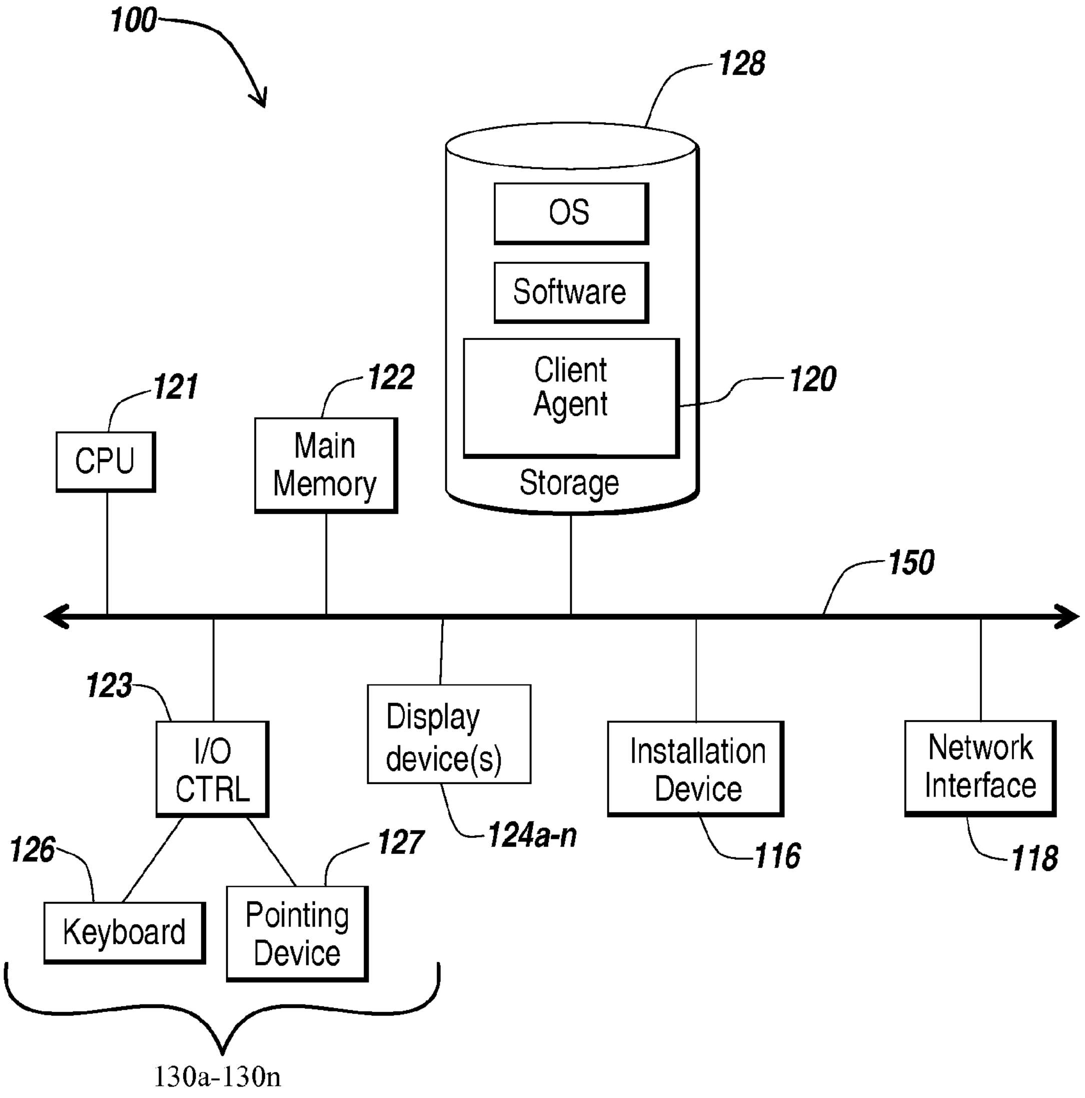
FIGS. 1B-1C are block diagrams of embodiments of a computing device.
Figure 1C:
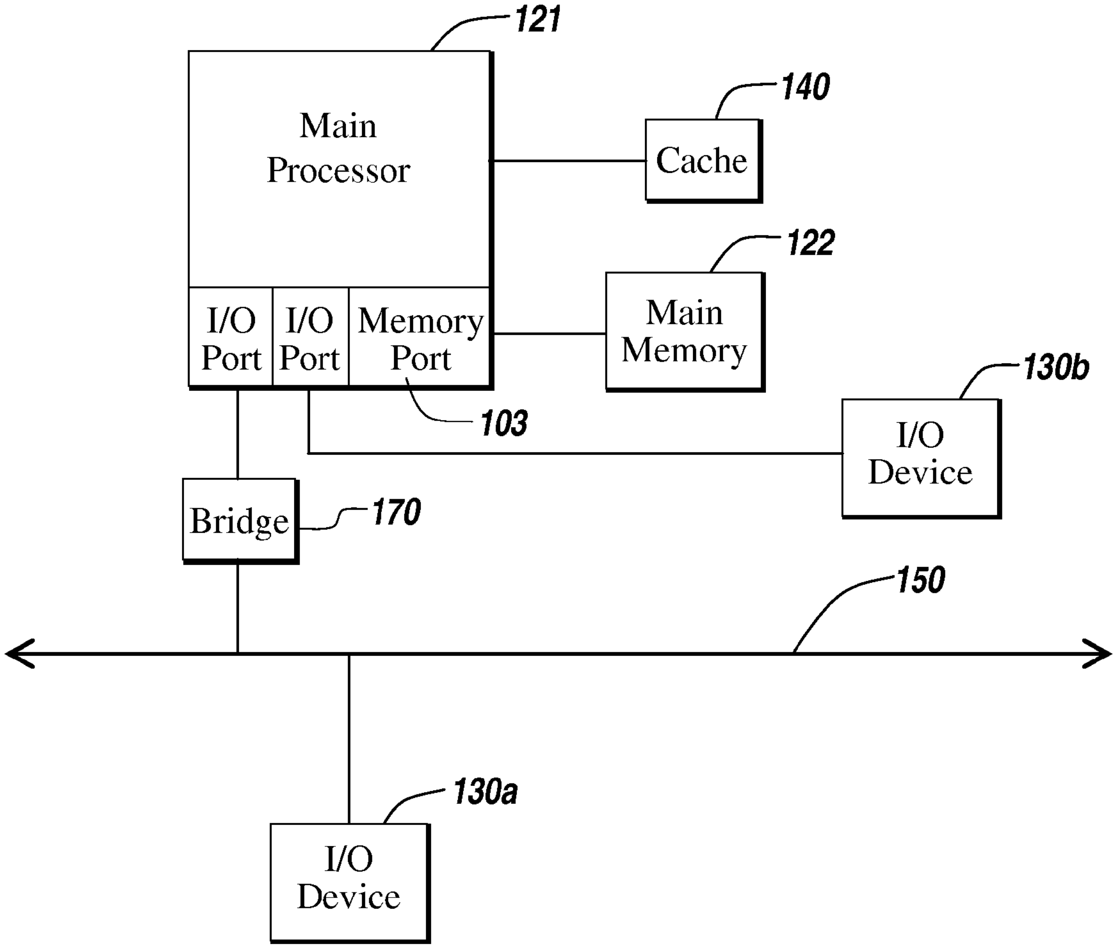

The bridge system 202, source system 204, target system 206, analyzer client 208 and configuration client 210 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102, server 106 or appliance 200. As shown in FIGS. 1B and 1C, each computing device 100 includes a central processing unit 101, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1C depicts an embodiment of a computer 100 in which the main processor 101 communicates directly with I/O device 130 via HyperTransport, Rapid I/O, or InfiniBand. FIG. 1C also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2A:
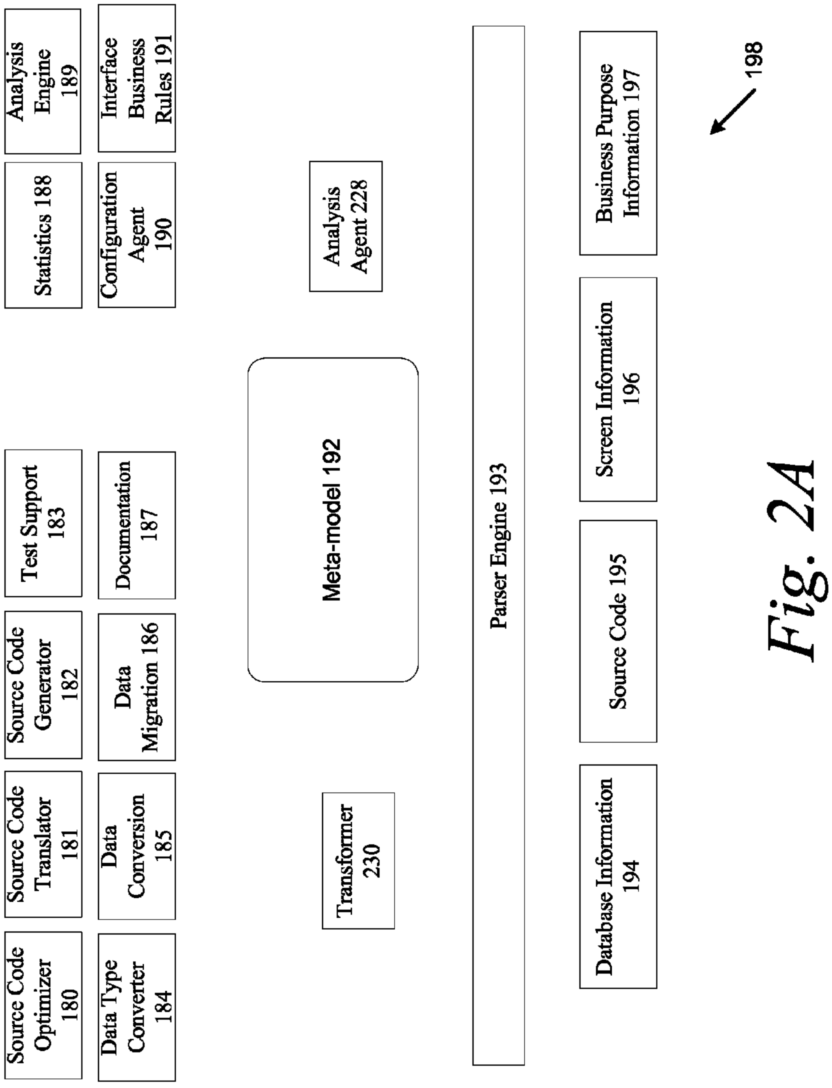
FIG. 2A is a block diagram of an embodiment of a suite of applications for analyzing and transforming an application from a source installation to a target installation.

B. Systems and Methods for Analyzing and Transforming an Application from a Source Installation to a Target Installation FIG. 2A illustrates a block diagram of an embodiment of a suite of applications and data types for analyzing and transforming an application from a source installation to a target installation. In brief, FIG. 2A shows a source code optimizer 180, source code translator 181, source code generator 182, test support engine 183, a data type converter 184, agents for data conversion 185 and data migration 186, and documentation 187. Together, blocks 180-187 comprise agents of transformer 230. Similarly, statistics data 188, analysis engine 189, configuration agent 190 and interface business rules 191 comprise agents of analysis agent 228. Meta-model 192 interacts with both the analysis agent 228 and transformer 230, and is established by parser engine 193. Additional data types are available, such as database information 194, source code 195, screen information 196, and business purpose information 197.

Figure 2B:
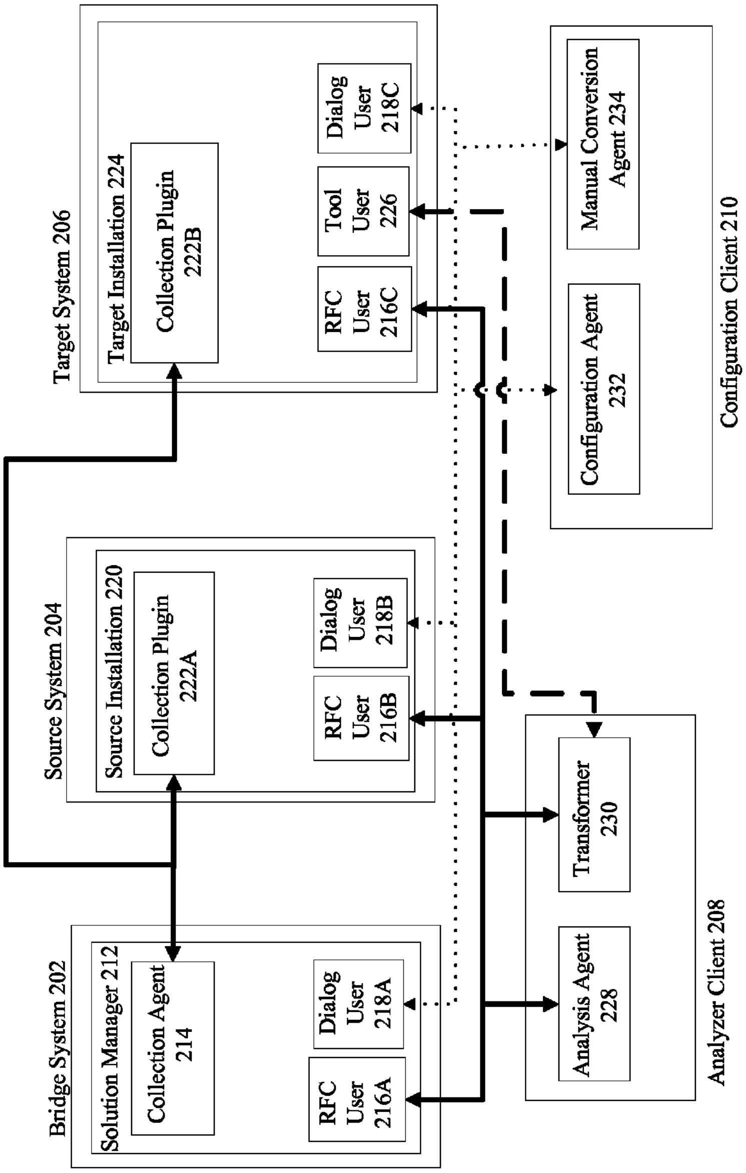
FIG. 2B is a block diagram of an embodiment of an appliance for analyzing and transforming an application from a source installation to a target installation.

Shown in FIG. 2B is a block diagram of another embodiment of a system for analyzing and transforming an application from a source installation to a target installation. In brief, bridge system 202 may be configured with a solution manager 212, which may include a collection agent 214 and may be configured with a remote function call (RFC) user account 216A and a dialog user account 218A. Source system 204 may be configured with a source installation 220, which may include a collection plug-in 222A. Source installation 220 may also be configured with an RFC user account 216B and a dialog user account 218B. Target system 206 may be configured with a target installation 224, which may include a collection plug-in 222B. Target installation 220 may also be configured with an RFC user account 216C, a dialog user account 218C, and a tool user account 226. As shown, Analyzer client 208 may be configured with an analysis agent 228 and a transformer 230. Configuration client 210 may be configured with a configuration agent 232 and a manual conversion agent 234. In one embodiment, the collection agent 214 is able to communicate with collection plug-ins 222A and 222B via a network 104. As shown, in some embodiments, analysis agent 228 and transformer 230 may be configured to use RFC user accounts 216A-216C for communicating with systems 202-206. Transformer 230 may also be configured to use tool user account 226. Additionally, in some embodiments, configuration agent 232 and manual conversion agent 234 may be configured to use dialog user accounts 218A-218C.

Still referring to FIG. 2B and in more detail, in some embodiments, bridge system 202 may be configured with or may execute a solution manager 212. In some embodiments, solution manager 212 may be an application, process, agent, function, routine, logic, or any type and form of executable instructions for snapshotting an installation. In some embodiments, snapshotting or providing a snapshot of an installation comprises scanning and downloading components and/or associations of an installation of an application, such as source installation 220. Snapshotting may also be referred to variously as saving, capturing, imaging, or storing an image, copy or an instance of an installation. In additional embodiments, solution manager 212 may further comprise functions for compressing a snapshotted image. In still further embodiments, solution manager 212 may comprise or be associated with a storage medium capable of storing a snapshotted image. In one embodiment, solution manager 212 may connect via a network to a source installation 220, described in more detail below. The solution manager 212 may create a local copy of the entire source installation 220, or, in some embodiments, may parse the source installation 220 and copy a selected subset of the installation. For example, in one such embodiment, solution manager 212 may parse the source installation 220 for custom objects or code modified from a predetermined state of the source installation, and store only a copy of the custom objects or code. In another such embodiment, solution manager 212 may determine a difference between source installation 220 and target installation 224 and store only the difference.

In many embodiments, solution manager 212 further comprises functionality for identifying an object as being in a predetermined state or being in a modified state. For example, an object that has not been customized may, in some embodiments, be considered to be in a predetermined state. A predetermined state of an installation, in such embodiments, may be the state of the installation prior to customization or addition of custom objects, functions, or code. In further embodiments, solution manager 212 may comprise functionality for identifying an object as an asset within-scope, such as a program, a database, or a screen, or an asset out-of-scope, such as a task-management system, a scheduler, an interface, a peripheral system, or a development environments. In yet further embodiments, solution manager 212 may comprise functionality for storing the identification of objects in a database, index, or list, which may be referred to as a worklist. In some embodiments, this worklist may sent to the analyzer client 208, described in more detail below.

In many embodiments, solution manager 212 further comprises functionality for checking an object or code for compliance with a language syntax 282 and/or semantic rules 284. For example, an object or code modified with custom programming may no longer be compliant with a standard syntax. In such a case, solution manager 212 may identify the object as being not in compliance. In another embodiment, an object or code may be modified, but still be compliant with a standard syntax. In such a case, solution manager 212 may identify the object as being compliant.

In some embodiments, as shown in FIG. 2B, solution manager 212 may comprise or include a collection agent 214. Collection agent 214 may be an application, process, agent, function, routine, logic, or any type and form of executable instructions for downloading or copying all or part of a source installation 220 to bridge system 202. In some embodiments, collection agent 214 connects via a network to a collection plugin 222A and/or collection plugin 222B, described in more detail below. Collection agent 214 may, in some embodiments, comprise functions for downloading source installation data as described above. In further embodiments, collection agent 214 and collection plugins 222A and 222B may be a standard application type or comply with a standard application type and be able to be executed by the source installation 220 and/or target installation 224 without necessary modifications.

As shown in FIG. 2B, solution manager 212, source installation 220 and target installation 224 may include user accounts, such as Remote Function Call (RFC) users 216A-216C, Dialog users 218A-218C, and Tool user 226. RFC users 216A-216C (referred to generally as RFC user(s) 216) may be an account with authentication features, such as a login name and password or other security methods, and privileges allowing the account to get data from and insert data into source installation 220 and/or target installation 224. In some embodiments, data inserted or retrieved from an installation may comprise objects, code, or functions. In some embodiments, RFC users 216 may also be referred to as System or Communication users. In further embodiments, the Dialog users 218A-218C (referred to generally as Dialog user(s) 218) may be an account with authentication features, similar to those mentioned with regard to RFC users 216, and privileges allowing the account to interact with programs and functions of source installation 220 and/or target installation 224. In some embodiments, a dialog user 218 may have fewer privileges or more limited access than an RFC user 216. In additional embodiments, the Tool user 226 may be an account with authentication features, similar to those mentioned with regard to RFC users 216 and Dialog users 218, and privileges allowing the account to use modification tools on target installation 224.

As shown in FIG. 2B, source system 204 may comprise a source installation 220. As discussed above, in connection with the discussion of source system 204, source installation 220 may be an installation or configuration of a version of one or more applications. In one embodiment, the one or more applications may comprise an enterprise resource planning (ERP) software, such as SAP Business Suite or SAP R/3, manufactured by SAP AG of Walldorf, Germany; Microsoft Dynamics, manufactured by Microsoft Corporation of Redmond, Wash.; PeopleSoft, manufactured by Oracle Corporation of Redwood Shores, Calif.; or any other type and form of enterprise or manufacturing resource planning software. In another embodiment, the one or more applications may comprise any application that comprises a default or initial installation in a predetermined state, and modifications to objects from the default state. In yet another embodiment, the source system or source installation may comprise any type or form of application containing modifications from an initial or default state. As shown, source installation 220 may include one or more RFC users 216 and/or dialog users 218, discussed above.

Additionally, source installation 220 may include or be configured with a collection plugin 222A (generally referred to as a collection plugin 222). Collection plugins 222 may comprise logic, services, hooking functions, routines, or any other type and form of function for gathering data of an installation, such as source installation 220 or target installation 224. In some embodiments, collection plugins 222 may further comprise functions for snapshotting or recording an image of an installation as the installation exists at a certain point in time. In some embodiments, collection plugins 222 may include the ability to push data over a network to collection agent 214, while in other embodiments, collection agent 214 may pull data from the collection plugins.

Target system 206 may comprise a target installation 224. As discussed above, in connection with the discussion of target system 206, target installation 224 may be an installation or configuration of a second or subsequent version of one or more applications, such as a version similar to but different from a previous version of one or more applications on source system 204. As described above, source installation 220 may comprise custom objects, codes or functions. Using the methods and systems described herein, target installation 224 may be efficiently modified to comprise the custom objects, codes or functions of source installation 220. In some embodiments, target installation 224 may comprise additional modifications to allow the custom objects, codes or functions to execute or interact properly with the second version of the one or more applications. As shown, in some embodiments, target installation 224 may include or comprise a collection plugin 222B, and may include or be configured with accounts for RFC User 216C, Dialog User 218C, and Tool user 226, discussed above.

As shown, analyzer client 208 may comprise or include an analysis agent 228 and/or a transformer 230. Analysis agent 228 may comprise one or more applications, logic, functions, services, routines or executable instructions of any type or form, for parsing a first and/or a second installation of an application and creating a meta-model, described in more detail below. In some embodiments, analysis agent 228 comprises functions for downloading system objects identified by the solution manager 212 for transformation. In additional embodiments, analysis agent 228 comprises functions for parsing the source code of programs, databases, screens, task management systems, schedulers, interfaces, peripheral systems, development environments, and other libraries for keywords, functions, objects, or code corresponding to a defined language and syntax. In further embodiments, analyzer client 208 may comprise functions for detecting syntax and language violations. In one such embodiment, analyzer client 208 may comprise functions to categorize or identify the object, responsive to detected violations, as available for automatic upgrade, semi-automatic upgrade, or manual upgrade. In an additional embodiment, analyzer client 208 may comprise functionality for presenting the categorized objects and/or meta-model to a user or administrator. In some such embodiments, presenting the objects and or meta-model may comprise creating and presenting a report, and may include analysis of severity of required upgrades, expected processing time, percentage of upgrade that may be performed automatically, and/or cost to perform upgrading of the source installation.

Transformer 230 may comprise one or more applications, logic, functions, services, routines or executable instructions of any type or form, for transforming a meta-model from one corresponding to one installation of an application, to one corresponding to another installation of an application, such as between a first and second or subsequent installation of the application. In some embodiments, transforming a meta-model comprises applying rules for modifying an object from a syntax or code language associated with the first installation to a syntax or code language associated with the second installation. For example, in one embodiment, a first language may include a function for allowing text input into a database. The second language may include a similar function, but add different possible text encodings, such as Unicode Transformation Format (UTF)-8 or punycode. In such an embodiment, the transformer 230 may apply a rule indicating to add a default encoding type to the function. Thus, the object utilizing the function may then be used by the second installation with the second language and syntax. In some embodiments, transformer 230 further comprises functions for error checking transformed objects for compliance with rules, language, and/or syntax standards. In another embodiment, transformer 230 further comprises functions for uploading transformed objects to target installation 224.

As shown, analysis agent 228 and transformer 230 may, in some embodiments, be configured to use RFC users 216A-216C on the solution manager 212, source installation 220, and target installation 224, respectively. This may enable analysis agent 228 and transformer 230 to retrieve and input data, code, and objects from and to these three systems. In a further embodiment, transformer 230 may be configured to use tool user 226 on target installation 224. This may enable transformer 230 to interact with system objects of the target installation 224 that an RFC user may not be privileged to modify.

Also shown in FIG. 2B, configuration client 210 may, in some embodiments, comprise a configuration agent 232 and/or a manual conversion agent 234. In some embodiments, configuration agent 232 and manual conversion agent 234 may be configured to use Dialog Users 218A-218C, as shown. This may enable a user or administrator interacting with configuration agent 232 and/or manual conversion agent 234 to further interact with solution manager 212, source installation 220, and/or target installation 224. In an embodiment not illustrated, configuration agent 232 and/or manual conversion agent 234 may also be able to control or interact with analysis agent 228 and/or transformer 230 for the purpose of modifying their settings.

Configuration agent 232 may comprise one or more applications, routines, services, functions or executable instructions of any form or type for configuring a rules engine 248, discussed in more detail below. In other embodiments, configuration agent 232 may comprise functions for configuring solution manager 212, source installation 220, and/or target installation 224. For example, in one such embodiment, configuration agent 232 may configure the solution manager 212 to only scan certain databases when snapshotting and categorizing objects.

Manual conversion agent 234 may comprise one or more applications, routines, services, functions or executable instructions of any form or type for allowing a user or administrator to perform modifications to objects categorized for semi-automatic or manual upgrade. In some embodiments, manual conversion agent 234 may present a dialog to a user, indicating the object to be upgraded, and a language or syntax issue that could cause an error if the object is installed in target installation 224. In some embodiments, manual conversion agent 234 may also present suggested modifications to the object, based on rules applied by the analysis agent 228. In further embodiments, manual conversion agent 234 may comprise functions for modifying the object, responsive to an instruction from the user. In a further embodiment, manual conversion agent 234 may comprise functions for uploading the modified object to target installation 224 and/or analyzer client 208. In one example embodiment, the manual conversion agent 234 may present a dialog to a user indicating that an object of the source installation, when upgraded to the target installation, may perform an illegal operation due to differences in syntax, such as dividing by a variable that has been set to zero. The user may instruct the manual conversion agent 234 to make a modification, such as changing the value of the variable, or directing the operation to a different variable.

Figure 2C:
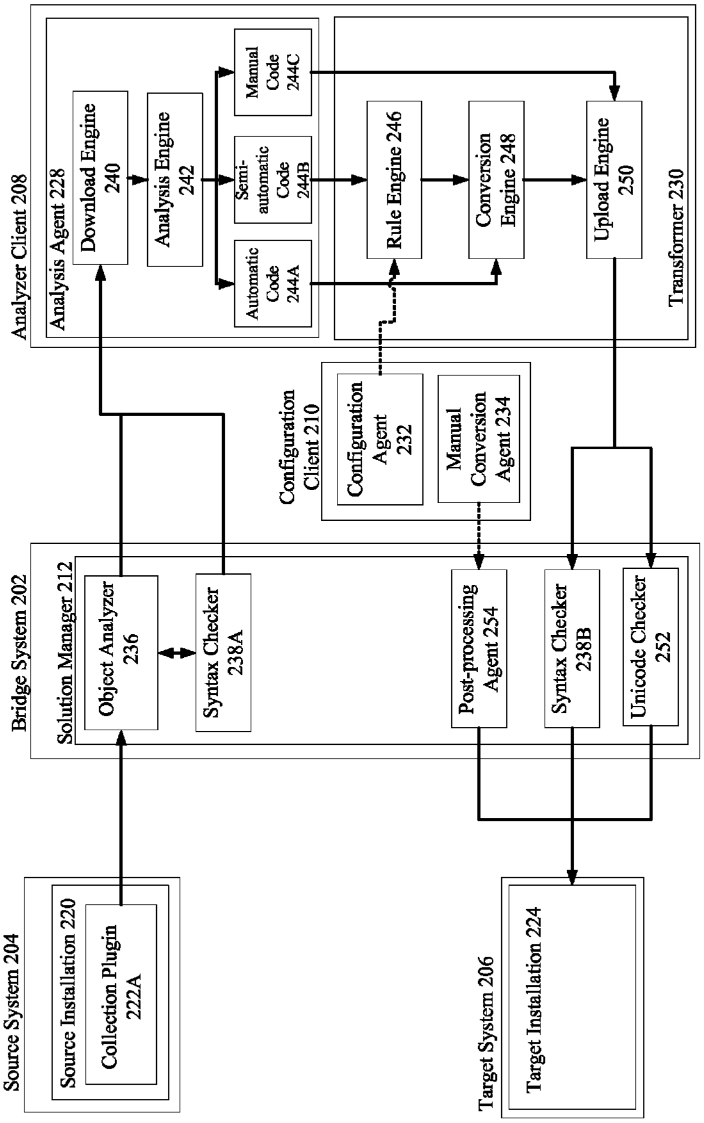
FIG. 2C is block diagram of another embodiment of an appliance for analyzing and transforming an application from a source installation to a target installation.

Shown in FIG. 2C is another embodiment of a system for analyzing and transforming an application from a source installation to a target installation. In brief, source system 204 may comprise a source installation 220 and collection plugin, 222A, discussed above. Bridge system 202 may comprise a solution manager 212, discussed above, which may comprise an object analyzer 236, syntax checkers 238A-238B, unicode checker 252 and post-processing agent 254. Analyzer client 208 may comprise an analysis agent 228, which may further comprise a download engine 240 and an analysis engine 242. The analysis engine may categorize code as automatic code 244A, semi-automatic code 244B, or manual code 244C. Semi-automatic code 244B is passed to a rule engine 246 configured on transformer 230. Rule engine 246 may apply rules to the semi-automatic code 244B, and pass the code to conversion engine 248. Automatic code 244A is passed from the analysis agent 228 to the conversion engine 248. Automatic code 244A and semi-automatic code 244B are passed from the conversion engine 248 to the upload engine 250. The upload engine 250 may upload converted automatic code 244A and semi-automatic code 244B and unconverted manual code 244C to bridge system 202 and solution manager 212. Configuration client 210 may comprise a configuration agent 232, which may configure rule engine 246 of transformer 230, and a manual conversion agent 234, which may interact with post-processing agent 254 of solution manager 212. Although not shown, solution manager 212 may, in some embodiments, comprise an upload engine 250' for transmitting processed and converted code to target installation 224 of target system 206.

Still referring to FIG. 2C and in more detail, solution manager 212 may be configured with an object analyzer 236. In some embodiments, object analyzer 236 may comprise one or more applications, routines, services, functions or executable instructions of any form or type for analyzing an object obtained from collection plugin 222A. Although not shown, object analyzer 236 may further comprise functions for downloading objects identified by collection plugin 222A, such as a collection agent 214 discussed above. Analyzing an object, as discussed above in connection with solution manager 212, may comprise determining if the object is compliant with a standard syntax and identifying the object, responsive to the determination, as compliant or non-compliant. Accordingly, and as shown, object analyzer 236 may interact with syntax checker 238A. In some embodiments, syntax checker 238A is a separate process, while in others, syntax checker 238A is a function or subroutine of object analyzer 236. In still other embodiments, object analyzer 236 may be a function or subroutine of syntax checker 238A.

Syntax checker 238A may, in some embodiments, comprise one or more applications, routines, services, functions or executable instructions of any form or type for comparing an object to a standard syntax. In some embodiments, syntax checker 238A may comprise associated libraries, dictionaries, databases, or other data structures identifying syntax, functions, connectors, comments, instructions, code, or other objects of one or more languages. For example, in one embodiment, syntax checker 238A may include or be associated with a library defining objects in the Advanced Business Application Programming (ABAP) language designed by SAP AG of Walldorf, Germany. In another embodiment, syntax checker 238A may include a library defining objects in Java, PHP, Python, Perl, SQL, or any other code language. In some embodiments, syntax checker 238A compares code within an object identified by or obtained from collection plugin 222A with code in the library defining objects in a related language. In one example embodiment, syntax checker 238A receives an object from collection plugin 222A that comprises a WRITE command. The syntax checker 238A compares the object to a dictionary, which indicates that the WRITE command has been replaced by a WRITE TO command. Responsive to this comparison, the syntax checker 238A and/or object analyzer 236 identifies the object as being non-compliant. In some embodiments, the identification of an object as compliant or non-compliant may be in a separate object, database, registry, or data structure, while in other embodiments, the identification may be inserted into the object.

As shown, analysis agent 228 may include a download engine 240. Download engine 240 may comprise hardware and/or software components comprising functions or executable instructions for downloading one or more objects and/or identifications of objects as compliant or non-compliant from solution manager 212. In some embodiments, download engine 240 utilizes an RFC user account on solution manager 212 to download objects and/or identifications, as discussed above.

Analysis engine 242 may, in some embodiments, comprise one or more applications, routines, services, functions or executable instructions of any form or type for analyzing a capability of an object for upgrade to a target installation. For example, in one embodiment, an object identified as compliant with syntax of the language of the target installation may be determined to be capable of automatic upgrading and be identified as automatic code 244A. In one such embodiment, the object may need no modifications to be used by the target installation 224. In another such embodiment, the object may be identified as non-compliant, but need only minor modifications. For example, a comment indicator (") used by the language of the source installation may be converted to a comment indicator (#) of the language the target installation without requiring additional analysis. Similarly, a function that included no variables in the source installation, such as CLOSE may be converted to a function that includes optional variables in the target installation, such as CLOSE( ), without requiring additional analysis.

In another embodiment, analysis engine 242 may determine that a non-compliant object needs modifications that may be performed automatically, but also needs modifications that require additional input, such as from a user or developer. This may be referred to as semi-automatic code. For example, in one embodiment, source installation objects may include unicode characters, binary data, or a mix of binary data. In one such embodiment, the target installation may include a function that interacts with objects differently if they are binary or unicode. In such an embodiment, the analysis engine 242 may indicate that some of the objects—those that are solely binary or unicode—may be converted automatically, while objects that are mixed binary and unicode may require a user to designate a mode. In such an embodiment, analysis engine 242 may indicate that the objects are semi-automatic code 244B. In another example, an object of the source installation may contain a function that writes into a database. In one such embodiment, the target installation may have more than one corresponding database. For example, source installation 220 may be a single user environment and have only one user database, while target installation 224 may be a multi-user environment. In some embodiments, the WRITE function may need to have modifications that can be performed automatically, such as the addition of optional variables, or conversion to a WRITE TO statement, and modifications that require input from a user, such as a path to a specific directory or database in the multi-user environment of the target installation. Again, in such an embodiment, analysis engine 242 may indicate that the objects are semi-automatic code 244B.

In another embodiment, analysis engine 242 may indicate that a non-compliant object may not be automatically or semi-automatically converted to the language and/or syntax of the target installation 224, and may identify the object as manual code 244C. For example, a source installation object may use a function of the source installation language that has been obsoleted or for which no corresponding function exists in the target installation. In one such embodiment, the source installation object may read from a common memory. However, in the target installation, a common memory may have been replaced by isolated memory for privacy and security reasons. Accordingly, a READ COMMON function may be obsolete. Upgrading the function or an object using the function may, in such an embodiment, require further input not available to the transformer 230. Responsive to this determination, analysis engine 242 may indicate that the object is manual code 244C.

In further detail of some of the embodiments of automated systems and methods, an object of a source installation may have elements capable of being upgraded, transformed, or converted to a language and syntax of a target installation in a manner essentially independent of additional user, developer input, or other external control. These elements may be referred to as automatic code, or automatic elements. In other embodiments, an object may have elements that are incapable of being upgraded, transformed, or converted to a language and syntax of a target installation in a manner essentially independent of additional user, developer input, or other external control. These elements may be referred to as manual code, or manual elements. In some embodiments, an object may have a combination of both automatic elements and manual elements. In these embodiments, the ratio of elements that are capable of upgrade to elements in the object may used to determine an automation value for the object. In further embodiments, the automation value may be compared to one or more thresholds. For example, if the automation value is equal to or less than a first threshold, the object may be categorized as manual. If the automation value is equal to or greater than a second threshold, the object may be categorized as automatic. If the automation value is greater than the first threshold, but less than the second threshold, the object may be categorized as semi-automatic. In some embodiments, the first threshold may be set at zero, such that an object may be categorized as manual only if it has no elements that are capable of upgrade. In other embodiments, the second threshold may be set at 1, such that an object may be categorized as automatic only if it has no elements that are incapable of upgrade.

In a further embodiment, analysis engine 242 may create a meta-model representative of one or more objects of source installation 220. The meta-model, in some embodiments, may be a syntax tree or abstract syntax tree, and may represent relationships between the one or more objects of the source installation 220. In further embodiments, the meta-model may be presented to a user in either a textual or graphical format. In additional embodiments, the meta-model may contain links to corresponding source code of the one or more objects. In such embodiments, an element in the meta-model may maintain or include a reference to the original source file and line number. In further embodiments, the meta-model may also comprise a mapping of elements to objects. The meta-model, in many embodiments, is a generic structure of nodes, representing objects, and connectors, representing relationships between objects. In such embodiments, the meta-model has no syntax itself and does not correspond to a specific language. In additional embodiments, the meta-model may be used for processing and transforming objects of the source installation into objects usable by the target installation by finding and replacing patterns of connections. In some embodiments, the meta-model may map mutual relationships between objects and characterize relationships as static or dynamic. In such embodiments, a dynamic relationship between objects may change during runtime. For example, a first object may depend alternately on a second object or a third object, responsive to an indicator within a fourth object. When the indicator within the fourth object changes, the first object's dependency likewise changes. In other embodiments, the meta-model may map the relationship of objects to other system entities, such as data elements, operating system programs, system application programs, transactions, environment settings, etc.

In some embodiments, analysis engine 242 may further comprise functions for inserting comments into source code of an object. These comments may indicate suggested modifications to the object or potential errors or warnings if the object is not further modified. For example, as discussed above, an object classified as semi-automatic code 244B may require explicit identification of a working directory on the target installation 224 that does not correspond to a directory existing on source installation 220. Accordingly, analysis agent may add a comment to source code of the object indicating that a user should add explicit identification of a working directory.

Analysis agent 242 may also, in some embodiments, comprise functions or executable instructions for generating a report and/or presenting the report to a user. In these embodiments, the report may include analysis of ratios of automatic code, semi-automatic code, and manual code 244A-244C, and may include descriptions of objects, likelihood of errors when transforming objects, estimated time and/or cost to transform objects, and may include graphs, charts, and/or text. The report may also include a graphical or textual representation of the meta-model.

In additional embodiments, analysis agent 242 may be configured by a user with analysis rules. In these embodiments, analysis rules may be used to ensure that relevant information of interest to the user will be analyzed while increasing efficiency of analysis by ignoring other information. For example, rules may be set to allow analysis of just compliant or non-compliant objects, rather than both sets of objects. In some embodiments, rules may be selected to allow or disallow analysis of objects with unicode violations; analysis of objects that must change with a transformation; analysis of obsoleted objects; analysis of statistics relating to the transformation, such as time and/or cost; and analysis of transformations in specified languages, such as ABAP or Java. As referred to herein, unicode may be source code that complies with syntax and language rules of the target installation. Although referred to as unicode, it does not designate a specific embodiment of unicode, such as the unicode standard for text. Rather, unicode may simply refer to a language utilized by a target or source installation, such as Java, Python, Perl, PHP, or any other type and form of computing language. In additional embodiments, analysis rules may be configured to determine elements in the meta-model that match customer-defined characteristics, such as invocation of customer programs, use of text, specified modification dates, or any other type and form of information relating to or associated with an element.

In some embodiments, the analysis agent 242 may be used outside of a transformation context, to analyze custom code for objects in a source installation as they are being written. For example, the analysis agent may be used to measure whether coding standards are being followed, by determining if an object may be classified as automatic code 244A for transformation to a hypothetical target installation 224 that is identical to source installation 220. A determination that the object is semi-automatic code 244B or manual code 244C may indicate that additional data should be added to the object, such as full path names to directories or explicit indication of ASCII or binary data in a string.

As shown in FIG. 2C, transformer 230 may include a rule engine 246. In some embodiments, this rule engine may be configured by a configuration agent 232 on configuration client 210. Rule engine 246 may comprise an application, process, agent, function, routine, logic, or any type and form of executable instructions for modifying semi-automatic code 244B in accordance with rules selected or configured by a user using configuration agent 232. For example, as described above, an object classified as semi-automatic code 244B may require explicit identification of a working directory on the target installation 224 that does not correspond to a directory existing on source installation 220. A user may select or configure a rule that identifies a working directory to be added to the source code of the object. Rules engine 246 may then apply this rule and modify the object accordingly. In some embodiments, selecting or configuring rules may be referred to as parameterization.

Objects that are identified as automatic code 244A or have been modified by the rules engine 246 may, in some embodiments, be sent to conversion engine 248. Conversion engine 248 may comprise an application, process, agent, function, routine, logic, or any type and form of executable instructions for transforming objects from a language associated with a source installation to a language associated with a target installation. In many embodiments, rules engine 246 and conversion engine 248 may comprise similar functionality, with conversion engine 248 applying preset or predetermined rules. In such embodiments, conversion engine 248 may comprise or be associated with a database or data structure containing predetermined rules for a language or languages to allow conversion. Unlike rules configured by configuration agent 232 and applied by rules engine 246, rules applied by the conversion engine 248 may, in some embodiments, be unmodifiable by a user. In some embodiments, rule engine 246 and conversion engine 248 may be combined, and may use a single rules database. In further embodiments, configuration agent 232 may be permitted to modify only a subset of predetermined rules in the rules database. One example of a predetermined rule may be a rule indicating that a comment tag from a language associated with a source installation (“) may be transformed or modified to a comment tag from a language associated with a target installation (#). Accordingly, in one embodiment of this example, conversion engine 248 may replace comment tags in a source code of an object responsive to the rule.

As shown, transformer 230 may further comprise an upload engine 250. Upload engine 250, similar to download engine 240, may comprise hardware and/or software components for uploading or transferring objects to bridge system 202. In some embodiments and as illustrated, upload engine 250 may upload converted or transformed automatic code and semi-automatic code 244A-244B, and may further upload unconverted manual code 244C. In some embodiments, download engine 240 utilizes an RFC user account on solution manager 212 to upload objects, as discussed above.

Solution manager 212 may further comprise a unicode checker 252 and a syntax checker 238B, as shown in FIG. 2C. Unicode checker 252 may comprise an application, process, agent, function, routine, logic, or any type and form of executable instructions for checking unicode compliance of a transformed object. Similarly, syntax checker 238B may comprise an application, process, agent, function, routine, logic, or any type and form of executable instructions for checking object compliance with syntax of a language associated with target installation 224. In some embodiments, responsive to failure to comply with syntax and/or unicode, solution manager 212 may present warnings or errors to a user. In other embodiments, responsive to failure to comply with syntax and/or unicode, solution manager 212 may send the object back to analysis agent for re-analysis and re-transformation.

Solution manager 212 may comprise a post-processing agent 254. Post-processing agent 254 may comprise an application, process, agent, function, routine, logic, or any type and form of executable instructions for modifying an object, responsive to instructions from a user interacting with manual conversion agent 234, on configuration client 210. In some embodiments, manual conversion agent 234 may comprise an editing application allowing a user to modify source code of an object, and may include features such as automatic recognition of functions of a language; display of comments, such as those inserted by analysis engine 242; and any other features useful to a developer. Although not shown, post-processing agent 254 and manual conversion agent 234 may comprise functionality for communicating over a network to allow a user interacting with configuration client 210 to modify an object stored on bridge system 202. In an example embodiment, an object categorized as manual code 244C may be edited by a user via manual conversion agent 234 and post-processing agent 254 to repair unicode, functions, language features and/or syntax inconsistent with a language associated with target installation 224.

Although not illustrated in FIG. 2C, solution manager 212 or bridge system 202 may further comprise hardware and/or software components for uploading modified and/or post-processed objects to target installation 224.

Figure 2D:
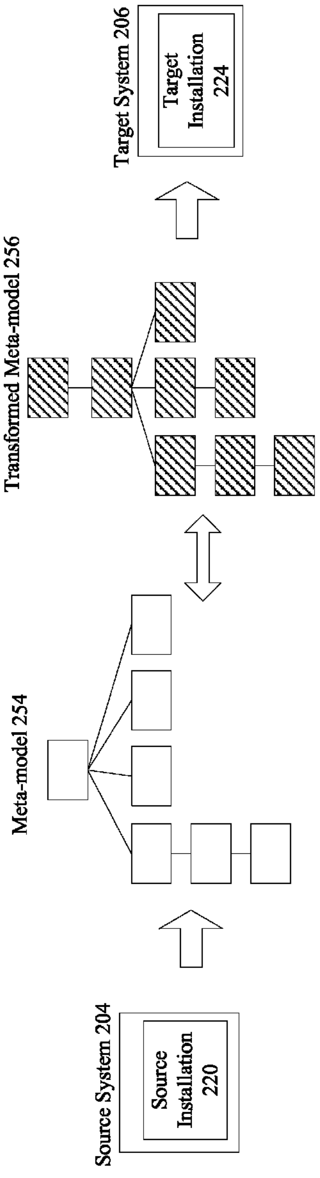
FIG. 2D is a block diagram of an embodiment of an analysis and transformation of a source installation into a target installation.

Referring now to FIG. 2D, illustrated is a block diagram of an embodiment of an analysis and transformation of a source installation into a target installation. As described above, a source installation 220 on source system 204 may be analyzed to create a meta-model 254. As shown, meta-model 254 may comprise objects, or nodes, and links or structure representative of dependencies and interactions between nodes. In some embodiments, the meta-model 254 may be transformed into transformed meta-model 256, responsive to predetermined rules and/or configured rules. For example, in a language associated with source installation 220, a first node representing an function may be dependent on a second node representing an included library of the function. However, in a language associated with target installation 224, the first node representing the function may be dependent on both a second and third node representing two included libraries. Alternately, the first node representing the function may, in the language associated with the target installation 224 have no dependencies due to explicit inclusion of code in the included library. Accordingly, in this example embodiment, transforming the meta-model 254 to transformed meta-model 256 may comprise moving the first node representing the function to a higher level within the abstract syntax tree.

Figure 2E:
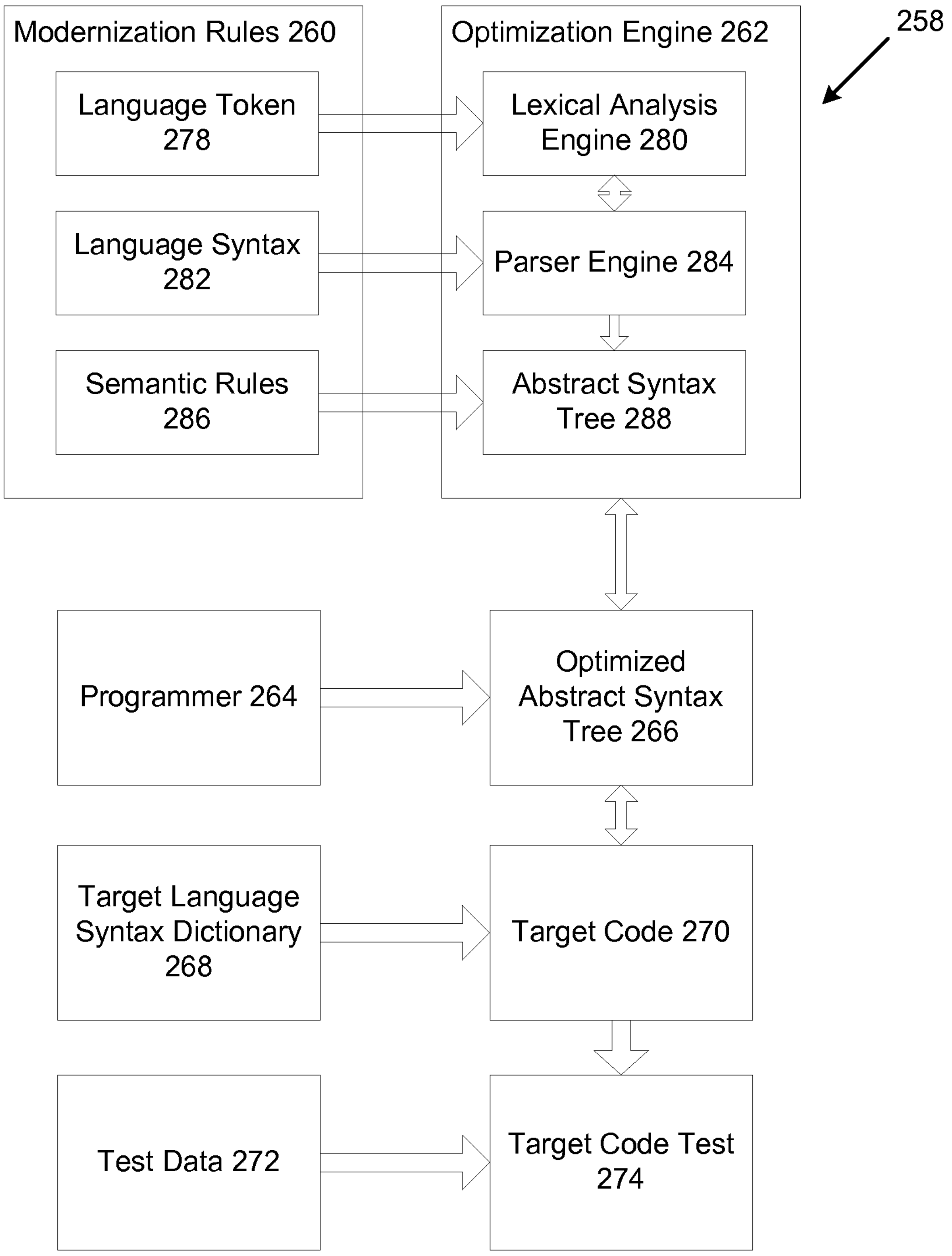
FIG. 2E is a block diagram of an embodiment of a transformation process.

Shown in FIG. 2E is a block diagram of an embodiment of a transformation process 258. In brief, an optimization engine 262 may apply modernization rules 260 to create an optimized abstract syntax tree 266. The optimized abstract syntax tree 266 may be further modified by a programmer 264 to create target code 270, associated with a target language syntax dictionary 268. Using test data 272, the target code may be tested at 274.

Still referring to FIG. 2E and in more detail, modernization rules 260 may include a language token or tokens 278, language syntax 282, and semantic rules 284. A token 278 may be a structured element of code as defined by the source language. For example, in the expression “print=(hello world);”, tokens 278 include “print”, “=”, “(”, “hello”, “ ”, “world”, “)”, and “;”. Determining tokens in source code is sometimes referred to as tokenization or tokenizing, and may, in some embodiments, be performed by lexical analysis engine 280, and configured on optimization engine 262. In some embodiments, language tokens 278 may be codified and, in some embodiments, stored in a database, dictionary, or other data structure.

Lexical analysis engine 280 may comprise an application, process, agent, function, routine, logic, or any type and form of executable instructions for locating and interpreting language tokens within source code of an object, as described above.

Language syntax 282 may be a representation of a grammar system within a language. A grammar may, in some embodiments, address location and manipulation of tokens. For example, a token of a semi-colon, used in the above example, may indicate in a language that it is the end of a statement. Tokens after the semi-colon may apply to the following statement, while those before the semi-colon apply to the preceding statement. Language syntax 282 may, in some embodiments, be stored in a database, dictionary, or other data structure. In some embodiments, parser engine 284, configured on optimization engine 262 may use grammar identified by language syntax 282 to parse tokens identified by lexical analysis engine 280. This may be referred to variously as syntactic analysis, semantic parsing, parsing, or analyzing.

As shown, parser engine 284 may comprise an application, process, agent, function, routine, logic, or any type and form of executable instructions for interpreting language tokens located in a source code with language syntax 282 to create an abstract syntax tree 288, also referred to above as a meta-model 254, by applying semantic rules 286. Semantic rules 286 may, in some embodiments, be stored in a database, dictionary or other data structure accessible to parser engine 284. In some embodiments, parser engine 284 may comprise a top-down parser, such as a recursive descent parser, or a Left-to-right, Leftmost derivation (LL) parser. In other embodiments, parser engine 284 may comprise a bottom-up parser, such as a precedence parser, a bounded context (BC) parser, or a Left-to-right, Rightmost derivation (LR) parser.

Using any of the methods or functions described herein, programmer 264 may convert abstract syntax tree 288 to an optimized abstract syntax tree 266. Programmer 264 may, in some embodiments, comprise part or all of analysis agent 228, discussed in more detail above. Optimized abstract syntax tree 266 may be a transformed meta-model 256, discussed above. In some embodiments, optimization of an abstract syntax tree 266 may be performed responsive to semantic rules and language syntax associated with a target language syntax dictionary 268. Objects of a source installation may be transformed to target code 270, responsive to differences between the optimized abstract syntax tree 266 and abstract syntax tree 288.

In some embodiments, test data 272 may be applied to target code 270 for testing purposes 274. In further embodiments, testing may be performed by a user, while in other embodiments, testing may be performed by a service or application identifying errors such as buffer overruns, unescaped loops, and other programming errors.

Figure 3:
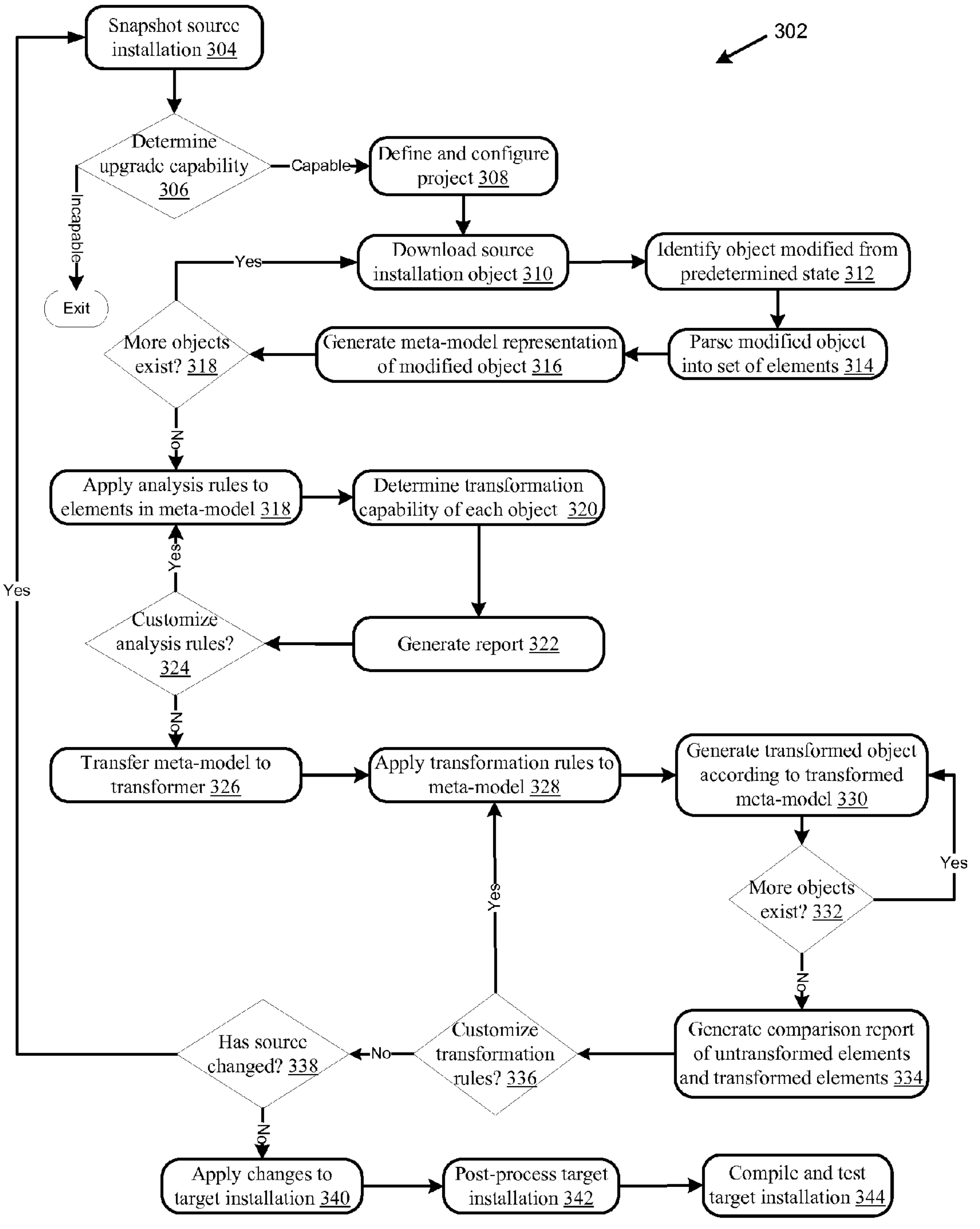
FIG. 3 is a flow chart of an embodiment of a method of analyzing and transforming an application from a source installation to a target installation.

Shown in FIG. 3 is a flow chart illustrating an embodiment of a method 302 of analyzing and transforming an application from a source installation to a target installation. In brief, at step 304, a snapshot is taken of a source installation. At step 306, a determination is made as to whether the source installation may be upgraded. If the source installation cannot be upgraded, the method exits and may, in some embodiments, return an error or display further instructions. If the source installation may be upgraded, then at step 308, the project is defined and configured. At step 310, an object may be downloaded from the source installation. At step 312, an identification of the object may be made to determine if it has been modified from a predetermined state. In some embodiments not illustrated, responsive to a determination that the object has not been modified, the object may be discarded, and the method may move to step 318, described below. If the object has been modified, then at step 314, the object may be parsed into a set of elements. At step 316, a meta-model may be generated representing the modified object. At step 318, a determination may be made as to whether more objects exist in the source installation. If so, steps 310-318 may be repeated. In some embodiments, repetition of step 316 may comprise modifying a generated meta-model to include representations of each additional modified object parsed during repetitions of step 314.

At step 318, analysis rules may be applied to each element in the meta-model. At step 320, a determination may be made as to the transformation capability of each object. At step 322, a report may be generated and, in some embodiments, displayed to a user. At step 324, the user may customize analysis rules. If analysis rules have been customized, then steps 318-324 may be repeated. If analysis rules are not customized at step 324, then at step 326, the meta-model may be transferred to a transformer, discussed above. At step 328, transformation rules may be applied to the meta-model to create a transformed meta-model. At step 330, an object may be modified to generate a transformed object, responsive to dependencies and rules associated with the transformed meta-model. At step 332, a determination may be made as to whether more objects exist. If so, steps 330 and 332 may be repeated. If not, then at step 334, a comparison report may be generated comparing transformed objects with their untransformed states. At step 336, a user may customize transformation rules. If the rules are customized, then steps 328-336 may be repeated. At step 338, the snapshot taken at step 304 may be compared with a current state of the source installation. If the source installation has changed, then steps 304-338 may be repeated.

At step 340, transformed objects may be uploaded to the target installation. At step 342, the target installation may be post-processed, which may comprise making additional manual changes to objects uploaded to the target installation. At step 344, the target installation may be compiled and/or tested.

Still referring to FIG. 3 and in more detail, at step 304, a snapshot may be taken of a source installation. As described above, in some embodiments, taking a snapshot may comprise storing a copy of one or more objects of a source installation as they exist at a certain time. In further embodiments, only part of the source installation may be snapshotted. For example, in one such embodiment, only customized or modified objects of the source installation may be snapshotted, to save analyzing unnecessary elements.

At step 306, in some embodiments, a determination may be made whether the source installation may be upgraded. For example, in one such embodiment, the source installation may already have been upgraded to the same version as the target installation, and thus not require upgrading. In some embodiments, the source installation and target installation may not be compatible for an upgrade. In some embodiments, the system determines the number of changes, issues or non-compliancy exceed a predetermined threshold for upgrading to the target system.

At step 308, the project may be defined and configured. In some embodiments, defining and configuring the project may comprise selecting a version and/or language for a target installation. In additional embodiments, configuring the project may comprise installing and configuring a target installation in a default or predetermined state, lacking customized objects. In a further embodiment, configuring the project may comprise setting up RFC, Dialog, and Tool user accounts, as discussed above.

At step 310, an object may be downloaded from a source installation, using any of the methods and systems described herein, such as a collection agent and a collection plugin. At step 312, the object may be identified as modified from a predetermined state. In an alternate embodiment not shown, steps 310 and 312 may be reversed, such that objects are identified as modified before they are downloaded. Such an embodiment may allow the system to avoid downloading unmodified objects, as discussed above. In some embodiments, identifying an object modified from a predetermined state may comprise identifying an object that does not exist in a source installation. For example, a custom database may not exist in a default source installation, and accordingly may be considered to be a modified object.

At step 314, the object may be parsed into a set of elements, using any of the methods and systems described herein. For example, an object source code may be tokenized and parsed to determine elements and relationships between elements.

At step 316, a meta-model may be created and/or modified to include the elements and relationships identified at step 314, using any of the methods and systems described above. For example, creating the meta-model may comprise creating an abstract syntax tree representative of the elements and their interrelationships. The system may generate a meta-model for all the elements of the source installation. In some embodiments, the system may generate a meta-model for a portion of elements of the source installation, such as the elements identified as changed from the predetermined state.

At step 318, a determination may be made as to whether more objects and/or modified objects exist in the source installation, and if so, steps 310-318 may be repeated. In some embodiments, this determination may be made by comparing the number of nodes in the meta-model with the number of identified objects in the source installation snapshot. In other embodiments, this determination may be made by failing to locate an additional object or modified object that has not yet been downloaded and parsed.

At step 318, analysis rules may be applied to each element in the meta-model. At step 320, a transformation capability may be determined for each object. For example, an object may be classified as automatic code, semi-automatic code, or manual code, as described above. At step 322, a report may be generated. In some embodiments, applying analysis rules comprises performing the functions described above in connection with the analysis client and/or analysis engine. In additional embodiments, generating a report comprises analyzing statistics of the transformation capability of each object, such as determining ratios of automatic, semi-automatic, and manual code, and determining cost and/or time to perform upgrades, as described above.

At step 324, analysis rules may be customized, and steps 318-324 repeated. For example, responsive to determining that upgrading may be too costly due to a large number of objects to be transformed, a user may modify analysis rules to exclude a portion of the objects. Steps 318-324 may be repeated in some embodiments until the user is satisfied with the outcome indicated by the generated report.

At step 326, the meta-model may be transferred to the transformer. In some embodiments, transferring the model may comprise transmitting the model to the transformer, while in other embodiments, transferring the model may comprise the analysis client instructing the transformer to access the model on a shared memory element.

At step 328, the transformer may apply transformation rules to the meta-model to generate a transformed meta-model, using any of the systems and methods discussed herein. In one embodiment, applying transformation rules may comprise locating a pattern in the meta-model corresponding to an entry in a transformation rule database. In a further embodiment, applying transformation rules may comprise modifying an abstract syntax tree according to a rule associated with an entry in a transformation rule database. For example, in one such embodiment, the transformer may determine that a first element is dependent on a second element. The transformer may further determine that the second element is a function call, such as a WRITE instruction. The transformer may locate a rule in the rule database associated with target installation language matching a first element dependent on a WRITE instruction, and apply the rule to modify the WRITE instruction to a WRITE TO instruction.

At step 330, in some embodiments, the transformer may generate a transformed object according to the transformed meta-model. In some embodiments, generating a transformed object comprises modifying a source object. In other embodiments, generating a transformed object comprises generating a new object. In one embodiment, a transformed object may be generated responsive to transformation rules, discussed above. For example, an object including code representing a WRITE instruction, as discussed at step 328, may be modified to include code representing a WRITE TO instruction. Further changes may be made responsive to transformation rules and/or the transformed meta-model. For example, a first object dependent on a second object in the original meta-model may be dependent on a third and fourth object in the transformed meta-model. Accordingly, at step 330, the transformer may replace, in source code of the first object, references to the second object with references to the third and/or fourth object. In an example of one such embodiment, in a source installation, a first object comprising a human resources database, may be dependent on another object comprising an organizational hierarchy. However, in the transformed meta-model, the human resources database may further comprise organizational hierarchy and not be dependent on a second object. Accordingly, in this example embodiment, the transformer may modify the first object to further comprise fields indicating levels and interconnections previously described in object comprising the organizational hierarchy. In further embodiments, generating a transformed object may comprise generating an object that possesses desired characteristics defined by the transformation rules, such as being free of syntax violations and/or naming convention errors, or any other type of characteristic of a source code that may be desired by a user.

At step 332, a determination may be made if more objects exist, using similar methods to those described above at step 318. If so, steps 330-332 may be repeated.

At step 334, a comparison report may be generated. In one embodiment, a comparison report comprises a comparison of untransformed elements and/or objects and transformed elements and/or objects. In a further embodiment, the comparison report may be displayed or presented to a user. For example, in an embodiment of the example discussed above at step 330, a report may be generated showing (a) the first object comprising the human resources database with source code showing dependency on the second object comprising the organizational hierarchy; and (b) the first object comprising the human resources database with source code showing no dependency on the second object, but rather including additional data representing the hierarchical levels and interconnections.

At step 336, the user may customize the transformation rules. In some embodiments, this may be done for increasing efficiency, adjusting for undesired behavior, or any other reason. Referring to the example discussed above at step 334, a user may decide that it is preferable to maintain the separate human resources database and organizational hierarchy, and may adjust the transformation rules to exclude or disable this transformation. In another example, an organization may be expanding simultaneously with upgrading, and may be adding additional manufacturing locations. In such an example, a user may modify the transformation rules to incorporate the additional resources for each new manufacturing location, such as additional inventory databases, additional shipping locations, or any other type and form of resource or object. In some embodiments, if the user has customized or modified the transformation rules, steps 328-336 may be repeated.

At step 338, the analysis client may determine if the source installation has changed since the snapshot was taken. This could occur, for example, if analysis, transformation, and customization have taken a significant amount of time. If so, steps 304-338 may be repeated. In some embodiments, repeating steps 304-338 may comprise repeating steps 304-338 only on objects that have been modified in the source installation since the previous snapshot. These embodiments may reduce analysis, transformation, and customization time greatly, as only objects that have changed will need to be re-analyzed and transformed. In further embodiments, transformed objects that have not changed in the source installation may be stored on a storage element until the determination at step 338 indicates that no further changes have occurred in the source installation.

Responsive to no further changes having occurred in the source installation since the previous snapshot was taken, at step 340, the object transformations may be applied to the target installation. In some embodiments, applying the transformations may comprise uploading or transmitting transformed elements and/or objects to the target installation, using any of the methods or systems discussed herein.

At step 342, the target installation may be post-processed. In some embodiments, post-processing the target installation may comprise editing manual or semi-automatic code, as discussed above. In additional embodiments, post-processing the target installation may comprise optimizing the installation. For example, optimization may include compressing the installation, removing unnecessary comments and/or code, cleaning up or removing unused variables, or any other type and form of source code optimization.

At step 344, the target installation may be tested. In some embodiments, step 344 may further comprise compiling the target installation. In other embodiments, the target installation does not require compiling, for example, if all objects are XML objects. In some embodiments, testing the target installation comprises installing test data to the target installation, performing modifications to objects and databases, and verifying expected results. In some embodiments, responsive to errors during testing, one or more steps of method 302 may be repeated, for example steps 328-344.

C. Example Embodiment of a System for Analyzing and Transforming an Application from a Source Installation to a Target Installation Shown in FIGS. 4-14 are screenshots of an exemplative embodiment of a system for analyzing and transforming an application from a source installation to a target installation. The screenshots are intended for illustrative purposes only and are not intended to be limiting. In some embodiments, these screenshots may be presented to a user using an analysis client and/or configuration client, described above. In the following descriptions, the system will be referred to as executing on a client. However, in many embodiments, the system may execute on a bridge system, a source system, or a target system, described above.

Figure 4:
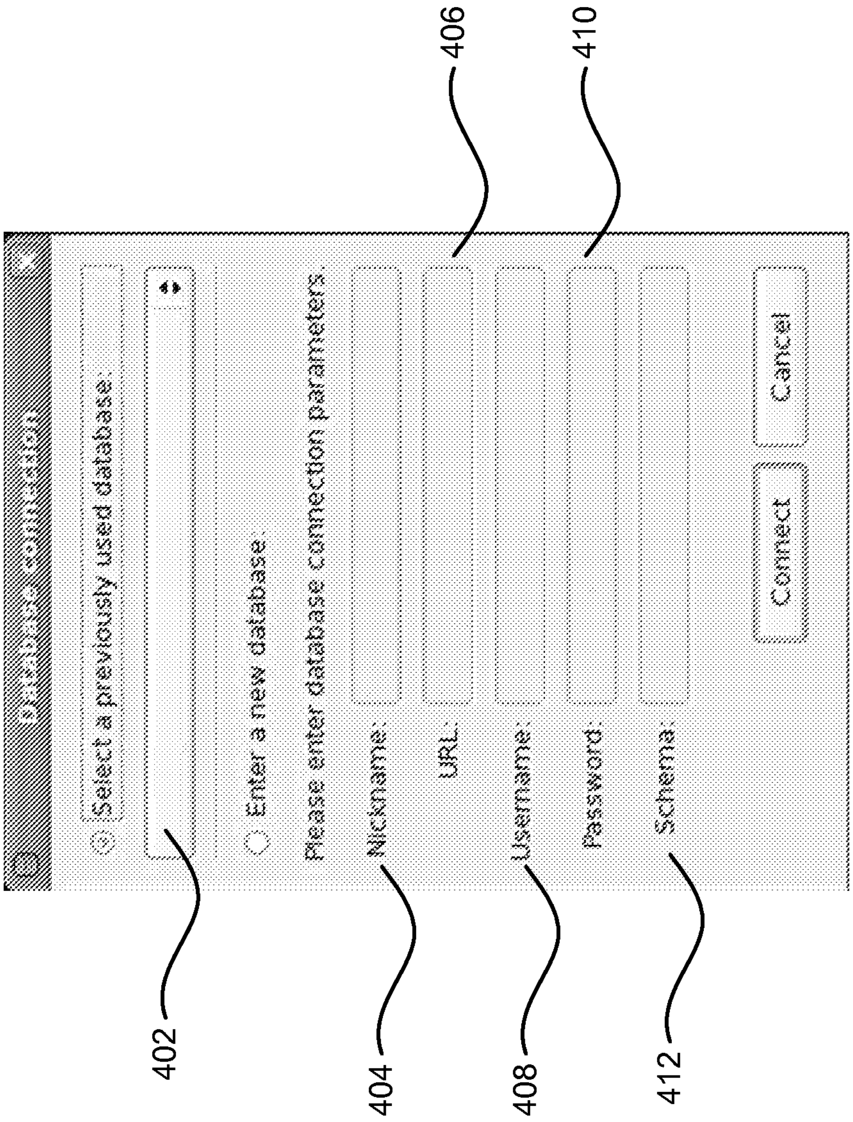
FIGS. 4-14 are screenshots of an embodiment of an application for analyzing and transforming an application from a source installation to a target installation.

Shown in FIG. 4 is a screenshot of an exemplative embodiment of a database connection window. In some embodiments, the database connection window may provide a list 402 of databases previously used or connected to. Selecting a database from the list of previously used databases may, in some embodiments, allow a user to avoid having to type in one or more of a nickname 404, URL 406, username 408, password 410, and schema 412. In some embodiments, previously entered nicknames 404 may be displayed in list 402. In other embodiments, list 402 may display URLs 406 of previously used or connected to databases. In some embodiments username 408 and password 410 may provide authentication, such as that discussed with regard to RFC users, dialog users, and tool users, above. In some embodiments, schema 412 may comprise an indicator of a type of communication. For example, schema 412 may be "RFC", representing a remote function call; "BAPI", representing a business application programming interface; "BDC", representing a batch data communication; or an indicator of any other type and form of communication method. In one embodiment, where schema 412 is "RFC", username 408 and password 410 may be entered for a corresponding RFC User account, as discussed above.

Figure 5:
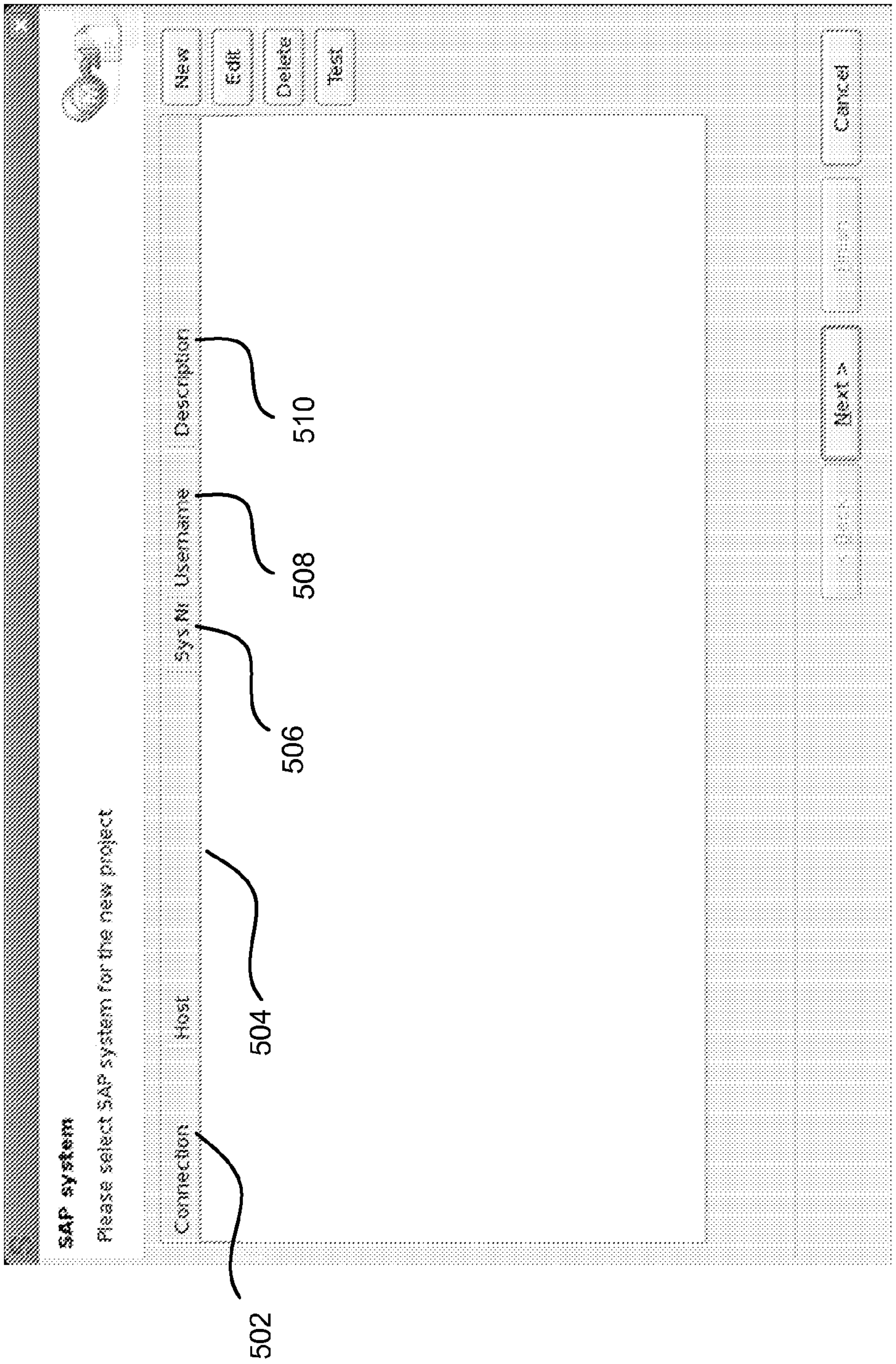

Shown in FIG. 5 is a screenshot of an exemplative embodiment of a SAP system selection dialog. In some embodiments, once connected to a database through the connection window shown in FIG. 4, the selection dialog shown in FIG. 5 is presented to a user. In some embodiments, the selection dialog comprises fields for a connection 502, host 504, system number 506, username 508, and description 510. In further embodiments, connection 502 and/or host 504 may represent a URL or IP number of a system, such as a bridge system, a source system, or a target system, as discussed above. In some embodiments, fields 502-510 may be populated automatically for an entry through a discovery means. In other embodiments, fields 502-510 may be populated automatically for an entry through recall from a previously stored value. In still other embodiments, fields 502-510 may be populated manually by a user entering data, as described below in connection with FIG. 6. For example, a user may create or edit entries by selecting the new or edit buttons, respectively. In some embodiments, entries may be deleted by a user selecting the delete button. In still other embodiments, connection to a system, such as bridge system, source system, or target system, may be tested by a user selecting the corresponding entry and selecting the test button. In such an embodiment, the client may test a connection to the selected entry by, for example, transmitting a network ping to the corresponding IP. In further embodiments, testing a connection may comprise the client verifying a username, password, and/or other authentication parameters on the selected system.

Figure 6:
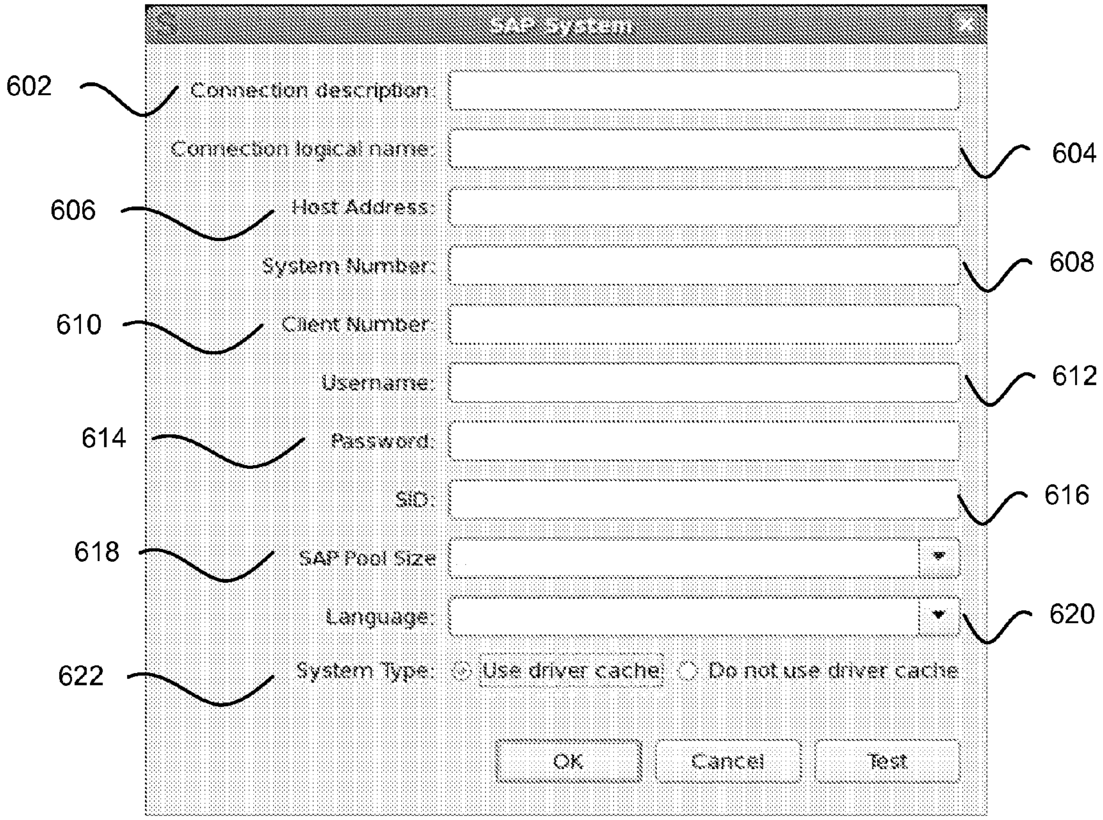

Shown in FIG. 6 is a screenshot of an exemplative embodiment of an system definition dialog. In some embodiments, this dialog is presented to a user responsive to the user selecting the new or edit buttons shown in FIG. 5. As shown, the definition dialog may comprise a connection description 602, a connection logical name 604, a host address 606, a system number 608, a client number 610, a username 612, a password 614, a system identification (SID) 616, a pool size 618, a language 620, and a system type 622. In one embodiment, responsive to the user selecting the test button, connection to the defined system may be tested as described above.

Figure 7:
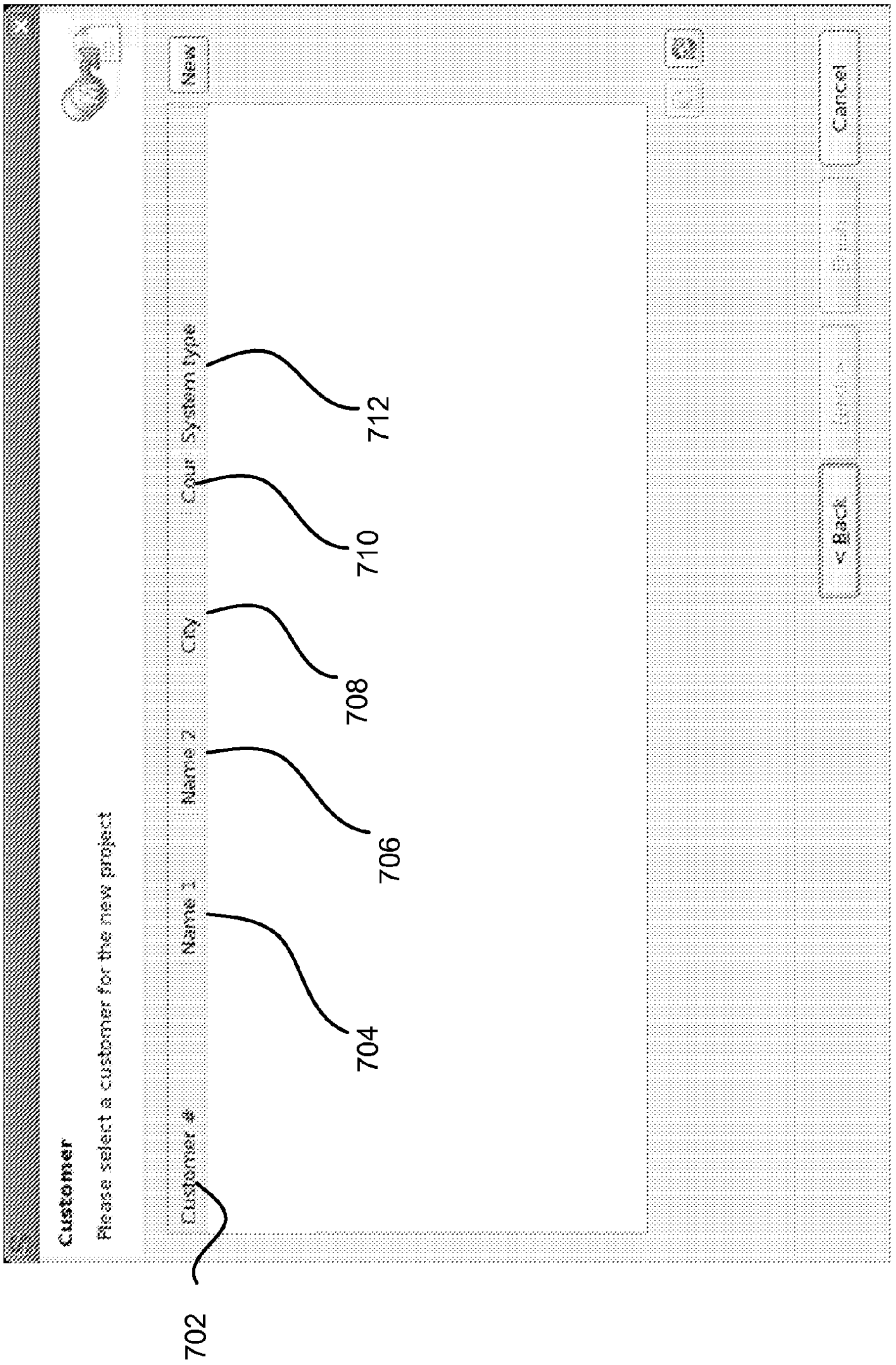

Shown in FIG. 7 is a screenshot of an exemplative embodiment of a customer selection dialog. As shown, an entry in the customer selection dialog may comprise a customer number 702, a first name part 704, a second name part 706, a city 708, a country 710, and a system type 712. Although not illustrated, responsive to a user selecting the new button, a customer definition dialog may be presented to the user. In some embodiments, the customer definition dialog is similar to the system definition dialog illustrated in FIG. 6.

Figure 8A:
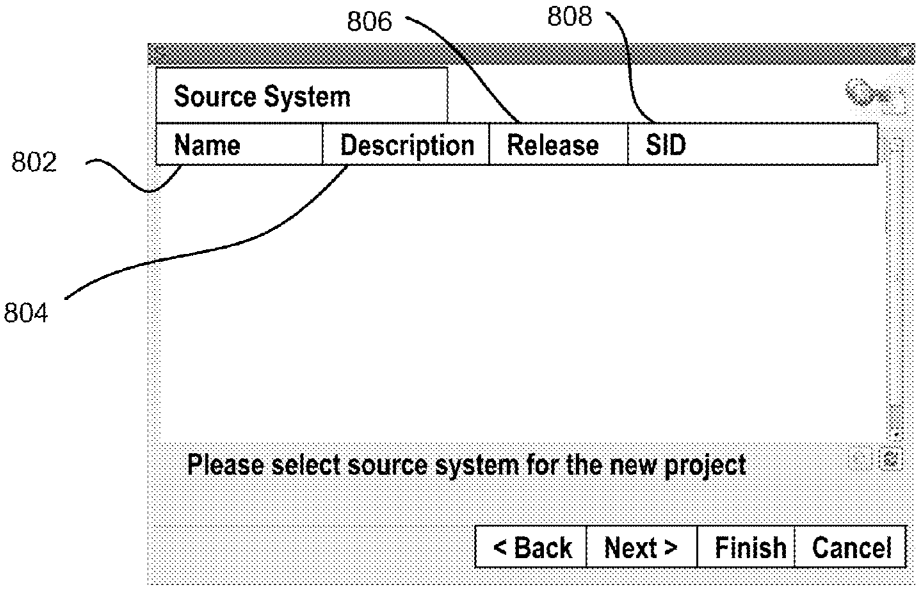
Figure 8B:
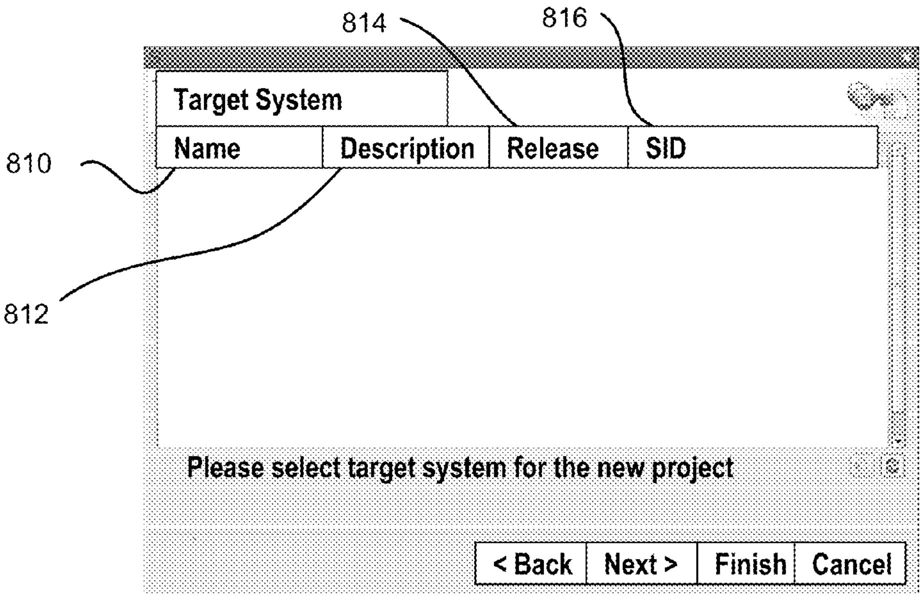

Shown in FIGS. 8A and 8B are screenshots of an exemplative embodiment of a source and target system selection dialog, respectively. In some embodiments, source and target system selection dialogs are used to select a source system comprising a source installation to be upgraded to a target system comprising a target installation, using any of the systems and methods described herein. As shown, a source system dialog may comprise a name 802, description 804, release version 806, and system identification (SID) 808. Similarly, a target system dialog may comprise a name 810, description 812, release version 814, and SID 816.

Figure 9A:
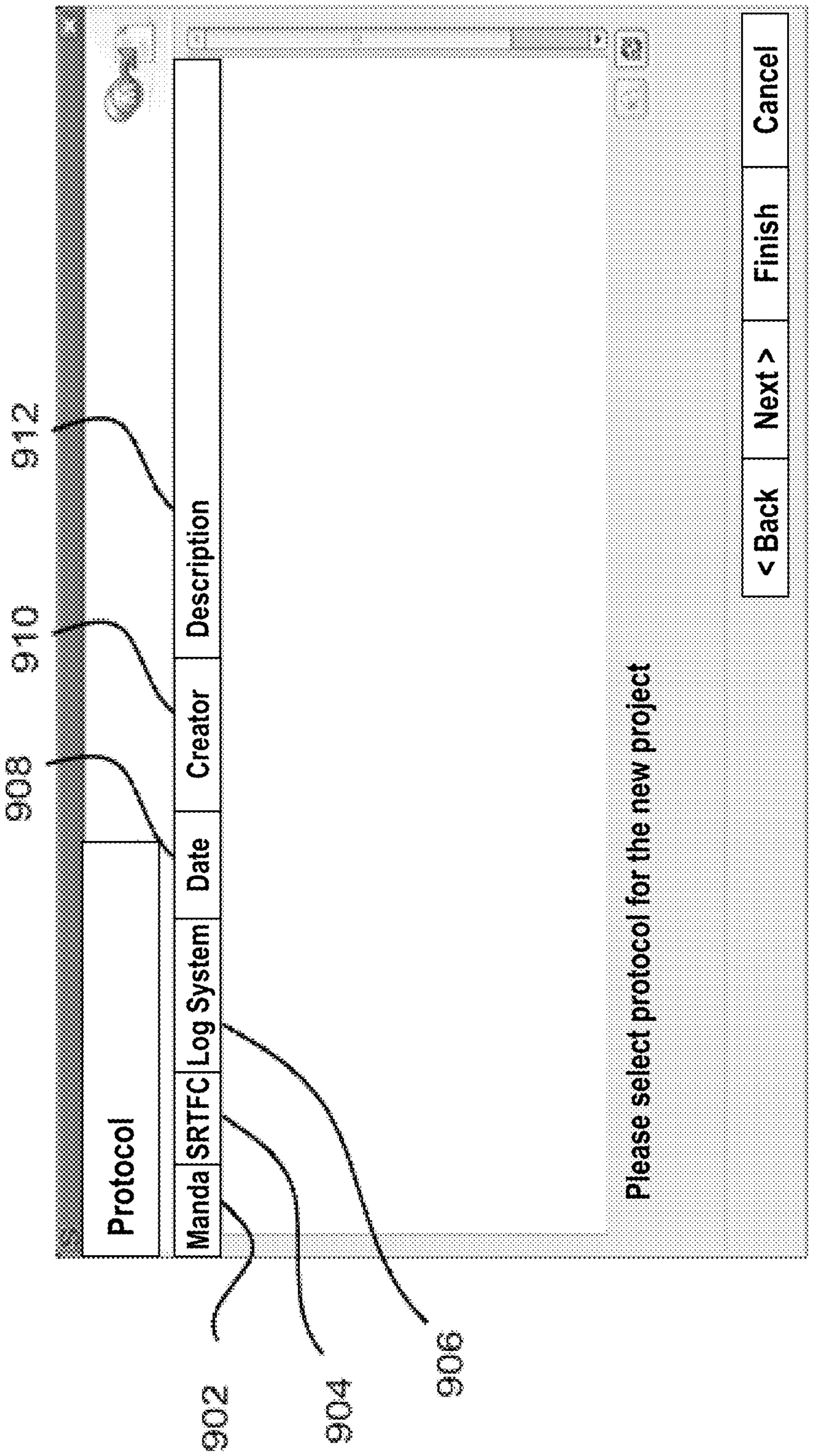

Shown in FIG. 9A is a screenshot of an exemplative embodiment of a protocol selection dialog. In some embodiments, entries in the protocol selection dialog may be populated automatically, responsive to protocols defined on the bridge system, source system, and/or target system. As shown, protocol selection dialog may comprise fields for mandatory/optional status 902, SRTFD 904, logical system 906, creation or modification date 908, creator 910, and description 912.

Shown in FIG. 9B is a screenshot of an exemplative embodiment of a verification dialog. In some embodiments, verification dialog may allow a user to verify previous selections. For example and as shown, session name 914 and session description 916 may, in some embodiments, correspond to a connection description and connection name, discussed above. In other embodiments, the session name 914 and session description 916 may be entered manually or modified to describe a specific instance of analysis and/or transformation. Also shown are selection options for a language and/or locale 918, a project phase 920. Also shown are fields populated responsive to earlier selections, such as system 922, customer 924, source system 926, target system 928, and protocol 930. Also shown is program field 932, which may be populated automatically by the client with identifications of programs and/or installations, such as source installation and target installation.

Figure 10C:
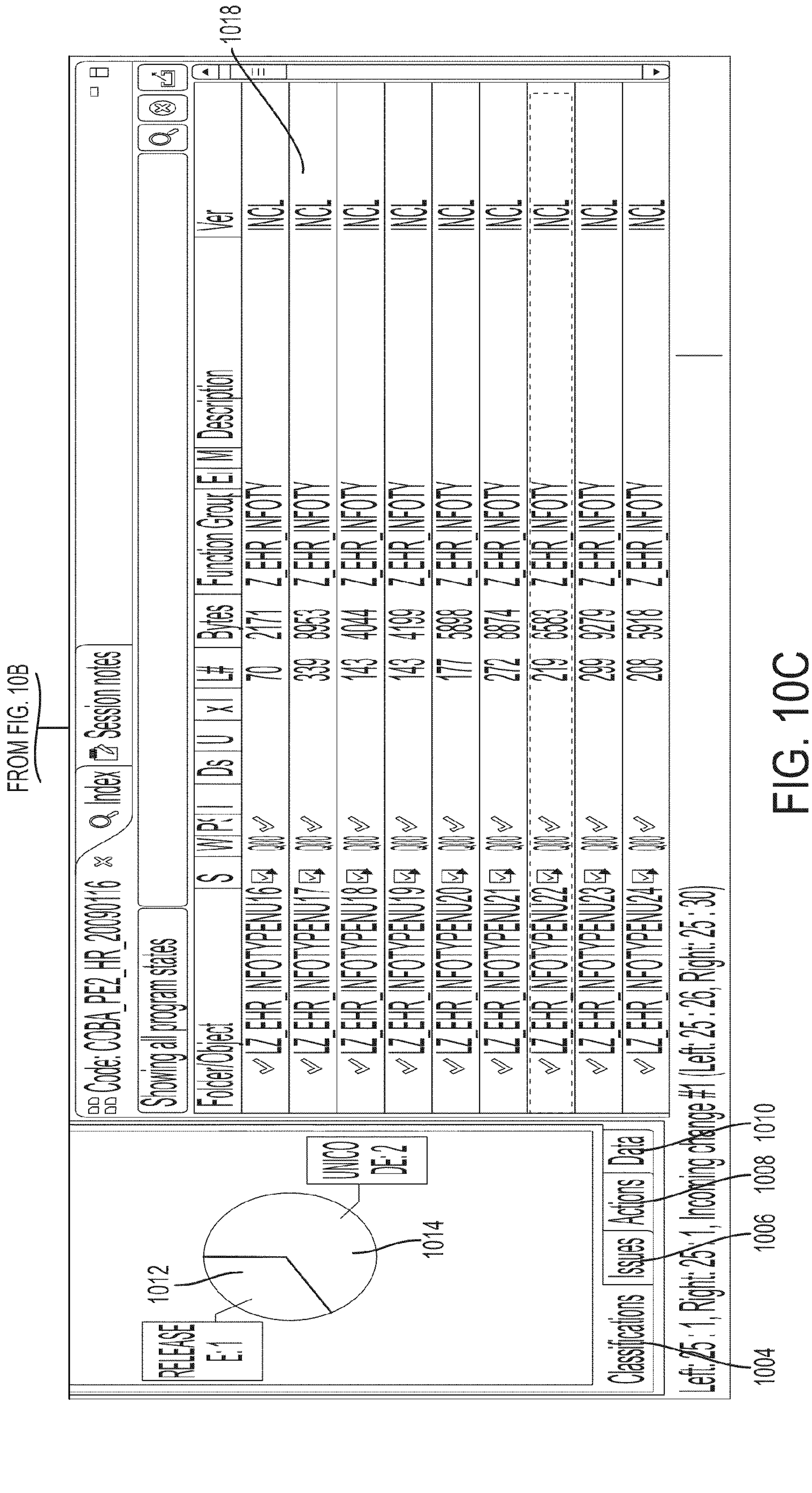

Shown in FIGS. 10A-C are screenshots of an exemplative embodiment of a comparison report, described above. As shown, the comparison report may comprise an index or list of objects 1002. The comparison report may further comprise a chart of the ratio of classifications of parser identifications 1004. For example, as shown in this example, the parser has identified a ratio of objects that may need transformation 1012 to those that may not require transformation 1014. Although not illustrated, in some embodiments, selecting issues 1006 may display a ratio of objects with severe errors if not upgraded, minor errors if not upgraded, and no errors if not upgraded. For example, in one embodiment, an object may be classified as having a severe error if failure to transform the object would result in an endless loop or a divide by zero error. In another embodiment, an object may be classified as having a minor error if failure to transform the object would result in a warning dialog. In some embodiments, selecting actions 1008 may display a ratio of objects that may be automatically, semi-automatically, and manually transformed. In other embodiments, selecting data 1010 may display a list of underlying numerical data used to display the chart as shown.

Also shown in FIGS. 10A-C is a comparison window 1016 and a code window 1018. As shown, code window 1018 may display a list or index of objects. Selecting an object may, in some embodiments, cause the source code of the object to be displayed in the before window 1020 and the source code of the transformed object to be displayed in the after window 1022. In some embodiments, one or more indicators 1024 may be displayed between before window 1020 and after window 1022 indicating where transformations have occurred.

Figure 11A:
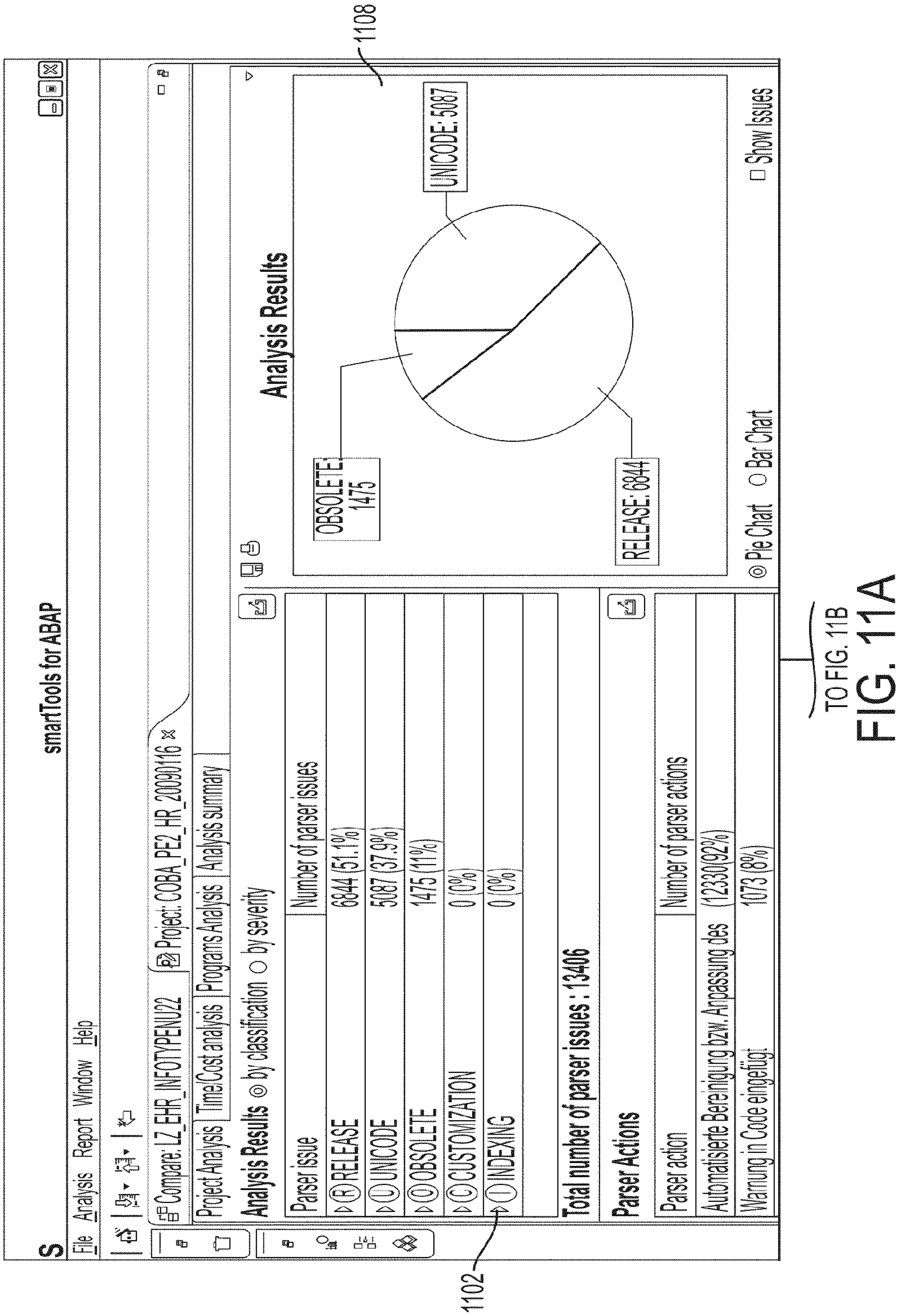
Figure 11B:
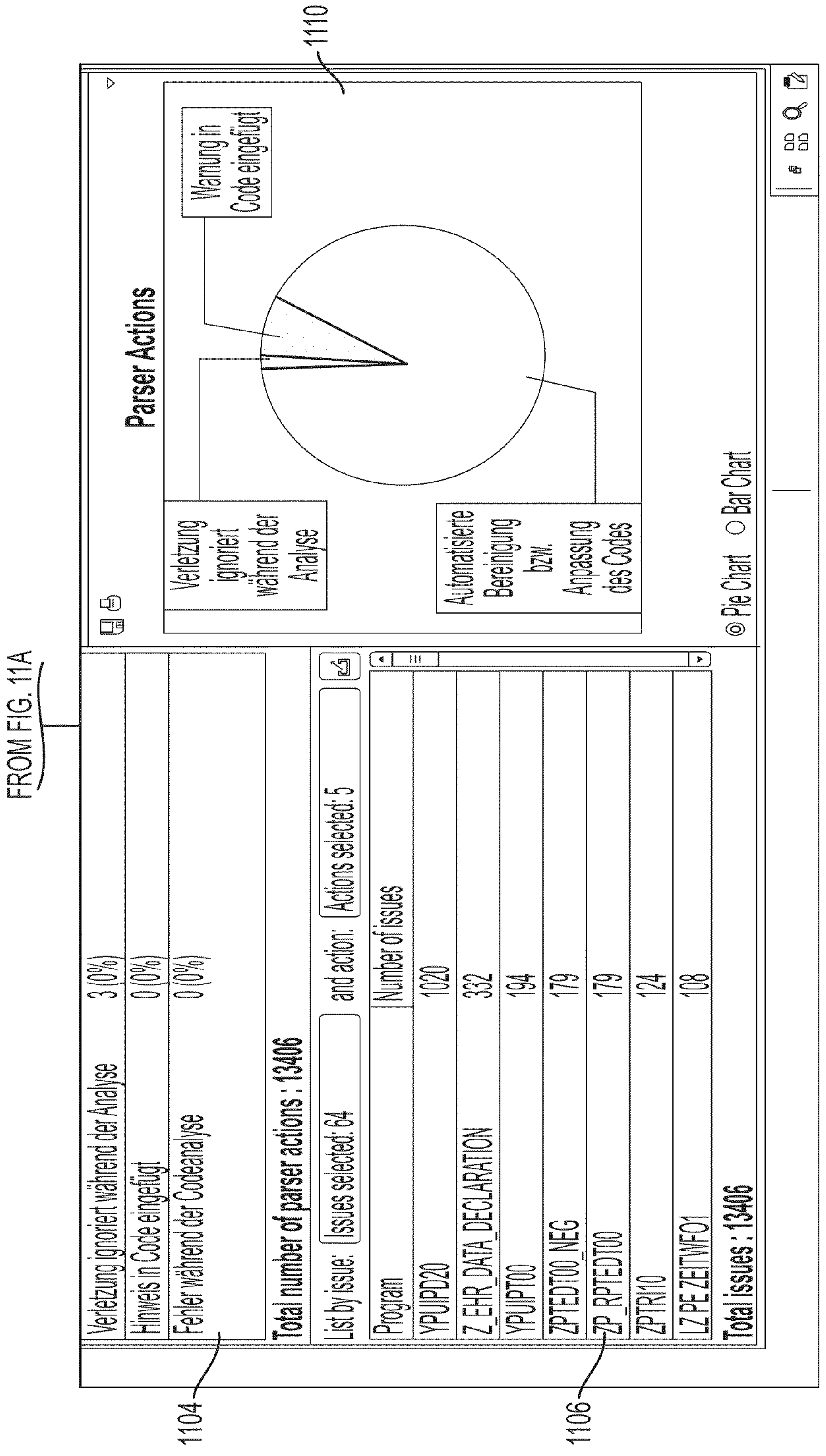

Shown in FIGS. 11A-B are screenshots of an exemplative embodiment of a project analysis report. As shown, a project analysis report may comprise analysis results 1102, which may, in some embodiments, describe the type, number, and percentage ratios of parser issues. In some embodiments, the project analysis report may also comprise parser actions 1104, which may describe the type, number, and percentage ratios of actions to be taken by the parser. In additional embodiments, the project analysis report may also comprise a listing 1106 of programs or objects in an installation and a corresponding number of issues with each program or object. As shown, in some embodiments, a project analysis report may also include charts 1108 and 1110 illustrating the percentage ratios for analysis results and parser actions, respectively. In an additional embodiment not illustrated, project analysis report may further comprise a report on an estimated time and/or cost to transform a source installation to a target installation.

Figure 12:
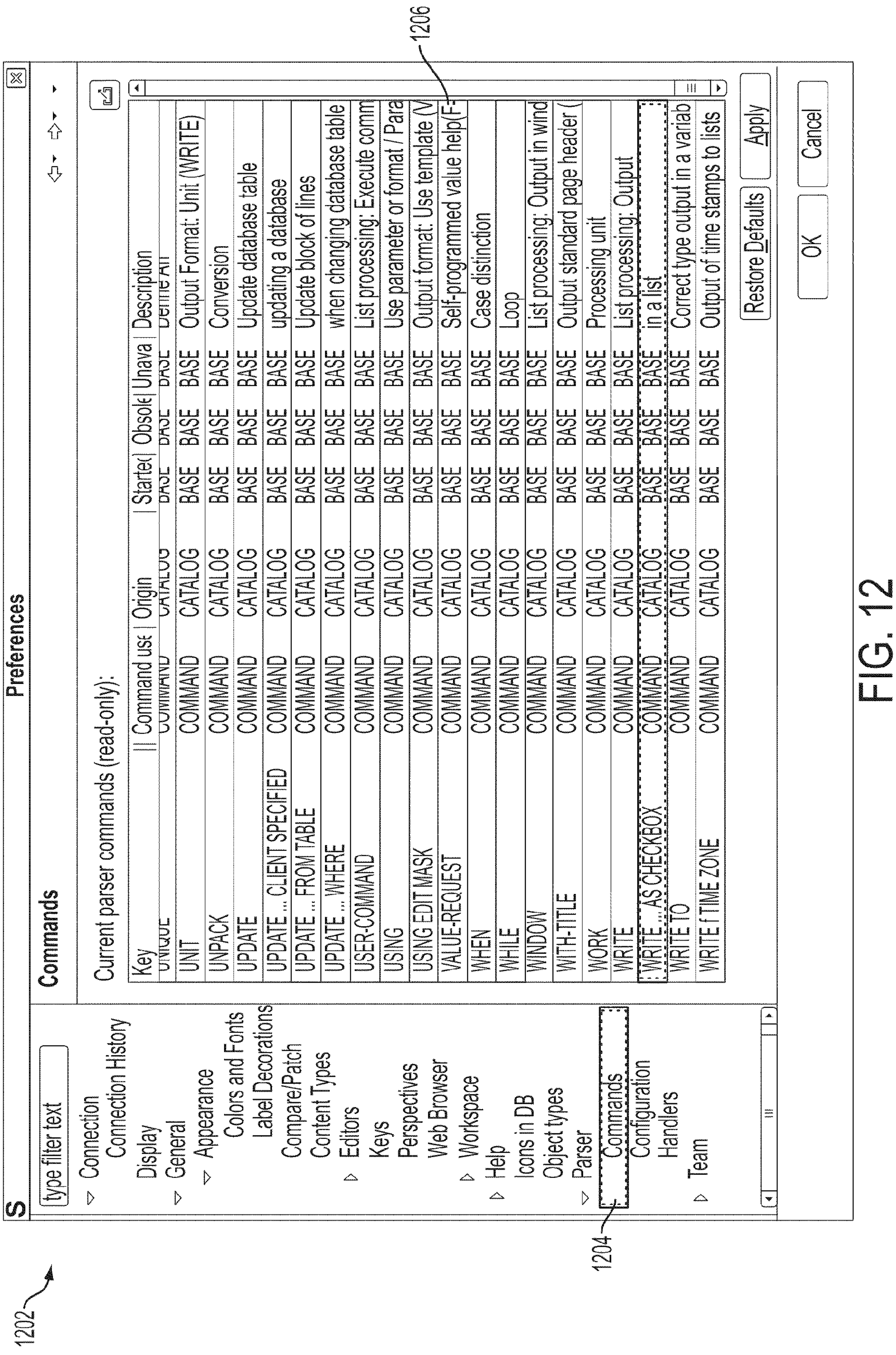
Figure 13:
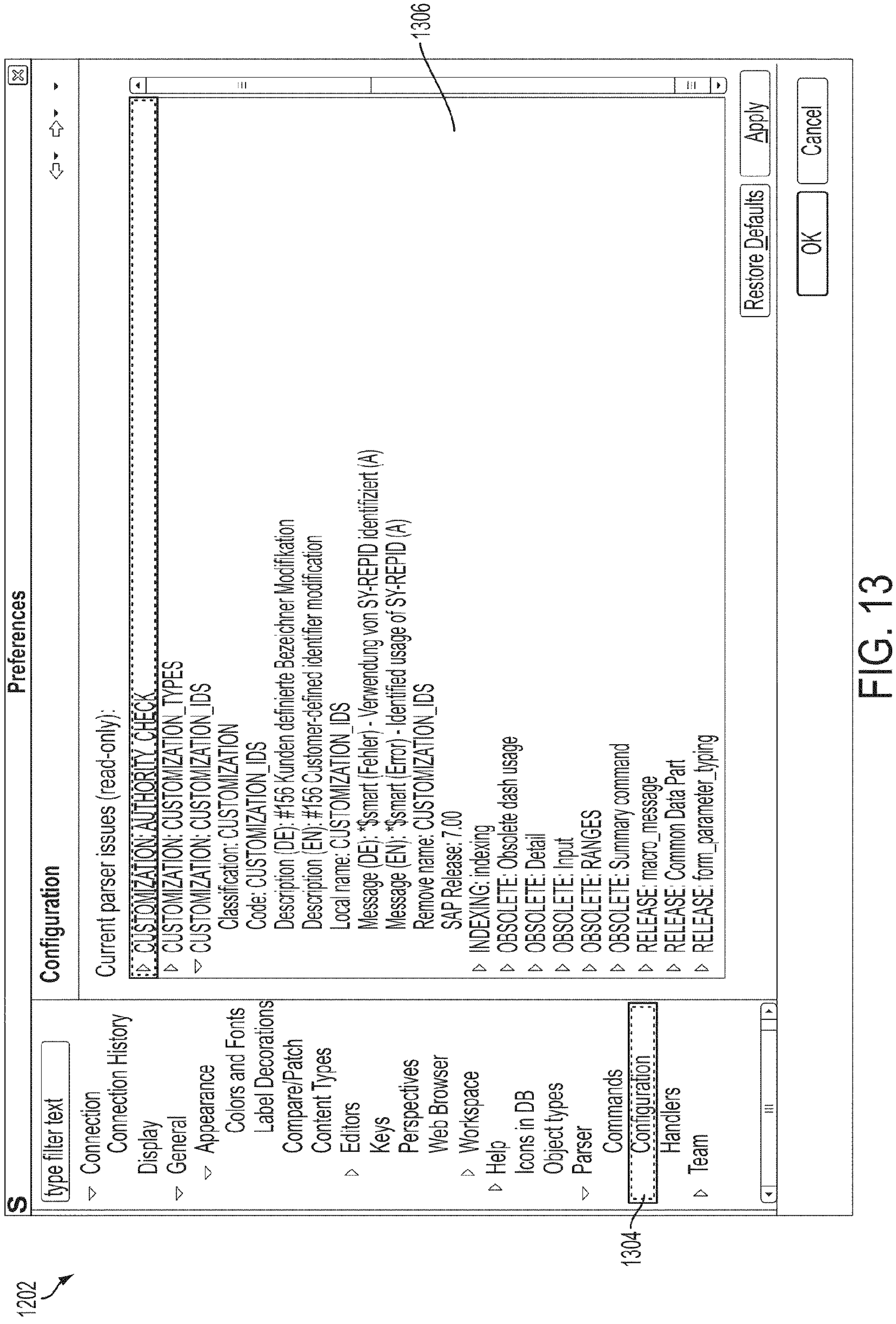
Figure 14:
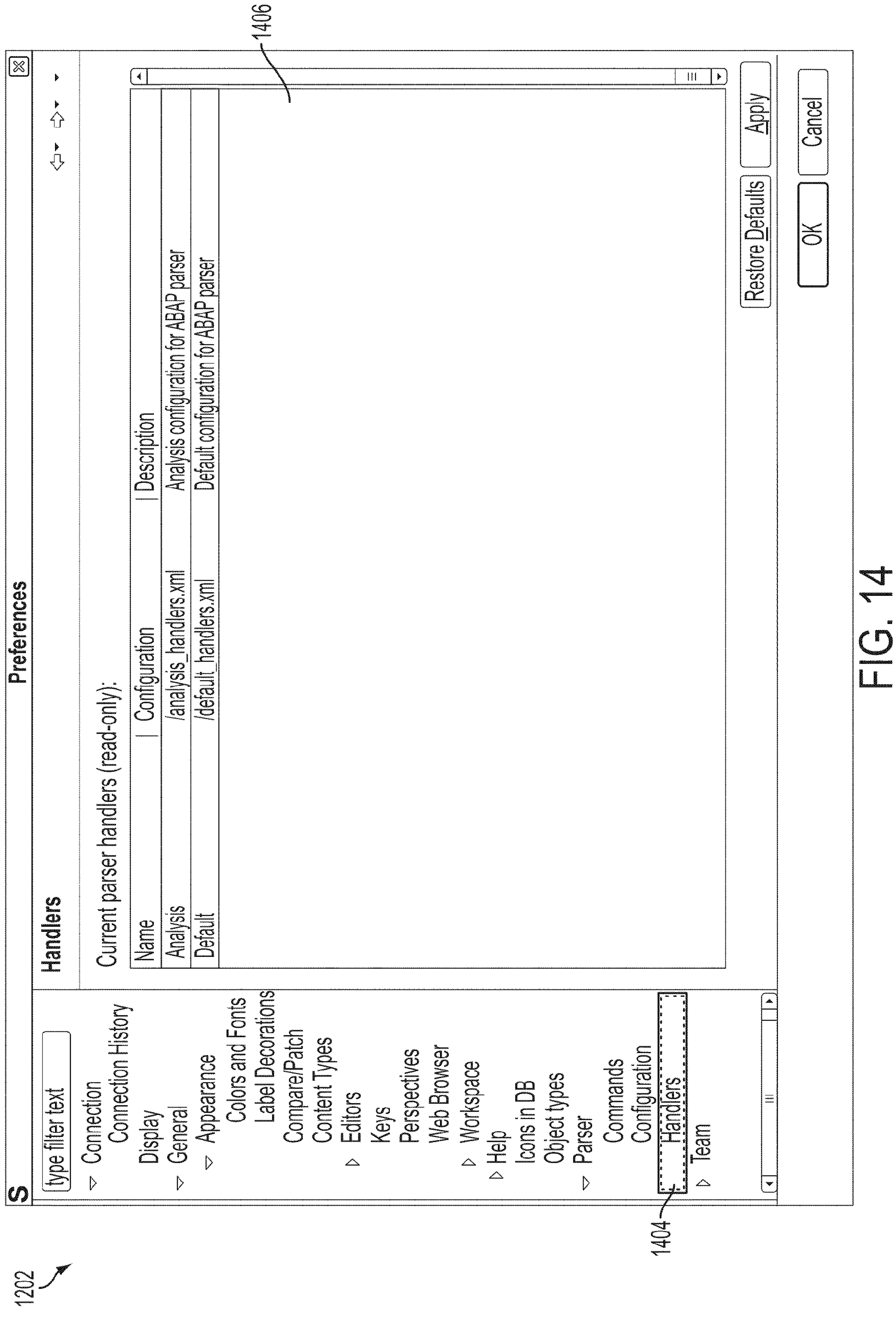
Figure 16A:
Figure 16B:
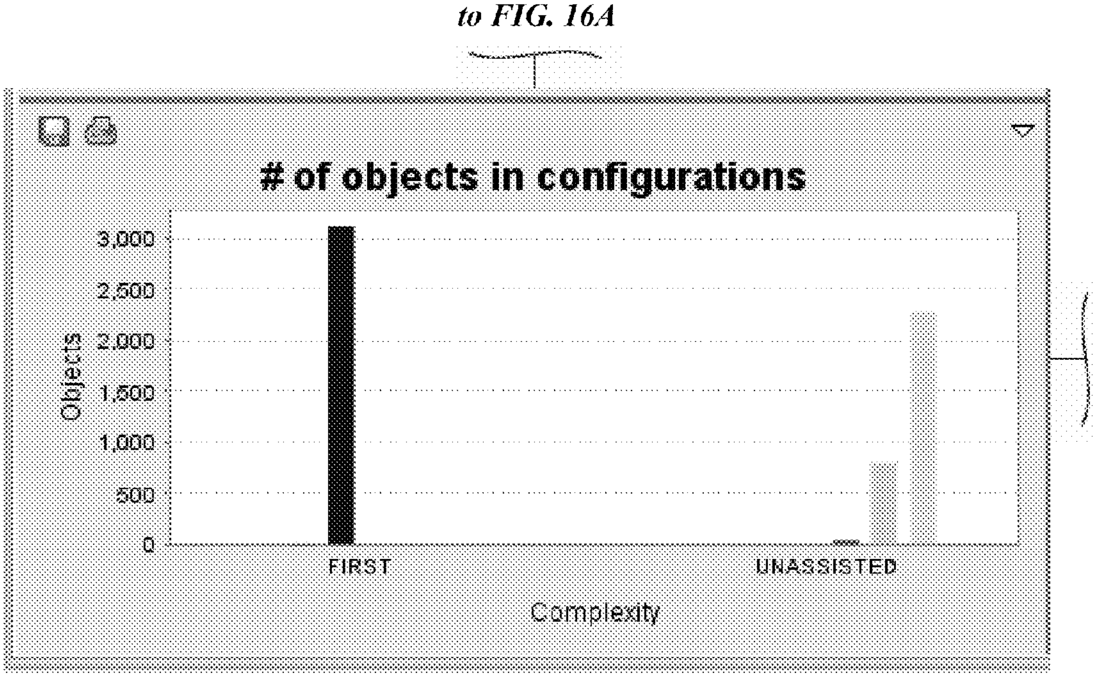
Figure 16C:
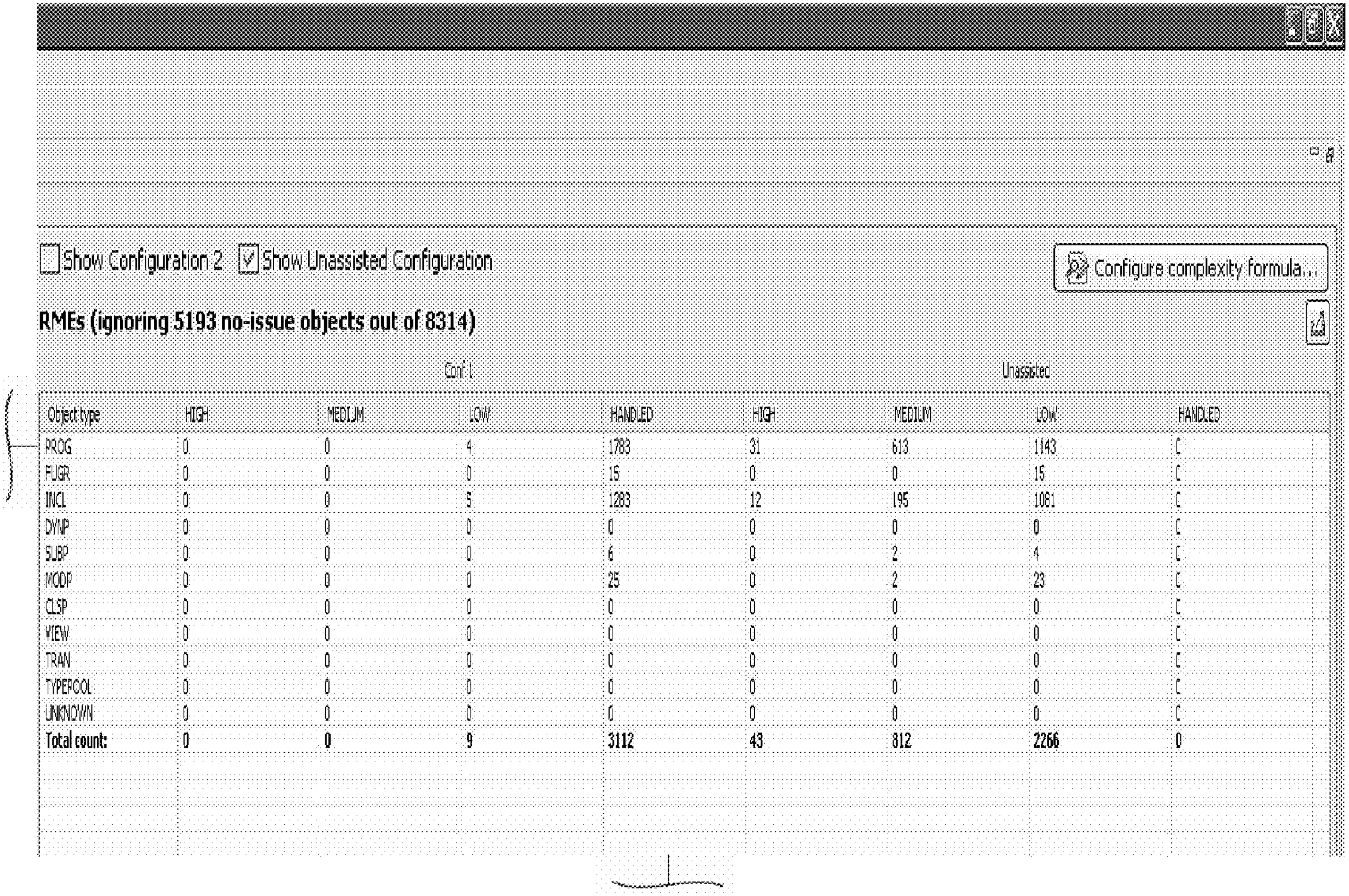
Figure 17A:
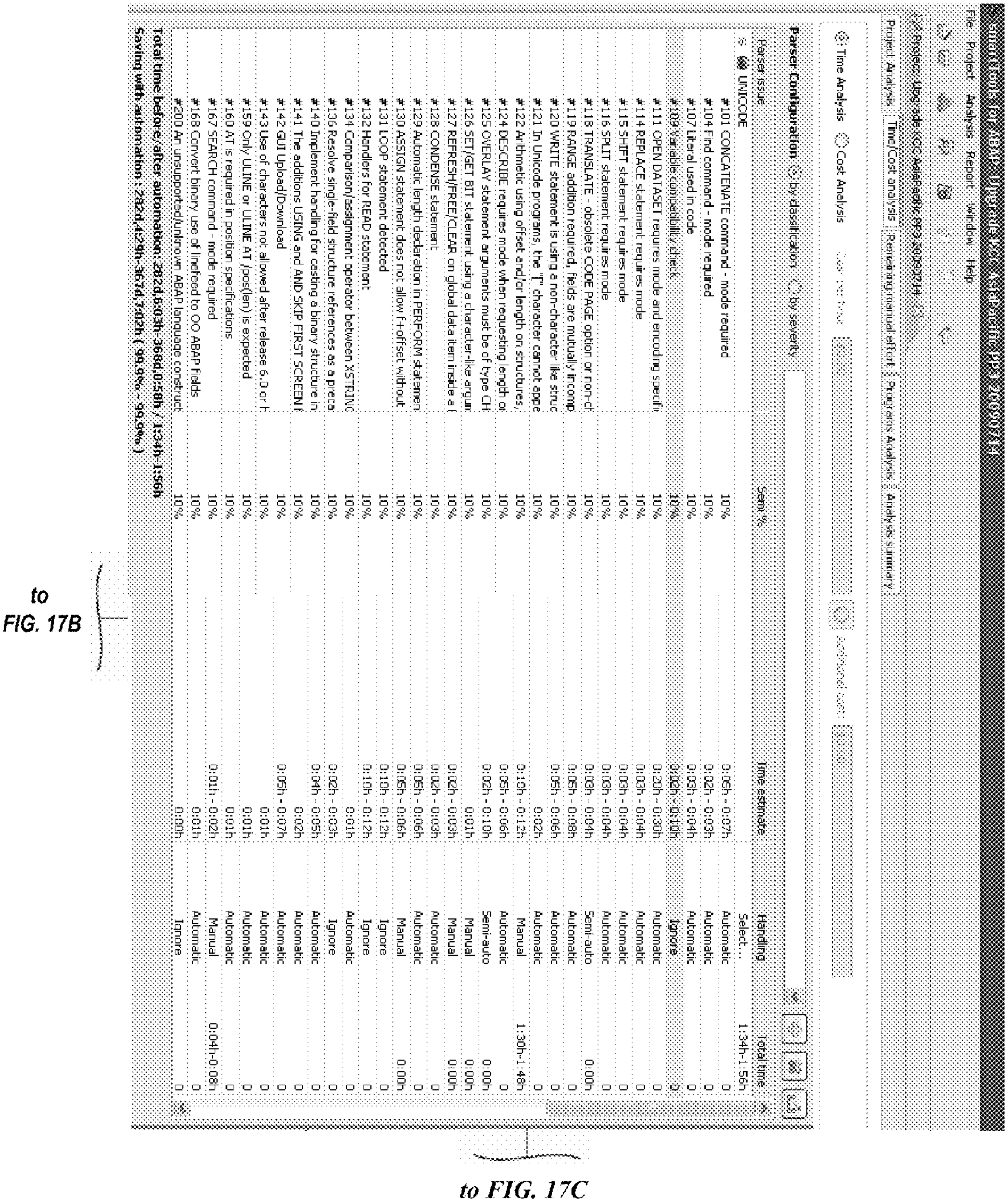
Figure 17C:
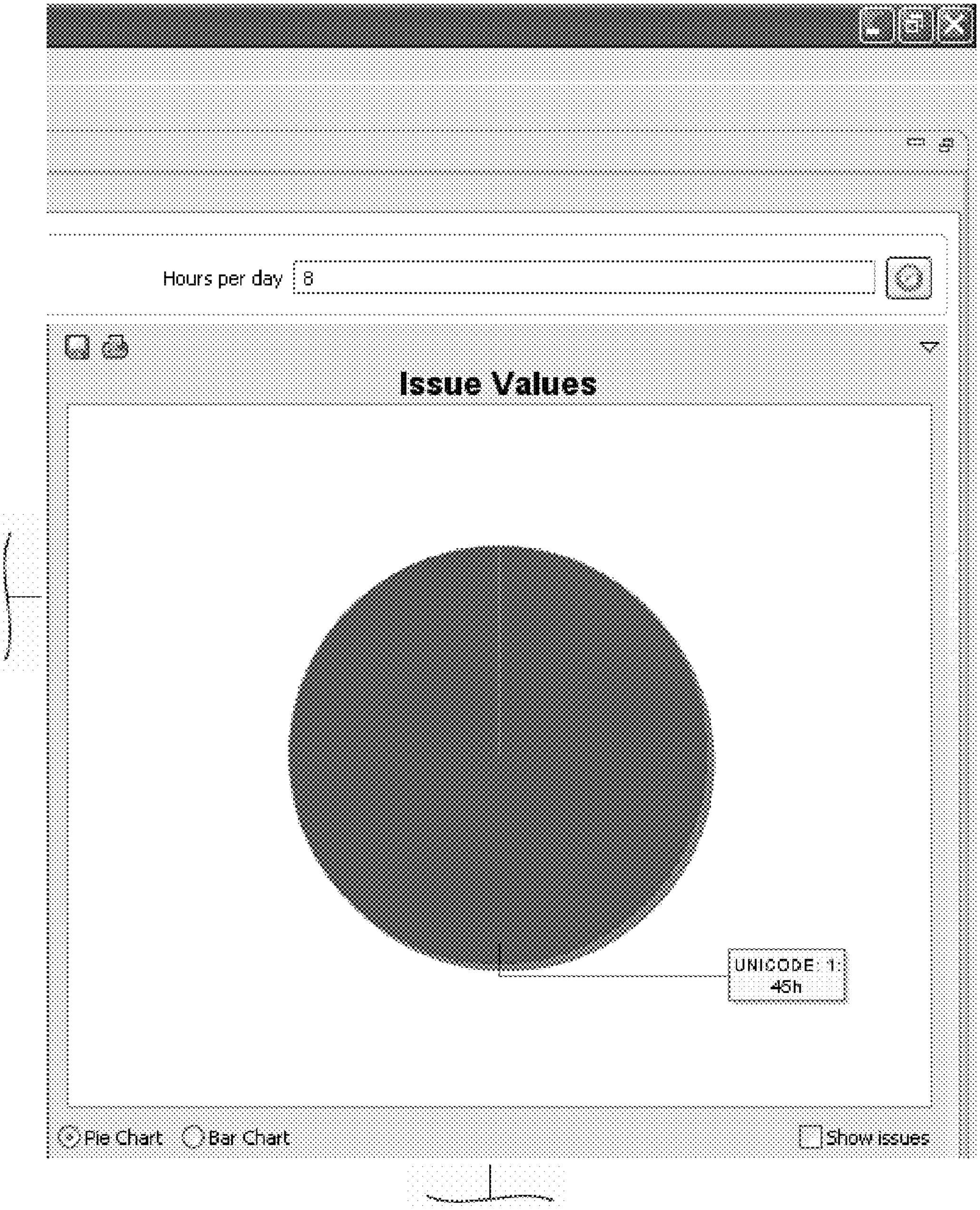
Figure 17D:
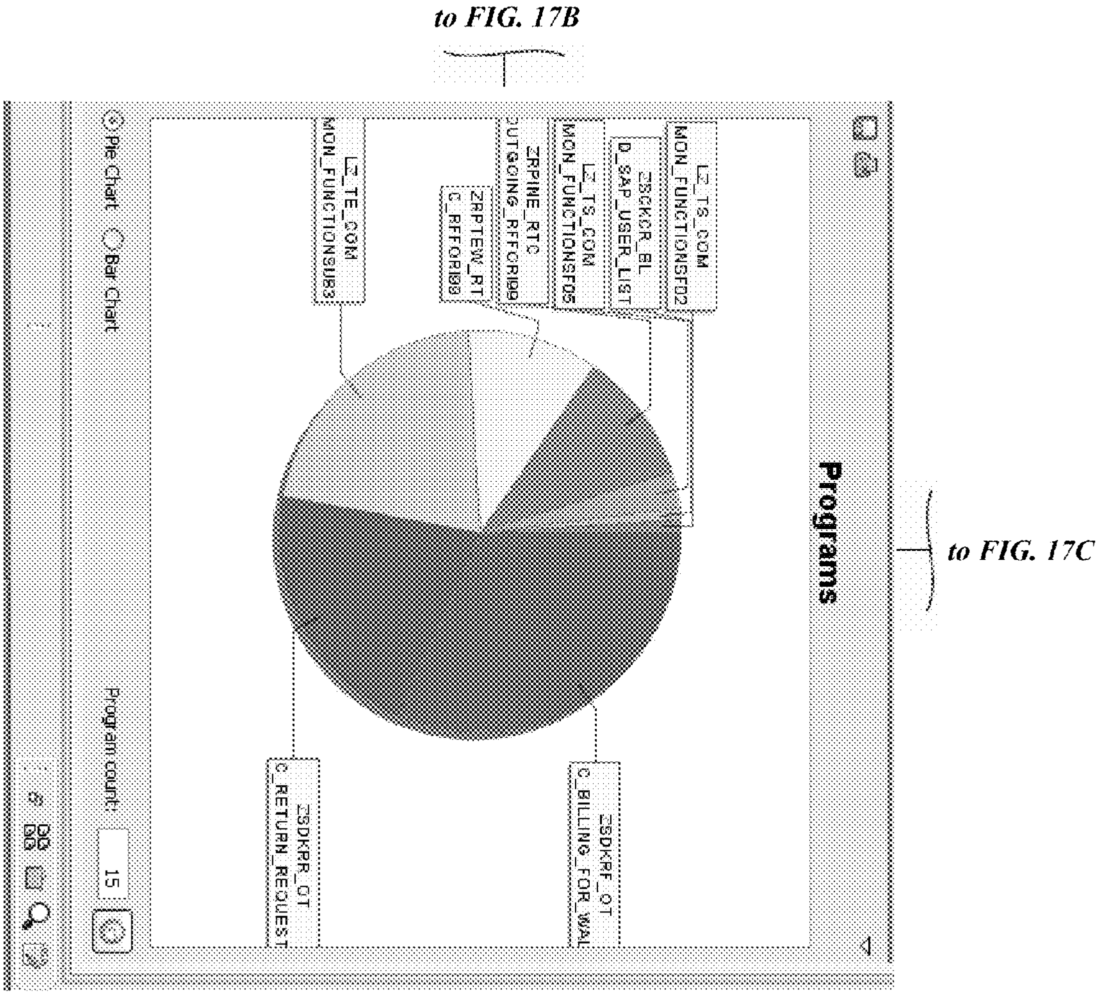

Shown in FIGS. 12-14 are screenshots of an exemplative embodiment of a parser configuration tool 1202. As shown in FIG. 12, parser commands 1204 may be selected for display. In some embodiments, the commands may be read-only, as shown, while in other embodiments, the commands may be editable. In further embodiments, commands may be editable responsive to an authentication or privilege level of the user. As shown in display of current parser commands 1206, commands may comprise a key, a command usage, an origin, a status for whether the command has started, is obsolete, or is unavailable, and a description of the command. In some embodiments, parser commands may comprise tokens and/or syntax as discussed above.

As shown in FIG. 13, parser issues 1304 may be selected for display. In some embodiments, the parser issues may be read-only, as shown, while in other embodiments, the parser issues may be editable. In further embodiments, parser issues may be editable responsive to an authentication or privilege level of the user. As shown in display of current parser issues 1306, issues may comprise a classification, a code, a description in one or more languages, a local name, a message to be inserted into code in one or more languages, a remove name, and a release version.

As shown in FIG. 14, the parser may utilize handlers 1404. In some embodiments, handlers may be xml files comprising analysis configurations. In some embodiments, the list of parser handlers 1406 may be read-only, as shown, while in other embodiments, the list may be editable. In further embodiments, the list may be editable responsive to an authentication or privilege level of the user. As shown in display of current parser handlers 1406, entries may comprise a name, a configuration and a description. In some embodiments, the configuration field represents or indicates a memory location where the configuration is stored.

Shown in FIGS. 15A-C are screenshots of an embodiment of a report of objects analyzed and transformed from a source installation to a target installation. As shown, in one embodiment, the report comprises a header 1502. The header 1502 may comprise fields such as a rule code, a number of occurrences, and a classification. The rule code may be a text label, numerical code, or any combination of numbers and characters to identify a rule. The number of occurrences may, in some embodiments, reflect the number of occurrences of the rule identified by the rule code being applied in the transformation. In other embodiments, the number of occurrences may reflect the number of occurrences of the object 1510 in databases, objects, and other elements of the source installation to which the rule will be applied. The classification may identify a classification of the rule. In some embodiments, the classification may be "release", indicating that the rule is specific to a version of the application, such as the version of the target installation. In other embodiments, the classification may be "unicode", indicating that the rule is a unicode violation applicable to all versions of the application. In still other embodiments, the classification may be "obsolete", indicating that the object may be obsolete or unused in the language of the target installation. In yet other embodiments, the classification may be "customization", indicating that the rule is a custom rule added by a user or developer.

As shown, in some embodiments header 1502 may also comprise a severity, a parser action, and an action. The severity may, in some embodiments, be an indication of how likely errors are to occur if the object is installed unmodified in the target installation. In some embodiments, the severity may "warning", which may indicate that the severity is minimal. In other embodiments, the severity may be "minimal". In still other embodiments, the severity may be "severe", or may be an indicator such as "error" or "UC error", indicating a unicode or other error. The parser action may, in some embodiments, be an indicator whether the object is automatic code, semi-automatic code, or manual code, as discussed above. The action may, in some embodiments, indicator an action for the transformer to take. For example, the action may be "replace", indicating that source code of the object will be replaced or modified according to the rule. In other embodiments, the action may be "warning", indicating that the transformer will add a warning into the source code, but may, in some embodiments, not replace or modify the source code.

Also shown in FIGS. 15A-C is a rule description 1504 and comments 1506. In some embodiments, the rule description 1504 and comments 1506 may be modified by a user or developer to include more or less information, as desired. As shown, one or both of these fields may be blank. Also shown in FIGS. 15A-C is a message put in code 1508. In some embodiments, message put in code 1508 may be a comment inserted into source code of an object during transformation. In one embodiment, the message put in code 1508 may be used to document changes. In other embodiments, the message put in code 1508 may be used for later searching through source code of a target installation to locate objects that have been modified. This may be done, for example, for debugging and testing purposes. As shown, message put in code 1508 may comprise symbols that may be automatically expanded as the message is put in the code. For example, in FIG. 15A, the message put in code 1508 includes "(W)", which may, in some embodiments, be expanded to "(Warn)" when the message is inserted into source code during transformation. Similarly, the message put in code 1508 may include a date code, such as "MM/DD/YY" which may, in some embodiments, be expanded to the current 2-digit month, 2-digit day, and 2-digit year when the message is inserted into source code during transformation. Also for example, the message put in code 1508 may include a version number of a target installation, such as "3.1.3" shown in FIG. 15A. In some embodiments, the message put in code 1508 may also include an indicator for automatic, semi-automatic, or manual code, or an indicator for a warning, such as ("A"), or "(W)". In further embodiments, indicators such as the above mentioned symbols may be used by a user or developer to search through source code for debugging or testing. In other embodiments, the indicators may be used by the analysis tool in generating statistics for reporting, as discussed above.

Also shown in FIGS. 15A-C is an object 1510, with before-transformation and after-transformation source code segments 1512, and an expected automation rate 1514. As shown, in some embodiments object 1510 may comprise a title, name, or other identifier of an object, such as a path to the object. In some embodiments, source code segments 1512 may comprise an indicator, such as a line number, identifying where in the source code of the object the modification will occur during transformation. Source code segments 1512 may indicate specific modifications to source code of an object during transformation, and may include message put in code 1508, as shown. Expected automation rate 1514 may comprise an indicator, such as a percentage, of expected automation success. For example, as shown in FIG. 15B, in the example embodiment, 62 occurrences of 83 occurrences of the ZSDR_Z56_UPLOAD object include mixed data types and require further information to be transformed. Accordingly, the expected automation rate 1514 is 25%.

Shown in FIGS. 16A-D are screenshots of an embodiment of a report of remaining manual effort (RME) required to transform an application from a source installation to a target installation. As shown, in one embodiment, the RME report may comprise a list of issue types, each with an associated number of issues. In some embodiments, the number of issues for each issue type may be automatically generated by the parser and/or analyzer, as described above. In some embodiments, the list of issue types may be divided into sections corresponding to Unicode issues, Release issues, Obsolete issues, and Customization issues, as discussed above in connection with FIGS. 15A-C. Additionally, in some embodiments, each issue listed may be associated with one or more configurations (e.g. "FIRST", indicating Configuration 1; "SECOND", indicating Configuration 2; etc.) or no configurations. Each of these configurations may, in some embodiments, represent transformation configurations, and the association of an issue with a transformation configuration may indicate that the issue is one that has been configured for automated upgrade or transformation in that particular transformation configuration. In an example not illustrated, a first configuration may be configured to automatically upgrade issues associated with unicode concatenate commands, and may be configured to not automatically upgrade issues associated with obsolete concatenate commands. Accordingly, in this example, the unicode concatenate issue may have an indicator associating it with the first configuration while the obsolete concatenate issue may not have an indicator associating it with the first configuration.

In some embodiments, the RME report may also comprise a configuration analysis window as shown. The configuration analysis window may include a list of object types, as shown. Additionally, the configuration analysis window may also include, for each object type, numbers indicating the elements associated with the object type that may be automatically upgraded or transformed (e.g. "handled"), and the elements associated with the object type that may require manual upgrading or transformation. In some embodiments, the numbers indicating the elements that require manual upgrading or transformation may be further subdivided by estimated complexity of the upgrade or transformation as shown (e.g. "high", "medium", and "low"). In further embodiments, the formula for estimating complexity of issues may be preconfigured, while in other embodiments, the formula may be adjusted by a user. In some embodiments, the configuration analysis window may further comprise an analysis of one or more automatic transformation configurations compared to manual upgrade of all issues (e.g. "unassisted"). These embodiments may be useful for allowing users to compare different transformation configurations with each other and with an estimated time/cost of manual upgrade.

For example, in the embodiment illustrated in FIGS. 16A-D, there are a total of 3121 issues in the application to be transformed to the target installation. A first transformation configuration ("Conf 1") has been analyzed, along with a fully manual ("unassisted") upgrade. The first configuration has a total of 3112 issues that may be handled, or upgraded automatically, and 9 issues of low complexity that will require manual upgrading. This is compared to the unassisted transformation, which has 43 issues of high complexity, 812 issues of medium complexity, and 2266 issues of low complexity. In this illustrated example, these numbers are also displayed as a bar graph.

Additionally, the RME report may, in some embodiments, comprise an estimation of time and/or cost for remaining upgrades and transformations and testing, and total time and/or cost required. For example, in the embodiment illustrated, the 3112 "handled" issues of the first configuration will take an estimated 32 days, 3:20 hours to upgrade automatically, and the remaining 9 low complexity issues will take an estimated 3 days, 7:30 hours to upgrade, plus :45 hours to test. Accordingly, upgrading the source installation using the first transformation configuration will take an estimated total of 36 days, 3:35 hours. This is compared in the example shown to a fully manual "unassisted" upgrade, which will require a total 1627 days, 6:35 hours to upgrade. In some embodiments, these time estimates may be multiplied by an hourly rate to determine an estimated cost.

FIGS. 17A-D are screenshots of an embodiment of a report of a time analysis to transform an application from a source installation to a target installation. In some embodiments, the time analysis may comprise a list of issues, divided by types "Unicode", "Release", "Obsolete", and "Customization" as discussed above. In further embodiments, the issues may be associated with a time estimate and handling type. For example, the handling type may be "automatic", "semi-auto", "manual", or "ignore". In many embodiments, these handling types indicate that elements or code with the specific issue are automatic code, semi-automatic code, or manual code, as discussed above. Additionally, issues may be set to "ignore" by a user, indicating that they will not be transformed. In some embodiments, a user may set an issue to "ignore" if the user determines that the issue need not be addressed in the target installation. For example, if an object of a source installation is not used in the target installation, such as a database that has been obsoleted, then issues relating to that database may be ignored.

In some embodiments, the time analysis report may further comprise an estimate of time to upgrade objects with issues set to manual or semi-auto. In further embodiments, the time analysis report may also comprise a comparison between a time estimate to upgrade a source installation without automation (e.g. "unassisted", as discussed above) and a time estimate to upgrade a source installation with automation. For example, in the embodiment illustrated, it is estimated that it will take as much as 368 days, :58 hours to upgrade the source installation without automation, and 1:56 hours to upgrade the source installation with automation, for a savings of 99.9% of the time required to perform the upgrade. In many embodiments, the time analysis report may contain further comparisons as shown, including a pie or bar chart comparing issue types, issues by application program within the source installation, estimated time required to upgrade each application program within the source installation, etc.

In many embodiments, the reports shown in FIGS. 16A-D and 17A-D may be dynamic reports. These reports may change in real-time, reflecting changes made by a user to transformation configurations or other settings. For example, if a large portion of high complexity manual upgrades are related to one application program within the source installation, and the user determines that said application program need not be upgraded, the user may exclude the application program from the upgrade. Accordingly, the analyzer would re-analyze the time and cost analysis and remaining manual effort analysis, removing issues associated with the excluded application program, and reducing the estimated time to upgrade the source installation. In these embodiments, a user may compare estimates of many transformation configurations for efficiency and time/cost savings and adjust configuration parameters before actually performing any transformations.

Figure 18A:
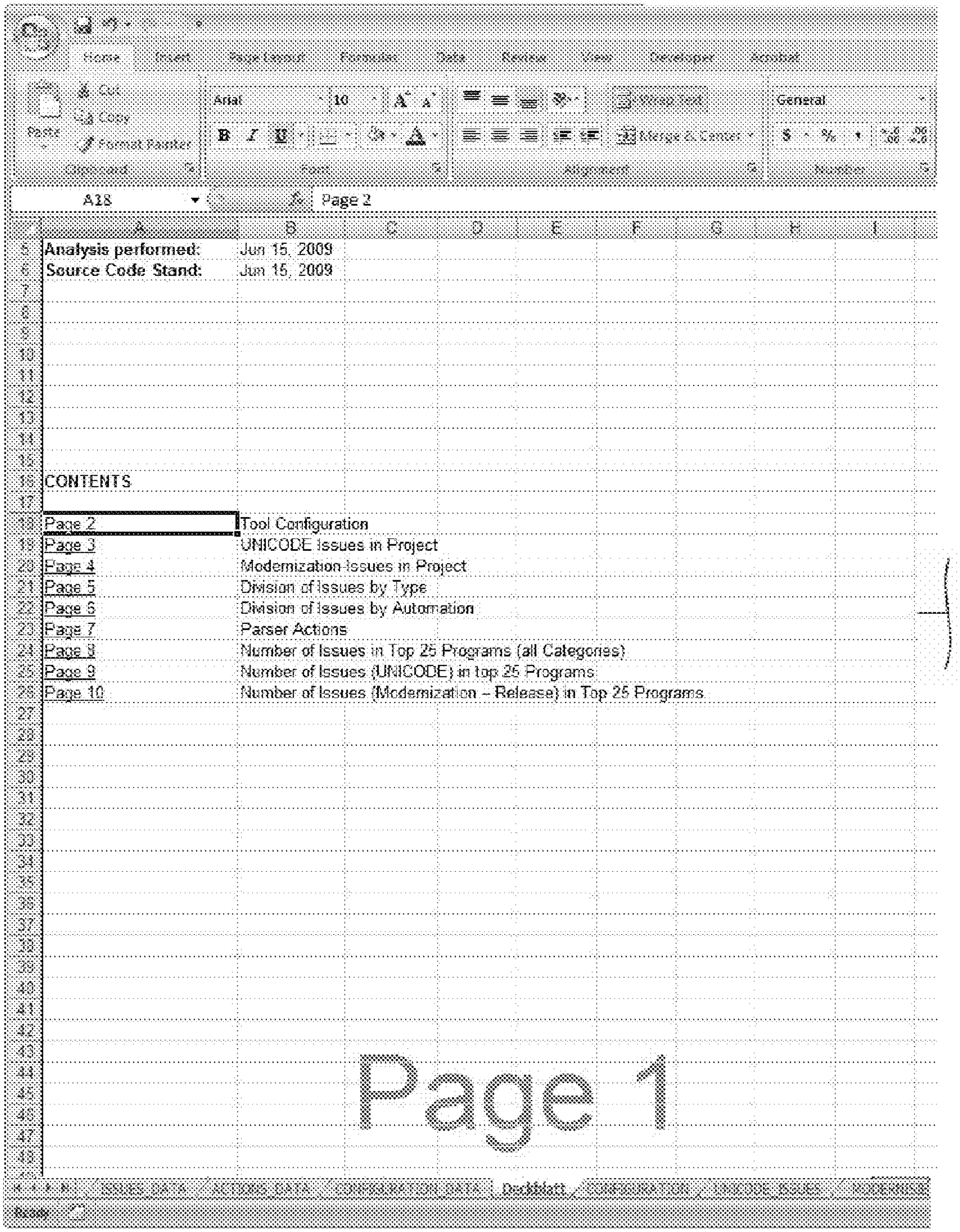
FIGS. 18A-B are screenshots of an embodiment of a report summary.
Figure 18B:
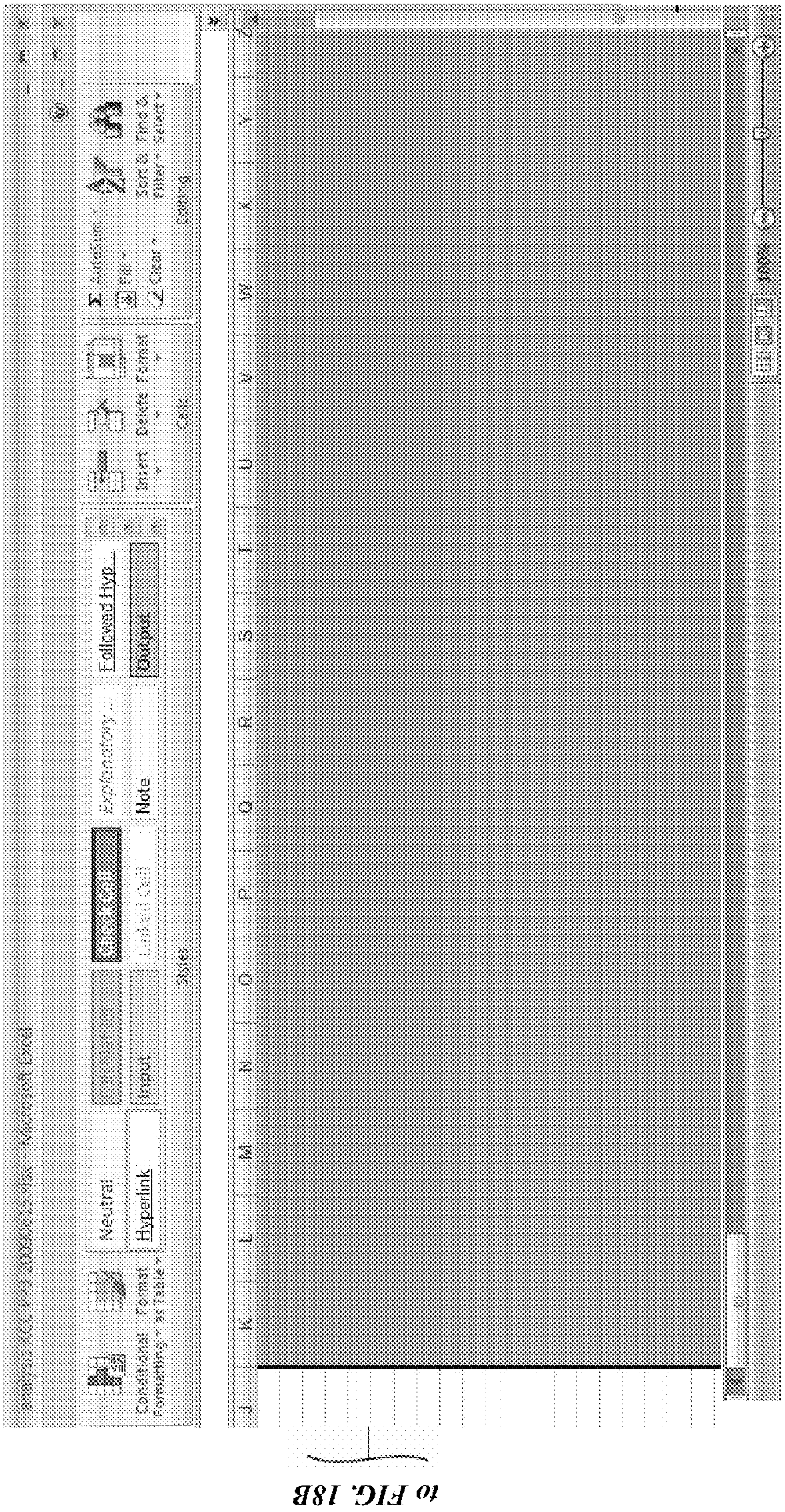

FIGS. 18A-B are screenshots of an embodiment of a report summary. In some embodiments, the report summary may comprise a summary of the transformation configuration; a list of unicode issues in the source installation to be upgraded; a list of modernization issues; a list of issues divided by type; a list of issues divided by automation type (i.e. "automatic", "semi-automatic", "manual", or "ignore"); a list of parser actions to be taken; a list of the number of issues in the top 25 programs; a list of the number of unicode issues in the top 25 programs; and a list of the number of modernization and release issues in the top 25 programs. In some embodiments, the report summary may, as shown, be exported as a spreadsheet. However, in other embodiments, the report summary may be text, a combination of text and spreadsheets, charts, or any other presentation medium appropriate for conveying the above information. In some embodiments, the report summary may be generated prior to performing any transformation. For example, the report summary may be generated after the configurations used in the dynamic reports shown in FIGS. 16A-D and 17A-D are adjusted by a user for efficiency and time/cost savings.

Although generally described in a network environment, the various embodiments of the methods and systems described above may also, in some embodiments, be utilized in an off-line format. In some embodiments, the methods and systems described above may also be utilized in a non-real-time format. For example, in one such embodiment, solution manager 212 may be used to create a snapshot of a source installation 220. The snapshot may then be recorded on a portable storage medium, such as a CD-ROM, a DVD-ROM, a hard disk, a floppy disk, a flash drive, a ZIP drive, or any other type and format of storage medium or memory device for transferring data from one computer to another. The storage medium may then be manually transferred to the analyzer client 208, which may be located nearby, or may be located in another department, building, city, or country. In some embodiments, this may involve shipping or mailing the storage medium to the location of the analyzer client 208. In other embodiments, the snapshot may be digitally transferred to the analyzer client 208, although the analyzer client 208 may not necessarily have RFC access to the bridge system 202. For example, in one such embodiment, the snapshot may be emailed to the analyzer client 208. In another such embodiment, the snapshot may be transferred over a network, such as the Internet, via any type of file transfer protocol, such as FTP.

Similarly, in some embodiments, the metamodel may be transferred to the configuration client using any of the methods described above. Likewise, transformation configurations, reports, and time/cost analyses may be transferred between the various systems and clients using any of the methods described above. For example, in one such embodiment, a consultant may utilize a bridge system 202 to create a snapshot of a source system 204 while in the same building and on the same network as the source system 204. The consultant may then bring the snapshot to another location, such as the consultant's office, to perform analysis and transformation configuration. The consultant may transfer reports to and from the client, for example over email. Once a transformation configuration has been accepted, the consultant may then return to the building containing the source system 204 and execute the transformation.

In still further embodiments, the analysis and transformation can be performed on separate client systems. For example, in one such embodiment, the analysis could be performed on one analyzer client and the transformation configuration could be created. The transformation configuration could then be transferred via a computer readable medium to another client system for performing the transformation. Similarly, one skilled in the art can appreciate that other methods described above can be split between one or more client machines, with intermediary files, such as a partial snapshot or analysis, complete snapshot or analysis, configuration file, report, or any other type and form of file being transferred from one client machine to another client machine, where the snapshotting, analysis, configuration, and/or transformation may be continued.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for analyzing modifications to an application from a predetermined state of the application, the method comprising:

(a) identifying, by a collection agent from a source installation of an application, objects of the application modified from a predetermined state of the application;

(b) parsing, by an analysis agent executing on a device, the modified objects into a set of elements;

(c) generating, by the analysis agent, a meta-model comprising a representation of the modified objects of the application, the meta-model mapping the set of elements to the modified objects, wherein the meta-model identifies a relationship between a first object and second object of the modified objects as dynamic, based on the first object depending on the second object only if a parameter in a third object is a predetermined value;

(d) applying, by the analysis agent, one or more analysis rules to the set of elements in the meta-model, the one or more analysis rules detecting syntax and language violations of the set of elements of the modified objects to a defined syntax and language;

(e) responsive to the detected syntax and language violations, categorizing, by the analysis agent, transformation of each of the modified objects from the source installation of the application to a target installation of the application as one of automatic, semi-automatic, and manual, wherein objects are categorized as semi-automatic if they may be transformed with a combination of a level of automation and a level of user input during the transformation within a predetermined threshold range, wherein a transformation of the first object is categorized as one of automatic or semi-automatic if a transformer may change the first object by changing the value of the third object from the predetermined value and replace references in the first object to the second object with references to a first object, responsive to the parameter in the third object not being the predetermined value.

2. The method of claim 1, wherein step (c) further comprises generating the meta-model to include one or more of the following: data structures, database definition, file definition interfaces, and a link from the set of elements of the modified objects to corresponding code in the source application.

3. The method of claim 1, wherein step (d) further comprises detecting, by the analysis agent, one or more violations of naming conventions of the set of elements in the meta-model to rules specified via the one or more analysis rules.

4. The method of claim 1, wherein step (d) further comprises determining, by the analysis agent, a set of elements in the meta-model that violate a unicode rule specified by the one or more analysis rules, the unicode rule identifying objects are mixed unicode and binary, and wherein step (e) further comprises categorizing the set of elements that violate the unicode rule as semi-automatic.

5. The method of claim 1, wherein step (d) further comprises determining, by the analysis agent, a set of elements in the meta-model that do not adhere to a coding standard specified by the one or more analysis rules.

6. The method of claim 1, wherein categorization of objects as one of automatic, semi-automatic, and manual is based on an automation value determined by a ratio of elements of a modified object determined to be automated to elements of the modified object determined to be manual, said automation value compared to the predetermined threshold range.

7. The method of claim 1, wherein step (d) further comprises generating statistics of suitability for upgrade from the source installation of the application to the target installation of the application, responsive to ratios between objects categorized as automatic, objects categorized as semi-automatic, and objects categorized as manual.

8. The method of claim 1, wherein step (d) further comprises generating an estimate of one or more of time and cost for converting each modified object of the source installation of the application to the target installation of the application.

9. A method for transforming modifications from a source installation of an application to a target installation of the application, the method comprising:

(a) receiving, by a transformer, a meta-model comprising a representation of objects identified from a source installation of an application that have been modified from a predetermined state of the application, the meta-model mapping the modified objects to a set of elements and identifying relationships between the objects, the relationships identified as static if the relationship does not change during runtime and dynamic if the relationship does change during runtime, wherein the meta-model identifies a relationship between a first object and second object of the objects identified from the source installation as dynamic, based on the first object depending on the second object only if a parameter in a third object is a predetermined value;

(b) applying, by the transformer, one or more transformation rules to the meta-model to transform the set of elements of the modified objects for a target installation of the application, the one or more transformation rules automatically correcting violations with syntax and language in the set of the elements of the modified objects to a predefined syntax and language for the target installation, by changing the value of the third object from the predetermined value; and (c) generating, by the transformer from the transformed set of elements in the meta-model, transformed objects that are interpretable by the target installation of the same application and correspond to the modified objects of the source installation by replacing references in the first object to the second object with references to a fourth object responsive to the parameter in the third object not being the predetermined value.

10. The method of claim 9, further comprising:

(d) displaying, by the transformer, a comparison of the set of elements before applying the transformation rules and the set of elements after applying the transformation rules.

11. The method of claim 9, wherein step (b) further comprises applying the one or more transformation rules, responsive to an indicator identifying each of the modified objects as one of an automatic, semi-automatic, and manual transformation, each of the modified objects identified as automatic, semi-automatic, or manual based on a ratio of automatic elements of each modified object to manual elements of each modified object, the ratio compared to a predetermined threshold range, and wherein each object is categorized as semi-automatic if said object's ratio is within the predetermined threshold range.

12. The method of claim 9, wherein step (b) further comprises applying the one or more transformation rules to upgrade the modified objects from a first version of the application of the source installation to a second version of the same application of the target installation.

13. The method of claim 9, wherein step (b) further comprises applying the one or more transformation rules to correct violations of the modified objects for the target installation of the application identified by one or more analysis rules that detect syntax and language violations of elements of a modified object to the defined syntax and language.

14. The method of claim 9, wherein step (b) further comprises applying the one or more transformation rules to convert the set of elements of the modified objects to comply with a unicode rule, at least one of the set of elements of the modified objects comprising mixed unicode and binary, and wherein at least one of the one or more transformation rules is configured with a user input selection of a unicode or binary mode.

15. The method of claim 1, wherein an object is categorized as semi-automatic if transformation of the object requires user selection of a parameter before transformation may be performed automatically based on the selected value of the parameter.

16. The method of claim 15, wherein the parameter is a binary/Unicode mode, and wherein the semi-automatic object may be automatically transformed based on a user selection of one of binary mode and Unicode mode.

17. The method of claim 15, wherein the parameter is a directory, and wherein the semi-automatic object may be automatically transformed based on a user-specified directory.

18. The method of claim 9, wherein applying the one or more transformation rules further comprises applying a transformation rule to the first object, responsive to the rule identifying the second object and the first object depending on the second object based on the predetermined value in the third object.

19. A system for transforming modifications from a source installation of an application to a target installation of the application, the system comprising:

a device comprising a processor executing a transformer, the transformer configured for:

receiving a meta-model comprising a representation of objects identified from a source installation of an application that have been modified from a predetermined state of the application, the meta-model mapping the modified objects to a set of elements and identifying relationships between the objects, the relationships identified as static if the relationship does not change during runtime and dynamic if the relationship does change during runtime, wherein the meta-model identifies a relationship between a first object and second object of the objects identified from the source installation as dynamic, based on the first object depending on the second object only if a parameter in a third object is a predetermined value, applying one or more transformation rules to the meta-model to transform the set of elements of the modified objects for a target installation of the application, the one or more transformation rules automatically correcting violations with syntax and language in the set of the elements of the modified objects to a predefined syntax and language for the target installation, by changing the value of the third object from the predetermined value; and generating, from the transformed set of elements in the meta-model, transformed objects that are interpretable by the target installation of the same application and correspond to the modified objects of the source installation by replacing references in the first object to the second object with references to a fourth object responsive to the parameter in the third object not being the predetermined value.

20. The system of claim 19, wherein the transformer is further configured for applying the one or more transformation rules, responsive to an indicator identifying each of the modified objects as one of an automatic, semi-automatic, and manual transformation, each of the modified objects identified as automatic, semi-automatic, or manual based on a ratio of automatic elements of each modified object to manual elements of each modified object, the ratio compared to a predetermined threshold range, and wherein each object is categorized as semi-automatic if said object's ratio is within the predetermined threshold range.

* * * * *